US012609939B2

(12) United States Patent
Howe et al.

(10) Patent No.: US 12,609,939 B2
(45) Date of Patent: Apr. 21, 2026

(54) ZERO TRUST SYSTEM ARCHITECTURE

(71) Applicant: Zscaler, Inc., San Jose, CA (US)

(72) Inventors: Nathan Howe, Frankfurt (DE); Sanjit Ganguli, Columbia, MD (US); Gerard Festa, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 233 days.

(21) Appl. No.: 18/313,446

(22) Filed: May 8, 2023

(65) Prior Publication Data

US 2024/0129321 A1 Apr. 18, 2024

Related U.S. Application Data

(60) Provisional application No. 63/417,181, filed on Oct. 18, 2022.

(51) Int. Cl.
*H04L 9/40* (2022.01)

(52) U.S. Cl.
CPC ............ *H04L 63/126* (2013.01); *H04L 63/20* (2013.01)

(58) Field of Classification Search
CPC .............................. H04L 63/126; H04L 63/20
See application file for complete search history.

(56) References Cited

U.S. PATENT DOCUMENTS

| | | |
|---|---|---|
| 11,438,363 B2 | 9/2022 | Howe |
| 11,596,027 B2 | 2/2023 | Howe |

| | | | |
|---|---|---|---|
| 2002/0178271 A1* | 11/2002 | Graham | ................ H04L 69/329 |
| | | | 709/229 |
| 2014/0053280 A1* | 2/2014 | Durazzo | ................. H04L 63/10 |
| | | | 726/28 |
| 2019/0327272 A1* | 10/2019 | Narayanaswamy | .. G06F 16/285 |
| 2020/0236112 A1* | 7/2020 | Pularikkal | ........... H04L 63/1425 |
| 2020/0336484 A1* | 10/2020 | Mahajan | ............. H04L 63/0884 |
| 2021/0320940 A1* | 10/2021 | Batta | ..................... H04L 63/083 |
| 2022/0027431 A1 | 1/2022 | Zheng et al. | |
| 2022/0210173 A1* | 6/2022 | Katmor | ............... H04L 63/1416 |
| 2022/0231991 A1* | 7/2022 | Blum Shem-Tov | ......................... |
| | | | H04L 63/0263 |
| 2022/0286428 A1 | 9/2022 | Howe et al. | |
| 2022/0286429 A1 | 9/2022 | Howe et al. | |
| 2022/0286854 A1 | 9/2022 | Howe et al. | |
| 2022/0286860 A1 | 9/2022 | Howe et al. | |
| 2022/0286894 A1 | 9/2022 | Howe et al. | |
| 2022/0286911 A1 | 9/2022 | Howe et al. | |
| 2022/0286912 A1 | 9/2022 | Howe et al. | |
| 2022/0408255 A1 | 12/2022 | Howe | |

* cited by examiner

*Primary Examiner* — Amie C. Lin
(74) *Attorney, Agent, or Firm* — Baratta Law PLLC; Lawrence A. Baratta, Jr.

(57) ABSTRACT

Systems and methods for a zero trust architecture are provided. A method, according to one implementation, includes detecting an initial attempt by an entity to connect, access, or communicate with a network resource and blocking the entity from initially connecting, accessing, or communicating with the network resource. The method also includes performing a verification procedure to verify one or more of an identity of the entity and a context of the initial attempt. The method also performs a control procedure to control one or more of malicious content and sensitive data. In addition, the method includes performing an enforcement procedure in response to results of the verification procedure and control procedure to determine how to handle the initial attempt.

20 Claims, 51 Drawing Sheets

| APPLICATION TRANSFORMATION

Data Center → SaaS, IaaS, PaaS | + | NETWORK TRANSFORMATION

Hub-and-Spoke → Direct Connectivity | + | SECURITY TRANSFORMATION

Castle-and-Moat → Zero Trust Architecture |

= SECURE DIGITAL TRANSFORMATION

_450_

| Identity Value | Explanation |
|---|---|
| Email Address | Normally a unique value per user |
| Department | Allowing group access under a team value |
| Employee ID | Normally a unique value per user |
| Employee Geo | Identifying the region where the employee is employed |

FIG. 23

Secure Workload-to-Internet Access

Secure Workload Communication
Cloud-to-Cloud, Cloud-to-DC

Secure Cloud Posture
Secure Public Cloud Data
Secure SaaS Data

Secure IoT/OT
Secure Public Internet
Secure Remote Access

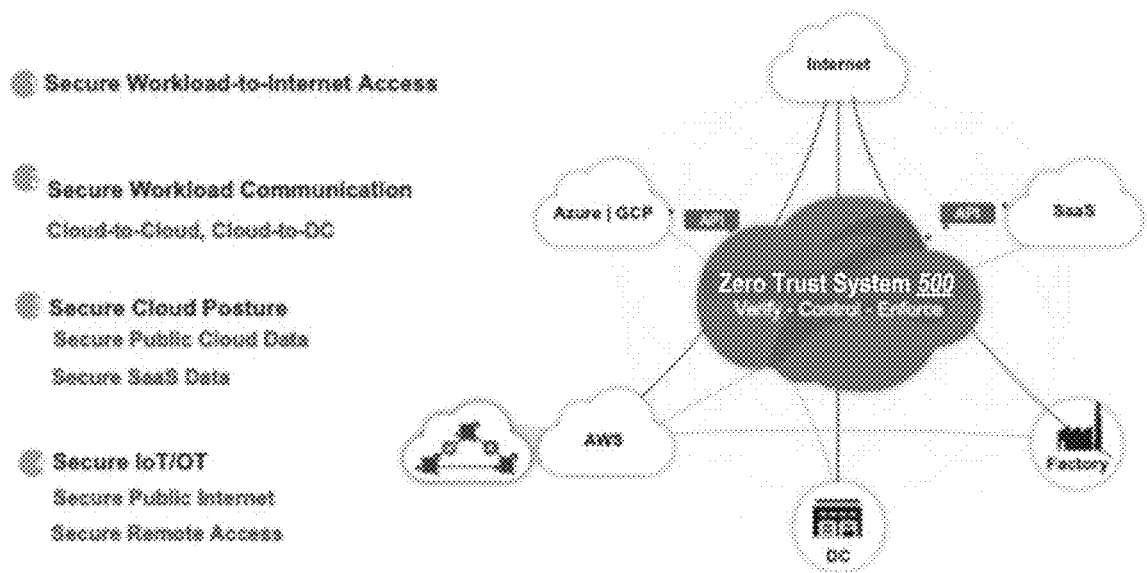

FIG. 24

```
;; ANSWER SECTION:
co2br.prod.zpath.net.      576     IN      CNAME   co2br.gslb.prod.zpath.net.
co2br.gslb.prod.zpath.net. 45      IN      CNAME   fra4.co2br.gslb.prod.zpath.net.
fra4.co2br.gslb.prod.zpath.net. 4 IN      A       165.225.73.254
fra4.co2br.gslb.prod.zpath.net. 4 IN      A       165.225.73.252
fra4.co2br.gslb.prod.zpath.net. 4 IN      A       165.225.25.209
fra4.co2br.gslb.prod.zpath.net. 4 IN      A       165.225.25.210
fra4.co2br.gslb.prod.zpath.net. 4 IN      A       165.225.25.208
fra4.co2br.gslb.prod.zpath.net. 4 IN      A       165.225.73.251
fra4.co2br.gslb.prod.zpath.net. 4 IN      A       165.225.73.253
```

FIG. 37

| Domain | Current URL Category | Updated URL Category (From 04/24) |
|---|---|---|
|  | Professional Services | File Host |
|  | Web Search | File Host |

FIG. 38

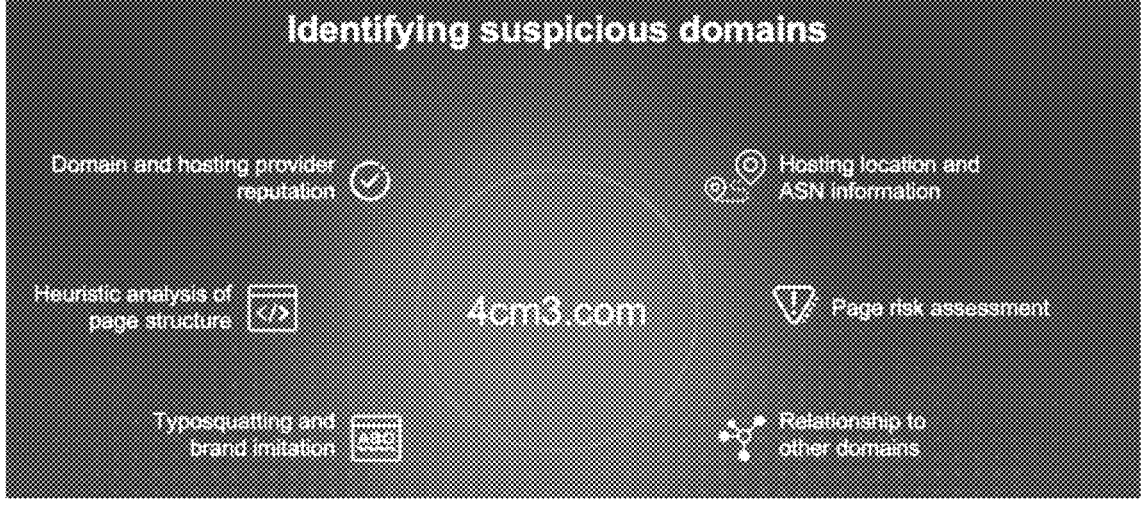

FIG. 39

Events that contributed to the score over 7 days
Yesterday
● Suspicious modification of Sensitive Groups
  Oct 26, 2021, 2:21 PM | 🔲 Suspicious
● Malicious file Blocked
  Oct 26, 2021, 2:21 PM | ⚠ Malware
● Detected possible botnet command and control traffic
  Oct 26, 2021, 2:21 PM | 🔲 Infected
● Violates Compliance Category
  Oct 26, 2021, 2:21 PM | 🔲 Suspicious
FIG. 46
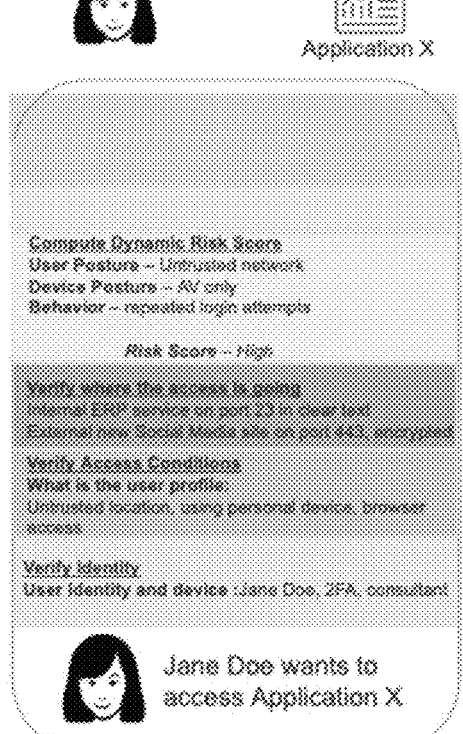
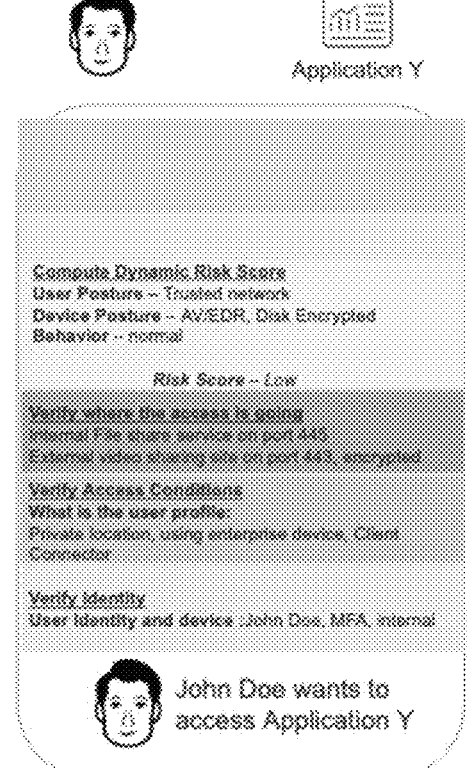
FIG. 47

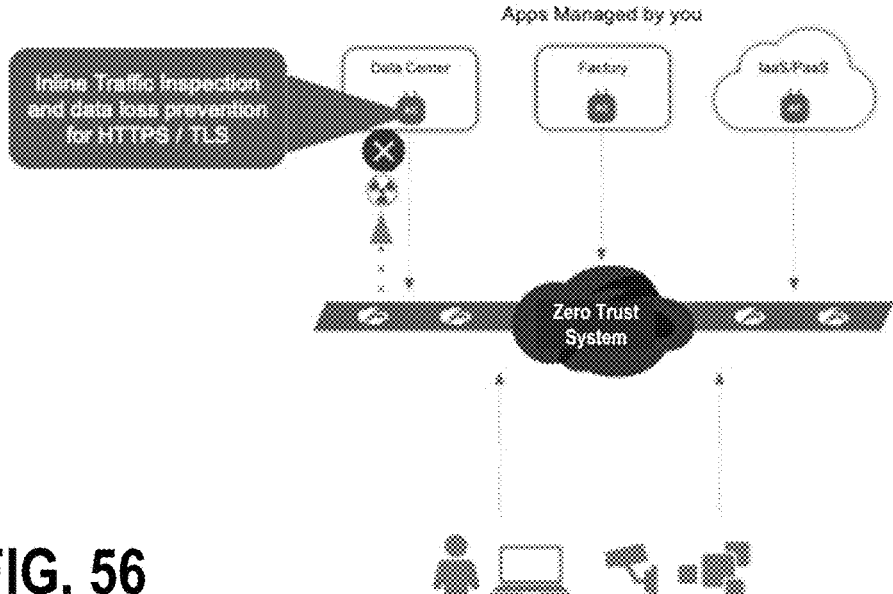
FIG. 56
 
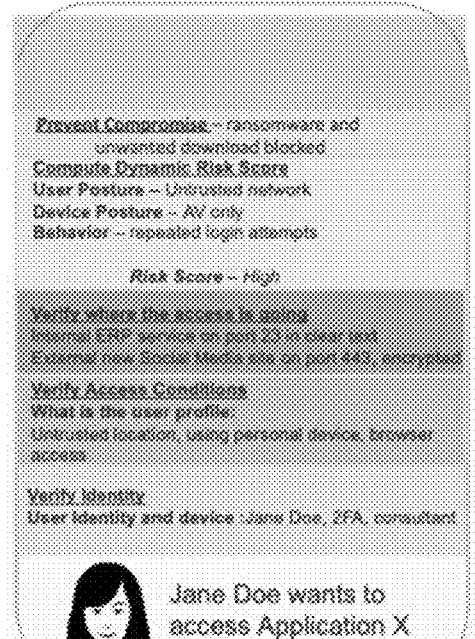
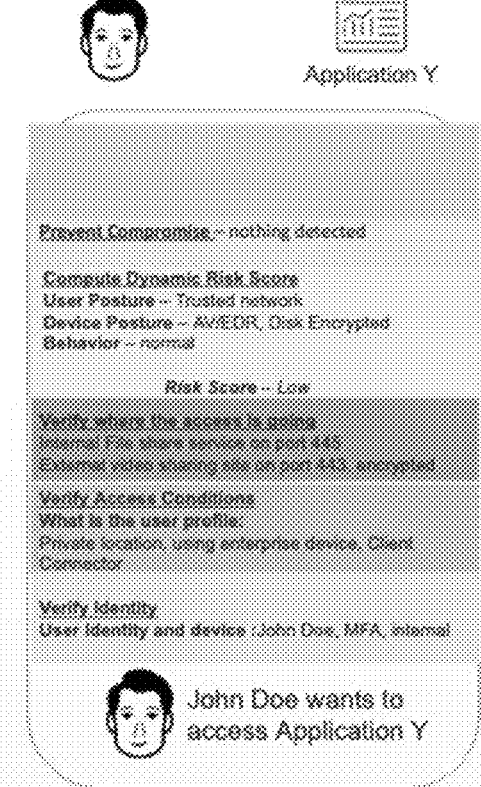
FIG. 57

Data Theft

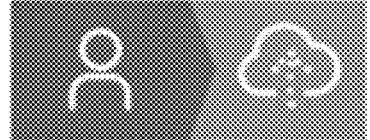

Executive downloads sensitive
data and takes to next company

Accidental Loss and Oversharing

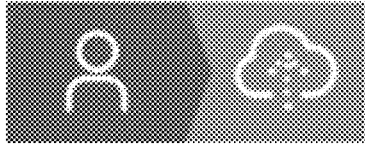

HR shares folder with employee
PII to open internet link

Compliance Issues

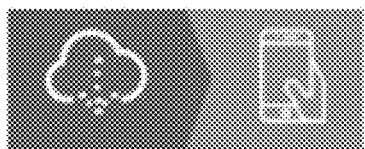

Employee downloads sensitive data
to unauthorized/BYOD device

Misconfiguration leads
to cloud data breach

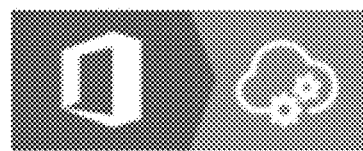

AWS S3 bucket is open, O365
no multi-factor auth enabled

FIG. 60

Inspect all content with full inline SSL inspection
On/Off Network — All Ports/Protocols

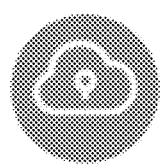

Context and
Content-aware DLP
• Predefined dictionaries and
  engines for PCI, PII, PHI,
  GDPR etc.
• Custom dictionaries via
  keywords and patterns Advanced Data Classification
• Exact Data Match:
  Match on custom data
  to reduce false positives
• Index Document Match:
  Fingerprint sensitive
  documents for blocking
• Optical Character
  Recognition:
  Find text in images and block Azure Information Protection
(AIP) Integrations
• Enforce AIP tagging for data
  inline and inside SaaS apps
• Write AIP tags to sensitive
  data found inside SaaS apps

FIG. 61

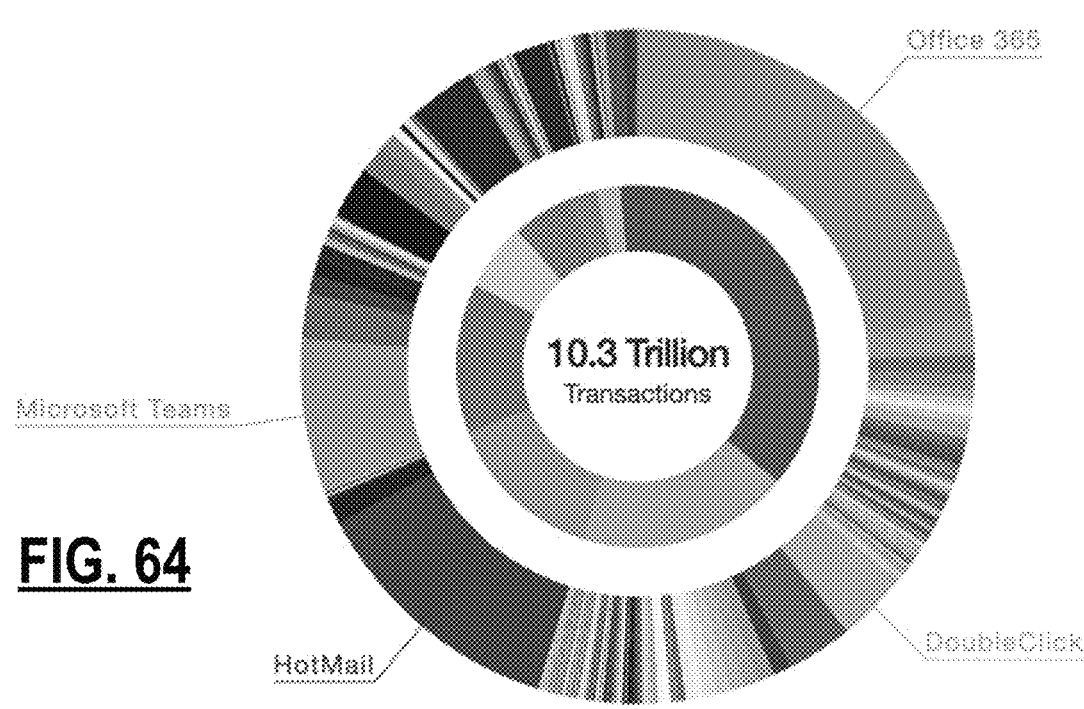
FIG. 64
 
 
FIG. 65

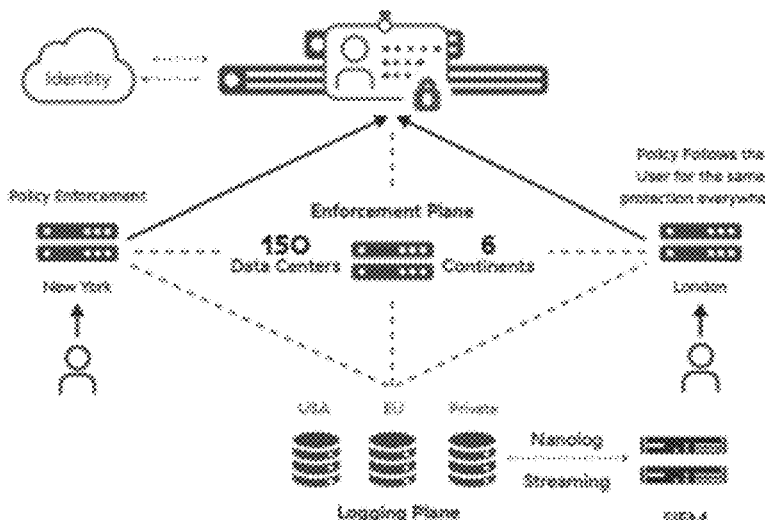
FIG. 79
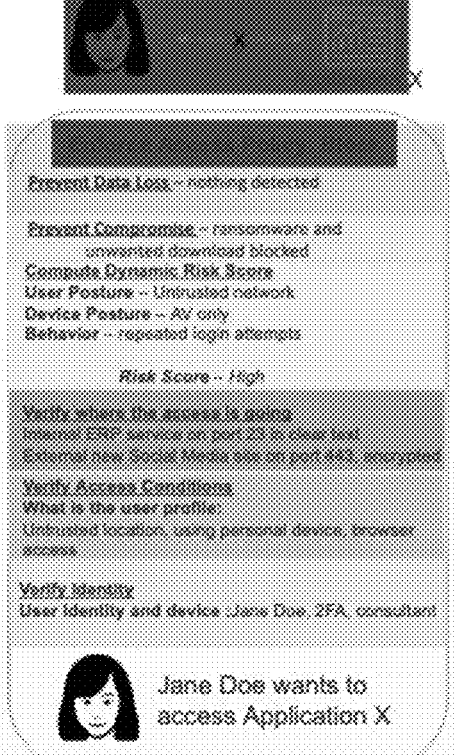
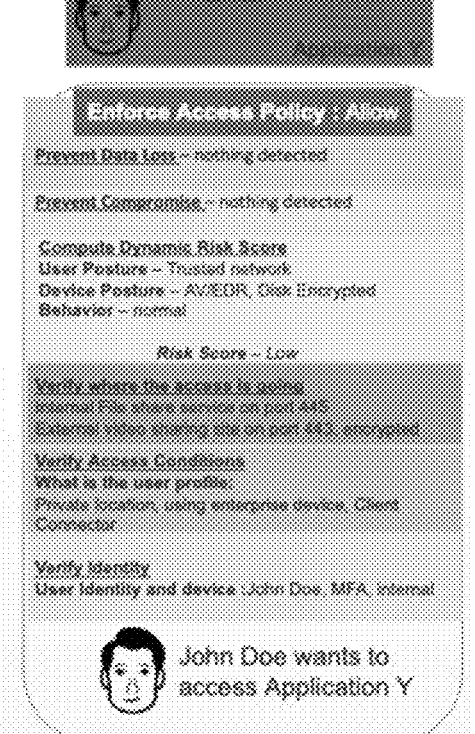
FIG. 80

FIG. 83
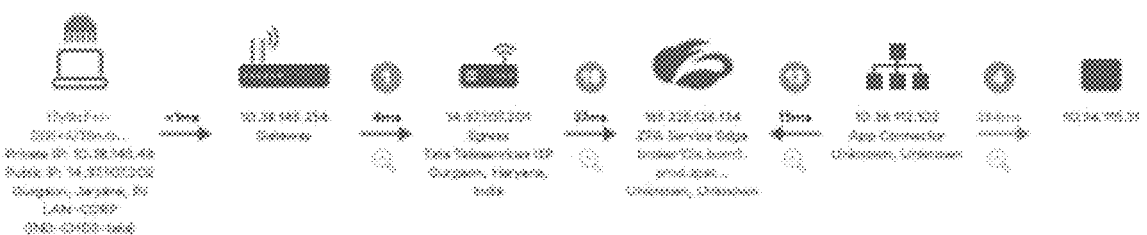
FIG. 84

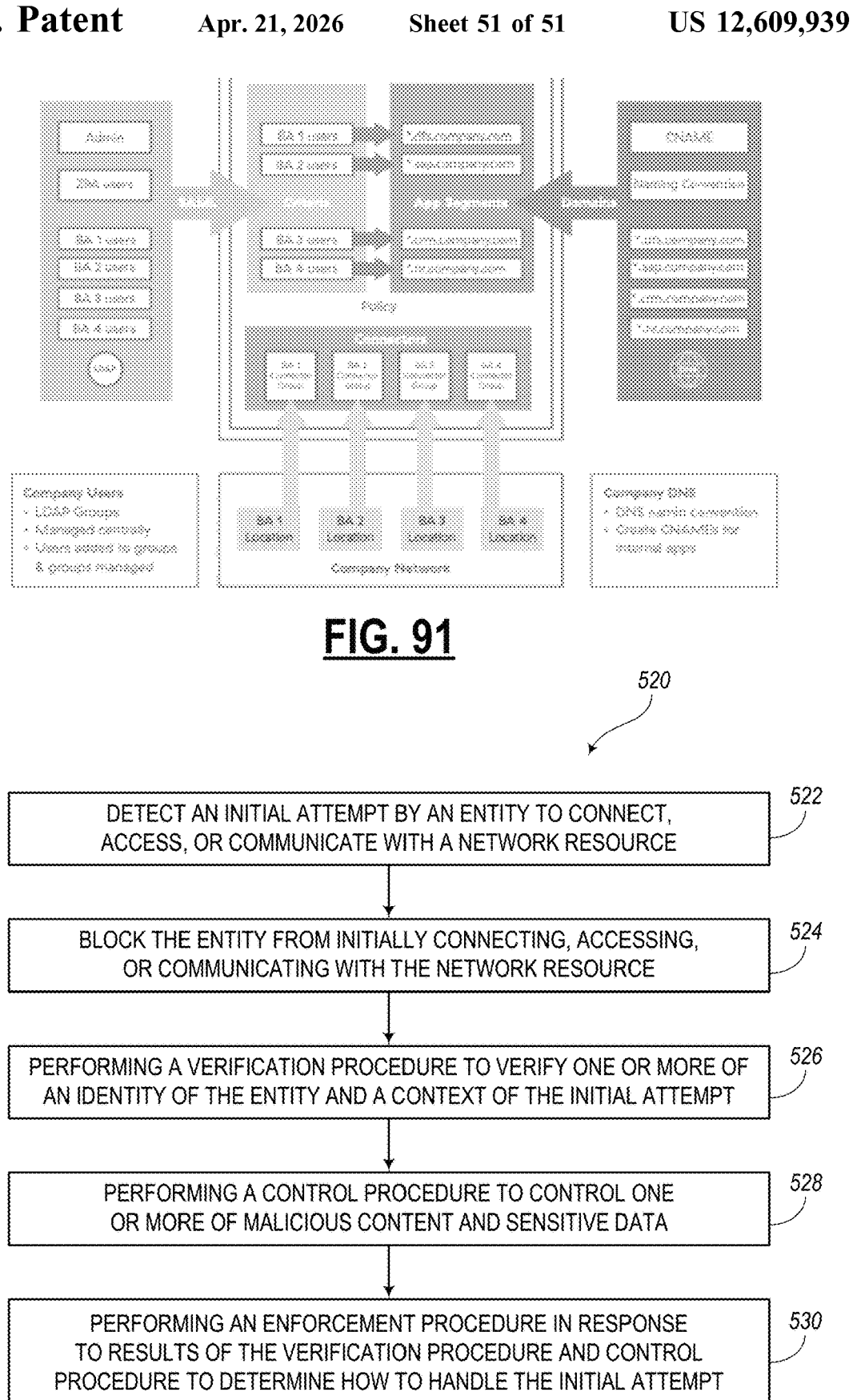

| | |
|---|---|
| DETECT AN INITIAL ATTEMPT BY AN ENTITY TO CONNECT, ACCESS, OR COMMUNICATE WITH A NETWORK RESOURCE | *522* |
| BLOCK THE ENTITY FROM INITIALLY CONNECTING, ACCESSING, OR COMMUNICATING WITH THE NETWORK RESOURCE | *524* |
| PERFORMING A VERIFICATION PROCEDURE TO VERIFY ONE OR MORE OF AN IDENTITY OF THE ENTITY AND A CONTEXT OF THE INITIAL ATTEMPT | *526* |
| PERFORMING A CONTROL PROCEDURE TO CONTROL ONE OR MORE OF MALICIOUS CONTENT AND SENSITIVE DATA | *528* |
| PERFORMING AN ENFORCEMENT PROCEDURE IN RESPONSE TO RESULTS OF THE VERIFICATION PROCEDURE AND CONTROL PROCEDURE TO DETERMINE HOW TO HANDLE THE INITIAL ATTEMPT | *530* |

FIG. 92

ZERO TRUST SYSTEM ARCHITECTURE

CROSS-REFERENCE TO RELATED APPLICATION

This application claims the benefit under 35 U.S.C. § 119 of U.S. Provisional Application No. 63/417,181, filed on Oct. 18, 2022, the entire disclosure of which is incorporated by reference herein.

TECHNICAL FIELD

The present disclosure generally relates to computer networking systems and methods. More particularly, the present disclosure relates to systems and methods for a zero trust system architecture.

BACKGROUND

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA), Zscaler Private Access (ZPA), Zscaler Digital Experience Monitoring (ZDX), etc., all available from Zscaler, Inc., the applicant and assignee of the present application.

BRIEF SUMMARY

The present disclosure is directed to systems and methods for performing a zero trust procedure. A method, according to one implementation, includes detecting an initial attempt by an entity to connect, access, or communicate with a network resource. The method also includes blocking the entity from initially connecting, accessing, or communicating with the network resource. Also, the method includes performing a verification procedure to verify one or more of an identity of the entity and a context of the initial attempt. The method further includes performing a control procedure to control one or more of malicious content and sensitive data. Also, the method includes performing an enforcement procedure in response to results of the verification procedure and control procedure to determine how to handle the initial attempt. In some embodiments, the method may further include the step of granting trust to the entity when the enforcement procedure determines that one or more enforcement policies are met.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 5 is a block diagram of a user device, which may be used with the cloud-based system or the like.

FIG. 23 is a table showing a possible set of identity values and their explanations.

FIG. 24 is a diagram illustrating the Zero Trust System used to ensure that granular controls are applied to Internet of Thing (IoT) and/or Operational Technology (OT) (IoT/OT) devices and workloads.

FIG. 37 is a screenshot interface illustrating an application example with multiple associated addresses and services.

FIG. 38 is a table illustrating an example of URL re-categorization of a newly discovered app.

FIG. 39 is a diagram illustrating the Zero Trust System using numerous factors to identify suspicious domains.

FIG. 46 is a diagram illustrating an example of events that will influence how a user's risk level is calculated.

FIG. 47 is a diagram illustrating a fifth progress report of the status of the two example users while they use the Zero Trust System of the present disclosure.

FIG. 56 is a diagram illustrating protection of internal apps with inline inspection.

FIG. 57 is a diagram illustrating a sixth progress report of the status of the two example users while they use the Zero Trust System of the present disclosure.

FIG. 60 is a diagram illustrating business challenges due to lack of data protection.

FIG. 61 is a diagram illustrating an example of functions of the Zero Trust System for an effective data protection solution.

FIG. 64 is a chart illustrating an example of a Zscaler Cloud Application Dashboard.

FIG. 65 is a diagram illustrating a seventh progress report of the status of the two example users while they use the Zero Trust System of the present disclosure.

FIG. 79 is a diagram illustrating an embodiment of the Zero Trust System having a multi-plane design.

FIG. 80 is a diagram illustrating a ninth progress report of the status of the two example users while they use the Zero Trust System of the present disclosure.

FIG. 83 is a map showing the experience of the user across an organization using the ZDX interface.

FIG. 84 is diagram illustrating the ZDX CloudPath for providing hop-by-hop network analysis.

FIG. 91 is a diagram illustrating use of the Zero Trust System by an enterprise for securing connections.

FIG. 92 is a flow diagram illustrating a zero trust method.

DETAILED DESCRIPTION

The present disclosure relates to systems and methods for observing attempts to connect, access, or communicate with a network resource. In particular, the systems and methods are configured to initially block initial attempts until certain criteria are met. This is known as zero trust processing, where no user or device is initially trusted for accessing network resources. After verification, the user device may be granted access.

Cloud-Based System Architecture

Figure 1A:
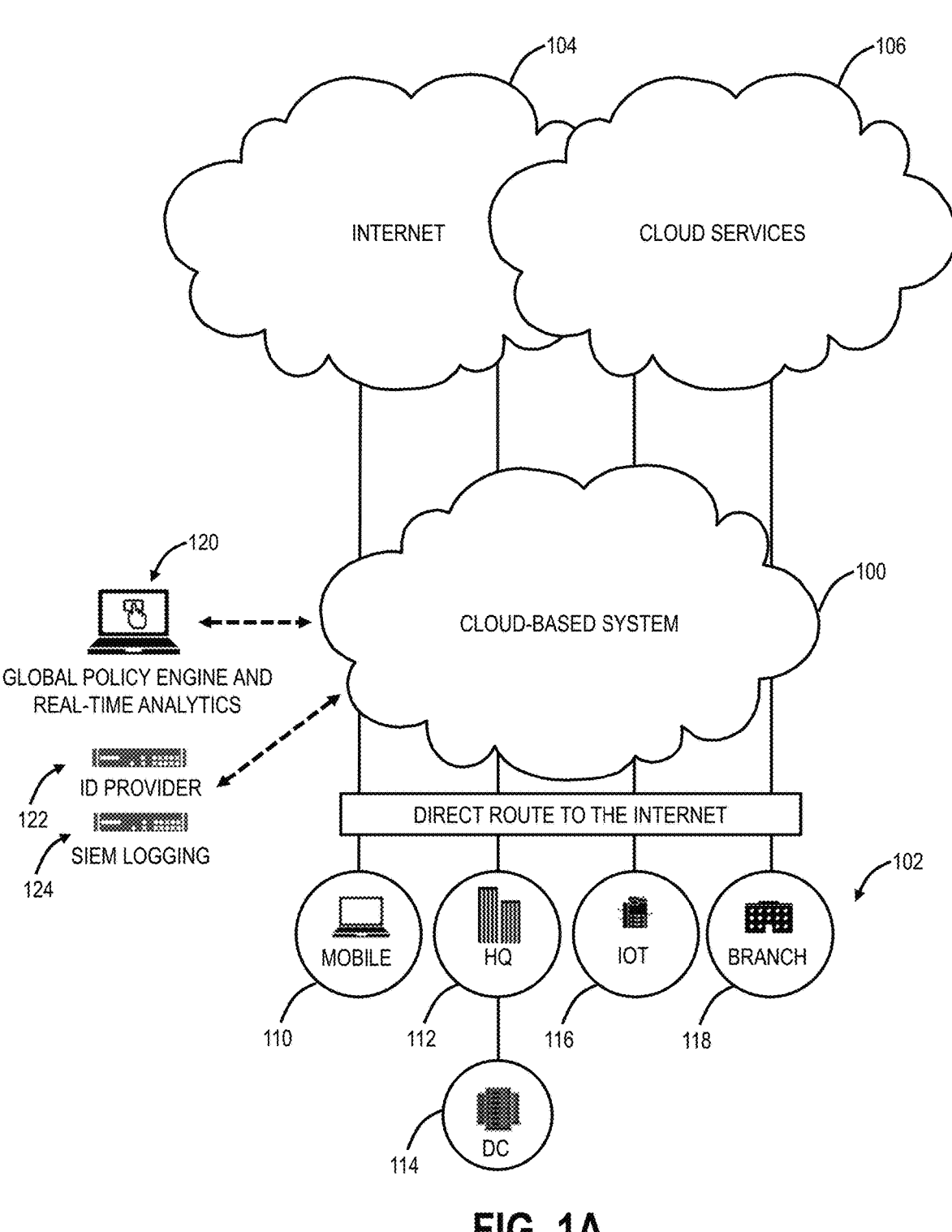
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet 104 as well as any cloud services 106 (or applications) accessed by the users 102. As such, the cloud-based system 100 provides inline monitoring for inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize certain applications such as those relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
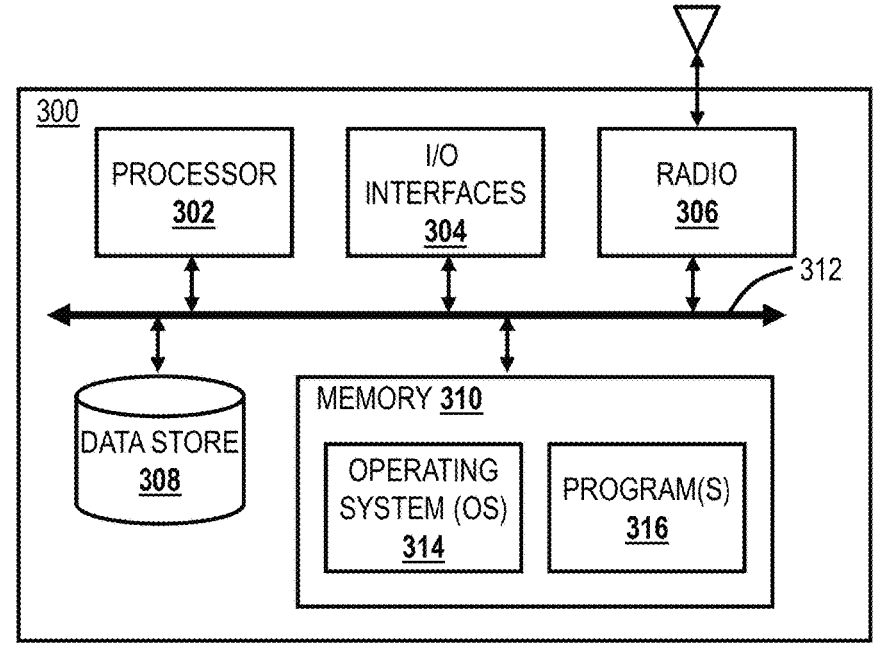

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize that the users 102 may each use a corresponding user device 300 for accessing the cloud-based system 100 and the like, and the description herein may describe the users 102 and/or the user devices 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes— they are instantly remediated across the entire cloud-based system 100. Also, new features in the cloud-based system 100 can be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 (at the locations 112, 114, 118 and via the devices 110, 116) and the cloud-based system 100. Typically, the locations 112, 114, 118 can use tunneling where all or much of the traffic is forwarded through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. One aspect of the cloud-based system 100 is that all or most traffic between the users 102 and the Internet 104 or the cloud services 106 may pass through the cloud-based system 100. As such, the cloud-based system 100 has visibility to enable various functions, all of which may be performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user basis.

Zero Trust

Figure 1B:
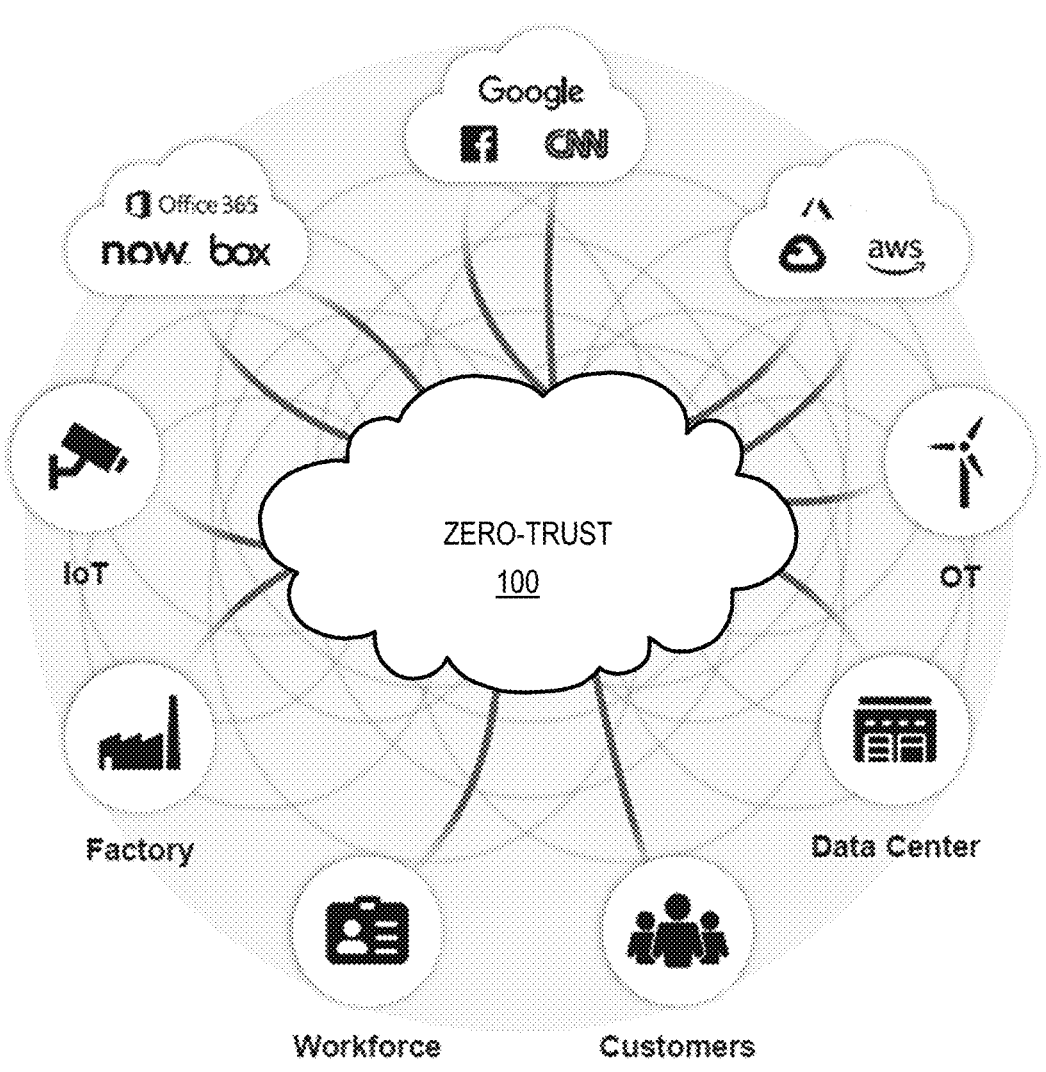
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. In a zero trust architecture, a resource's network location may not be the biggest factor in its security posture anymore. Instead of rigid network segmentation, your data, workflows, services, and such are protected by software-defined micro-segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:
1) Terminate essentially every connection: Technologies like firewalls use a "passthrough" approach, inspecting files as they are delivered. If a malicious file is detected, alerts are often too late. An effective zero trust solution terminates every connection to allow an inline proxy architecture to inspect all (or most) traffic, including encrypted traffic, in real time—before it reaches its destination—to prevent ransomware, malware, and more.

2) Protect data using granular context-based policies: Zero trust policies verify access requests and rights based on context, including user identity, device, location, type of content, and the application being requested. Policies are adaptive, so user access privileges are continually reassessed as context changes.

3) Reduce risk by eliminating the attack surface: With a zero trust approach, users connect directly to the apps and resources they need, never to networks (see Zero Trust Network Access (ZTNA) below). Direct user-to-app and app-to-app connections eliminate the risk of lateral movement and prevent compromised devices from infecting other resources. Plus, users and apps are invisible to the Internet, so they cannot be discovered or attacked.

Figure 1C:
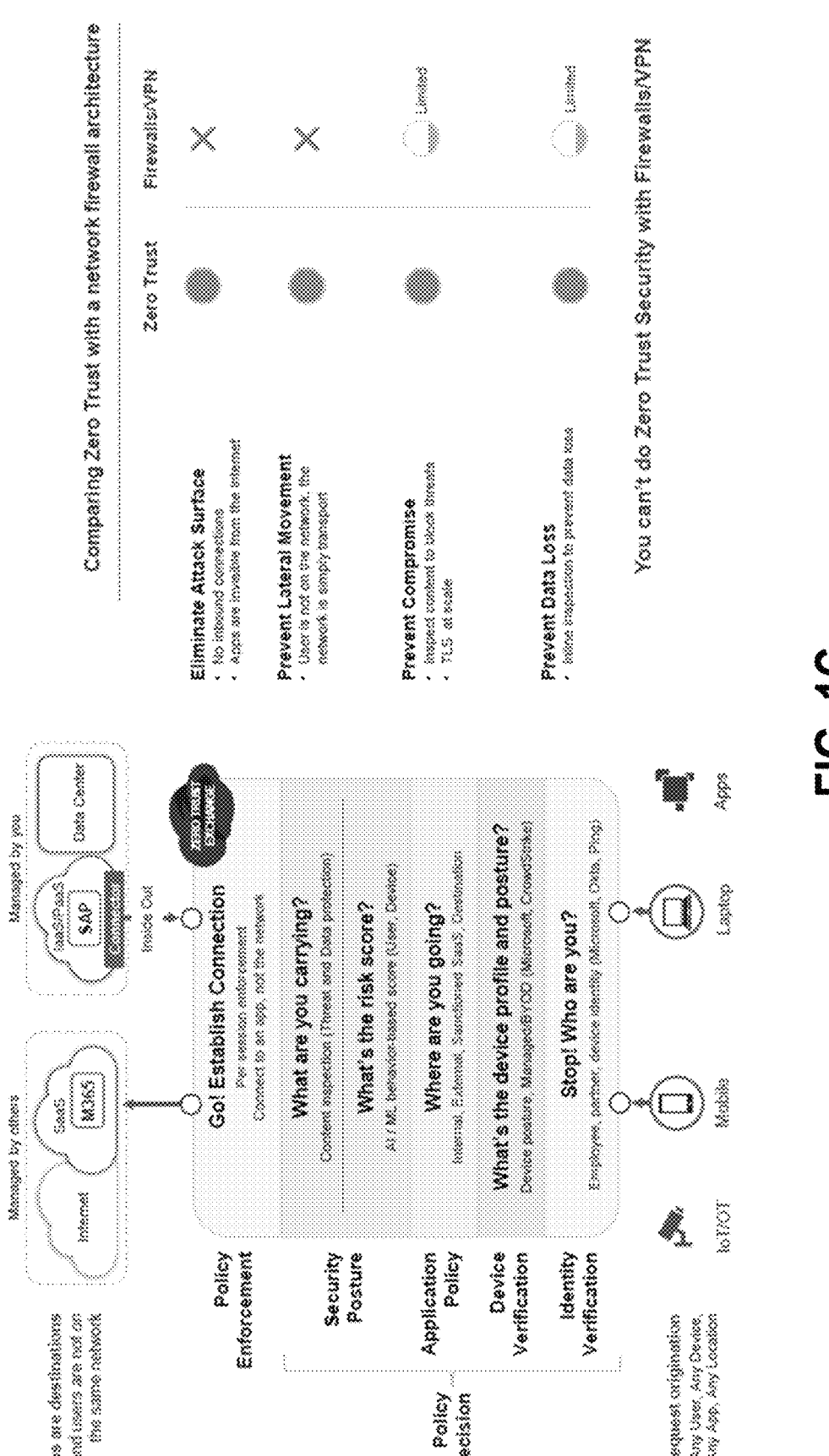
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the location of each of the users 102. Unlike the conventional firewall-based approach, this eliminates attack surfaces, there are no inbound connections; prevents lateral movement, the user is not on the network; prevents compromise, allowing encrypted inspection; and prevents data loss with inline inspection.

Implementation of Cloud-Based System

Figure 2:
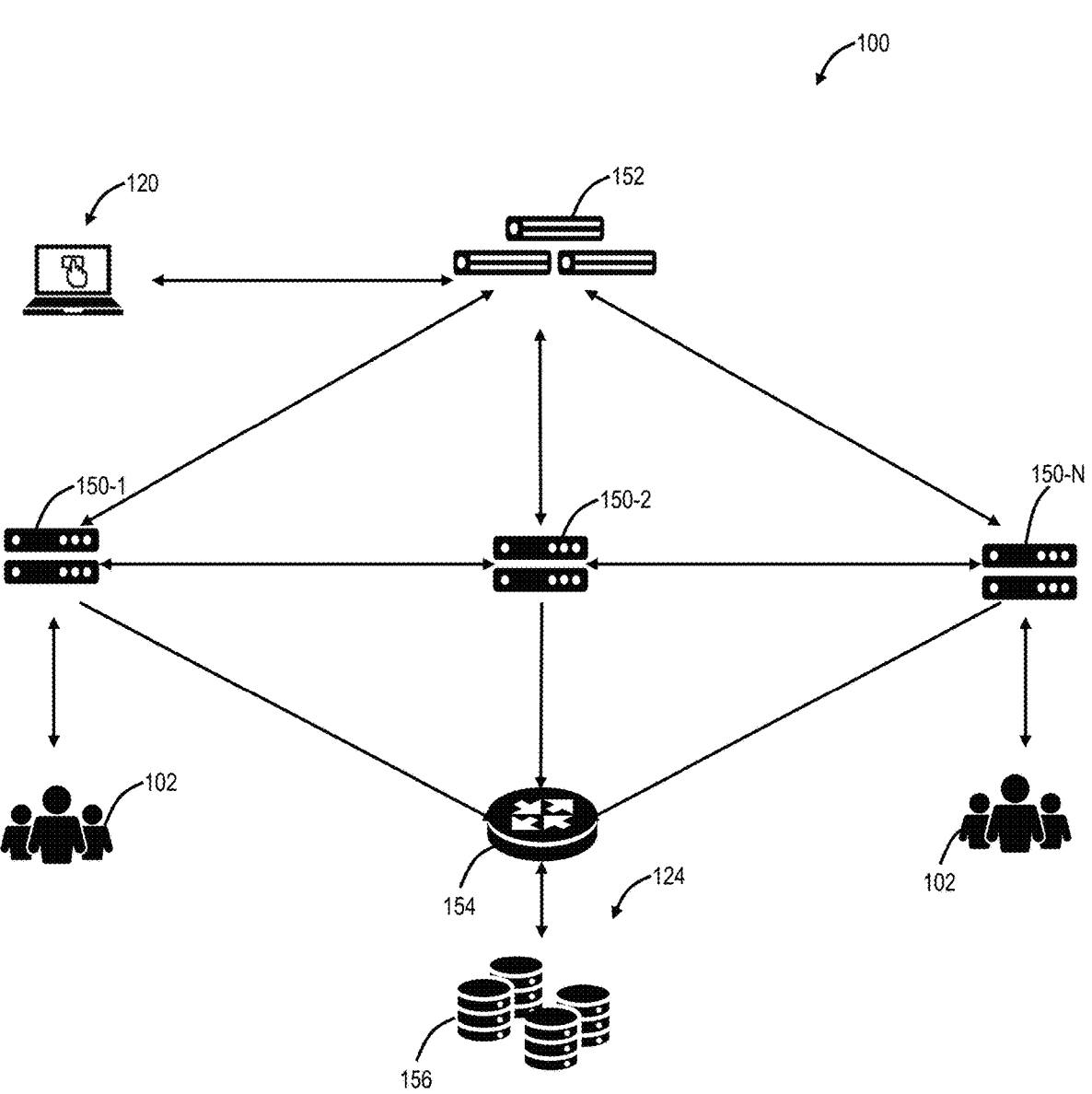
FIG. 2 is a network diagram of an example implementation of the cloud-based system.
Figure 4:
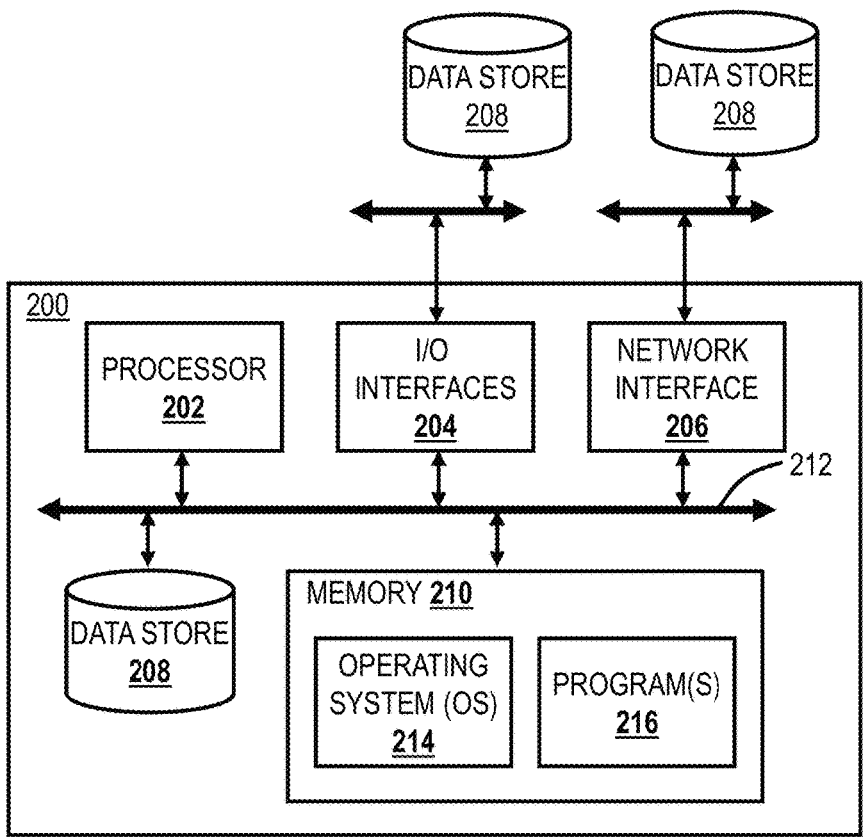
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (ENs) 150, labeled as enforcement nodes 150-1, 150-2, 150-N, interconnected to one another and interconnected to a central authority (CA) 152. The enforcement nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system 100 is an external system meaning it is separate from tenant's private networks (enterprise networks) as well as from networks associated with the devices 110, 116, and locations 112, 114, 118.

The enforcement nodes 150 are full-featured secure Internet gateways that provide integrated Internet security. They inspect web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for transactions may be compressed, tokenized, and exported over secure Transport Layer Security (TLS) connections to the log routers 154 that direct the logs to the storage cluster 156, hosted in the appropriate geographical region, for each organization. In an embodiment, data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all or most of the cached policies may be purged, and the enforcement nodes 150 request the new policy when the user 102 next makes a request. In an embodiment, the enforcement nodes 150 exchange "heartbeats" periodically, so enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud services 106 are any services made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems (each like the cloud-based system 100), including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Other types of cloud architectures are also contemplated, with the cloud-based system 100 presented for illustration purposes.

User Device Application for Traffic Forwarding and Monitoring

Figure 3:
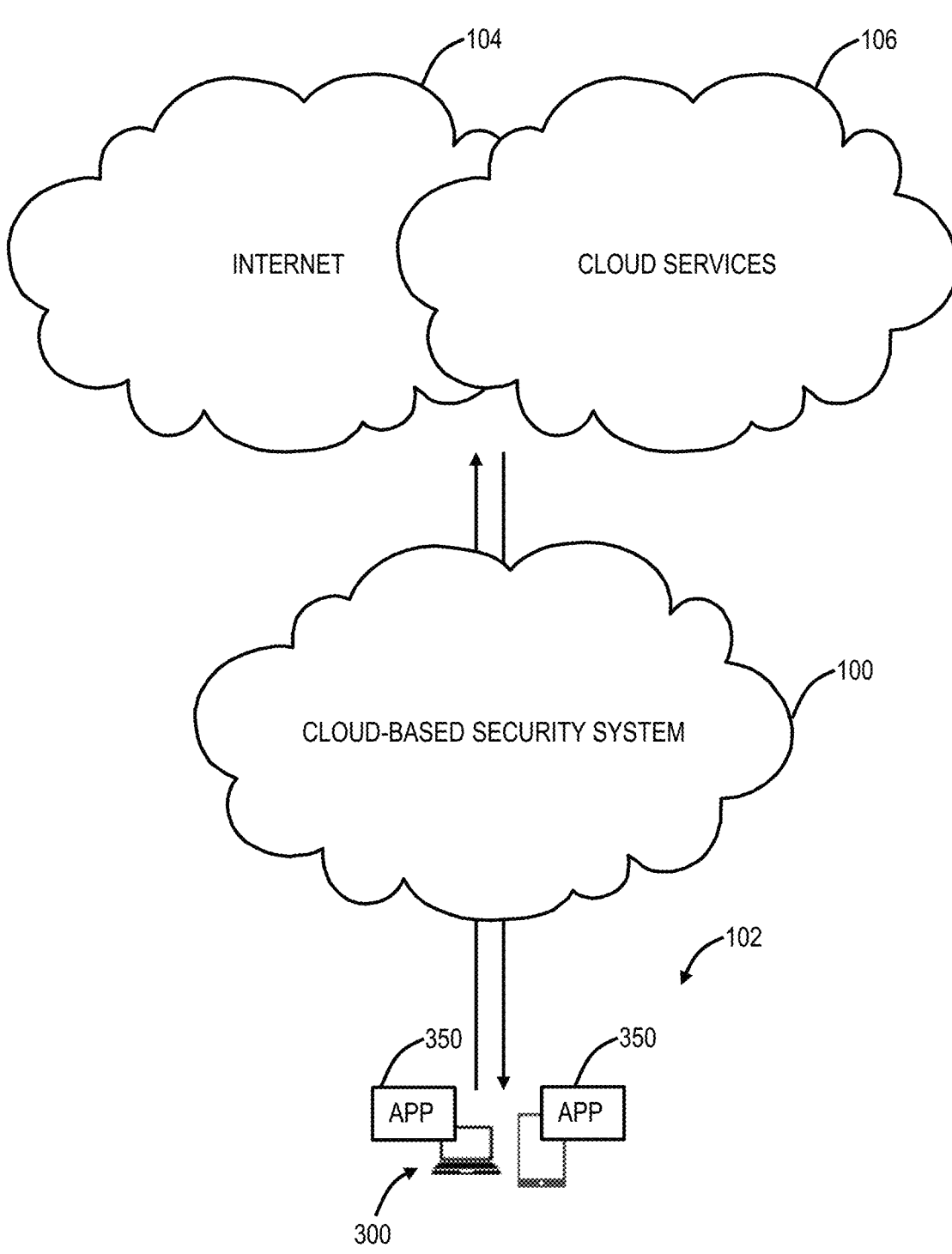
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or user 102 setup.

Implementation of Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. The data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The O/S 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Implementation of User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access (ZTNA) Using the Cloud-Based System

Figures 6, 7:
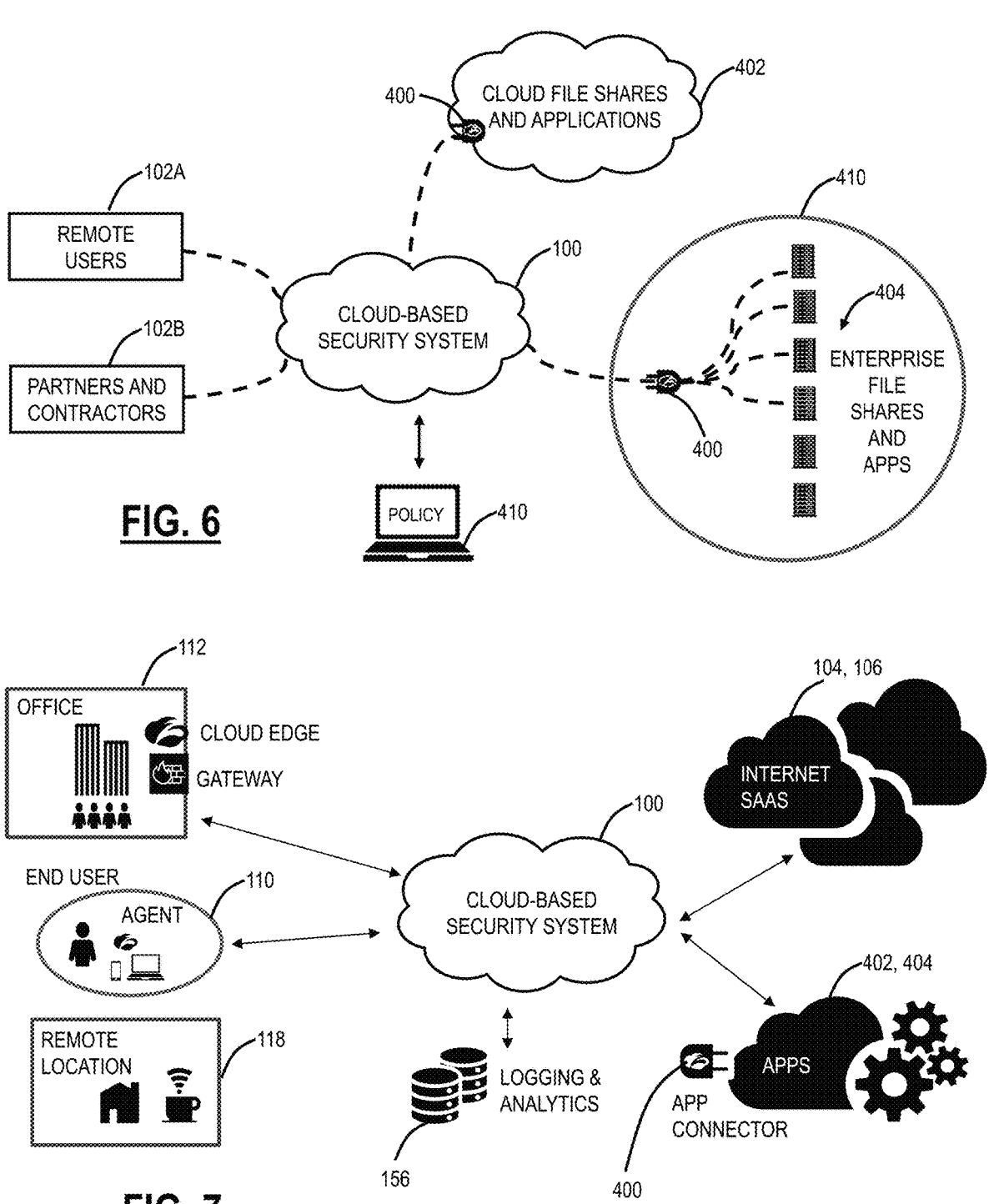
FIG. 6 is a network diagram of a Zero Trust Network Access (ZTNA) application utilizing the cloud-based system.
FIG. 7 is a network diagram of the cloud-based system of FIGS. 1 and 2 in an application of digital experience monitoring.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that is remote and a connector 400 that is either located in cloud file shares and applications 402 (i.e., on-premises connector) and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include business-to-business (B2B) applications. Note, the difference between the applications 402, 404 is that the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with the on-premises connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them.

Because the virtual private access separates the application from the network, the physical location of the applications 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

Digital Experience Monitoring

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 112, 114, 118 to the applications 402, 404, the Internet 104, the cloud services 106, etc. The inline, end-to-end visibility of the users 102 enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Microsoft Office, Microsoft 365, Salesforce, Skype, Google apps, internal applications, etc. These are business applications where user experience may normally be an important concern. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

"Application-related" data may include, for example, a) page load time, b) page response time, c) Document Object Module (DOM) load time, d) total downloaded bytes, e) app availability (%), f) redirect count (#), g) throughput (bps), h) total size (bytes), i) page error count (#), j) page element count by category (#), etc. "Network-related" data may include, for example, a) http request metrics, b) server response time, c) ping packet loss (%), d) ping round trip, e) packet loss (%), f) latency, g) bandwidth, h) jitter, i) trace route, j) DNS lookup trace, k) GRE/IPSec tunnel monitoring, l) MTU and bandwidth measurements, etc. "Device-related data" (or endpoint-related data) may include, for example, a) system details, b) Central Processing Unit (CPU), c) memory (RAM), d) network interfaces, e) network config, f) disk, g) processes, h) applications, etc.

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Additional Zero Trust Features

IT and security are becoming enablers of digital transformation. Businesses undertake digital transformation journeys to increase efficiency, improve agility, and achieve a competitive advantage. And, in today's economy, this transformation is accelerating. For the business to succeed, IT first undergoes a transformation of its own—one that typically starts with applications moving from data centers to the cloud, which in turn necessitates a network transformation. To transform the network, security transforms with it.

Figures 8, 9:
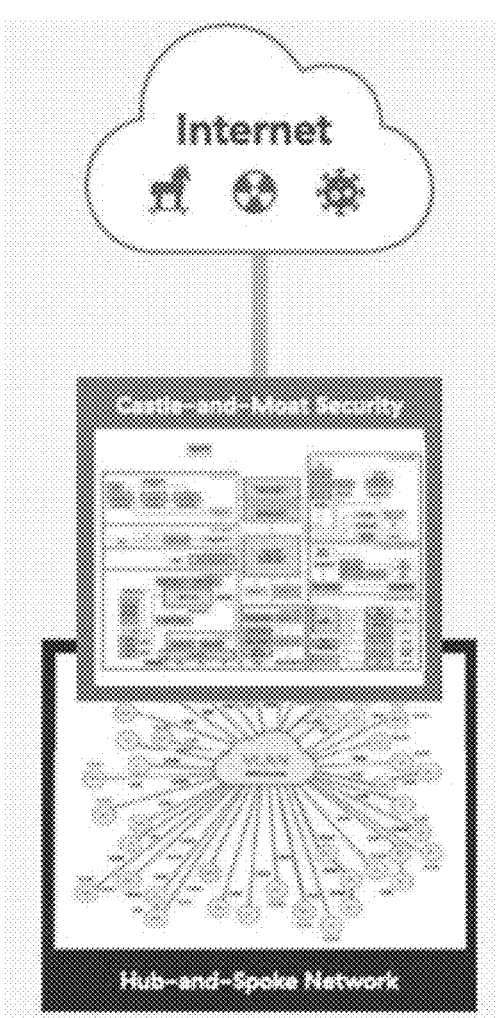
FIG. 8 is a block diagram illustrating components of a secure digital transformation involving a combination of application, network, and security transformations.
FIG. 9 is a diagram illustrating a castle-and-moat architecture and a hub-and-spoke architecture used when the data center is essentially central to a network where all or most traffic flows through it.

FIG. 8 is a block diagram illustrating components of a secure digital transformation involving a combination of application, network, and security transformations. For the past three decades, organizations have been building and optimizing complex, wide-area, hub-and-spoke networks for connecting branches and factories to applications in the data center. The network was secured with a stack of security appliances and firewalls using an architecture known as castle-and-moat security. This was so named because the security stack created a network perimeter (or moat) around the data center (or castle). This architecture prevented access to anyone outside the network, but granted privileges to anyone within. This network and security architecture served us reasonably well when applications lived in the data center and users worked from the office.

FIG. 9 is a diagram illustrating a castle-and-moat architecture and a hub-and-spoke architecture used when the data center is essentially central to a network and all or most of the traffic flows through it. In today's world, the workforce is dispersed, and applications no longer reside solely in the data center. A large number of applications have moved to public clouds as SaaS, IaaS, or PaaS offerings, resulting in a hybrid environment. It no longer makes sense to backhaul traffic to the data center to securely reach applications in the cloud. For fast and productive collaboration, application traffic can go direct.

Figure 10:
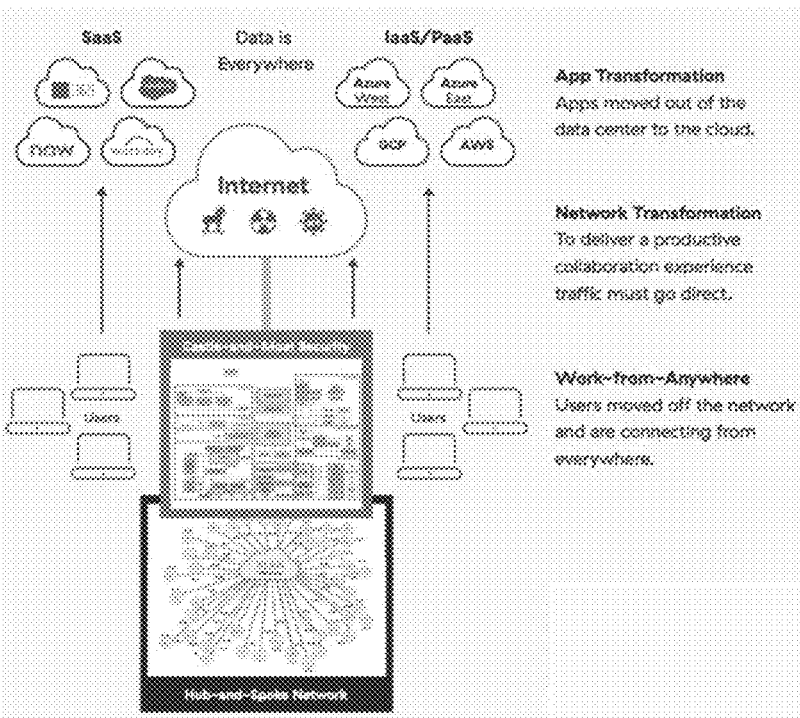
FIG. 10 is a diagram illustrating the remote use of the architectures shown in FIG. 9 where users can work from anywhere and access applications hosted in a variety of locations.

FIG. 10 is a diagram illustrating the remote use of the architectures shown in FIG. 9 where users can work from anywhere and access applications hosted in a variety of locations. Hub-and-spoke networks were built and optimized to link on-premises users with applications residing in data centers. Since the network and applications are intertwined, application access typically requires users, devices, and workloads to be connected to the corporate network. For a remote workforce, this means extending the network via VPN where each client is allocated a routable IP address on the enterprise network. Having 20,000 remote users means extending the network to 20,000 locations or homes via VPNs. These VPN termination points then become front doors anyone on the Internet can discover and attack.

For internal applications hosted in IaaS and PaaS environments, the network may be further extended to in-use cloud providers. Doing so allows attackers to inflict substantial impact on an enterprise in four steps.

Figure 11A:
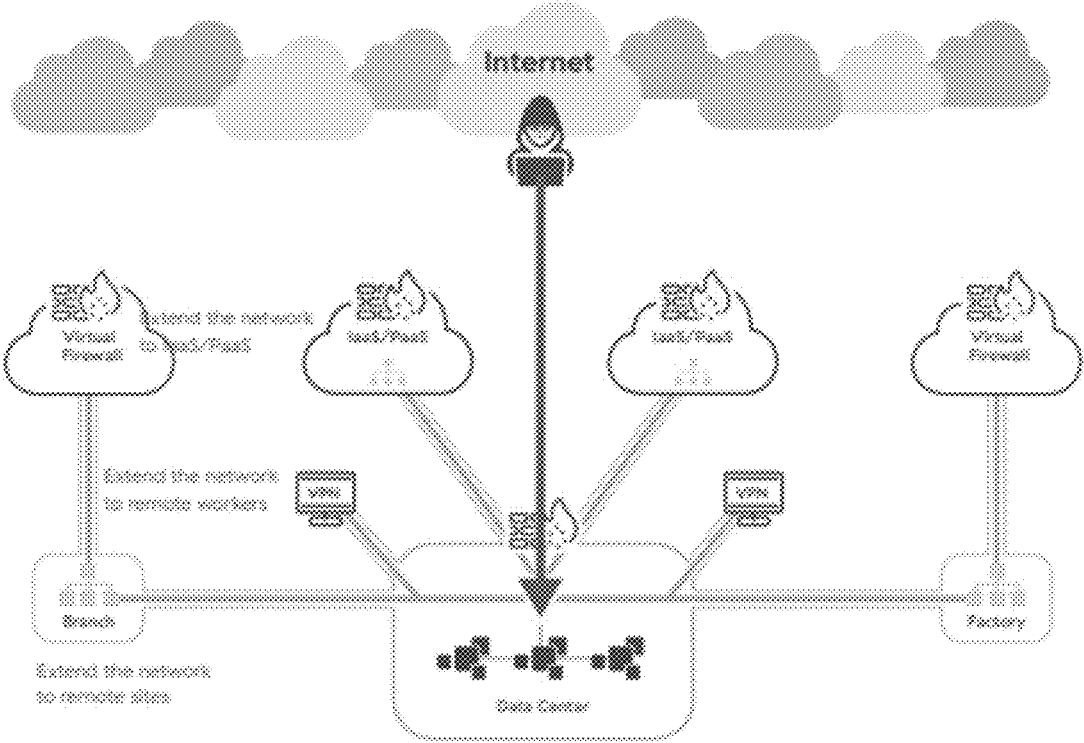
FIG. 11A-11E are diagrams demonstrating an example of a multi-step malicious attack.

FIG. 11A-11E are diagrams demonstrating an example of a multi-step malicious attack. FIG. 11A shows that, when application access requires network access, the network needs to be extended to where users, devices, and workloads are located. FIGS. 11B-11E show the four steps that an attacker may take to breach an enterprise.

Figure 11B:
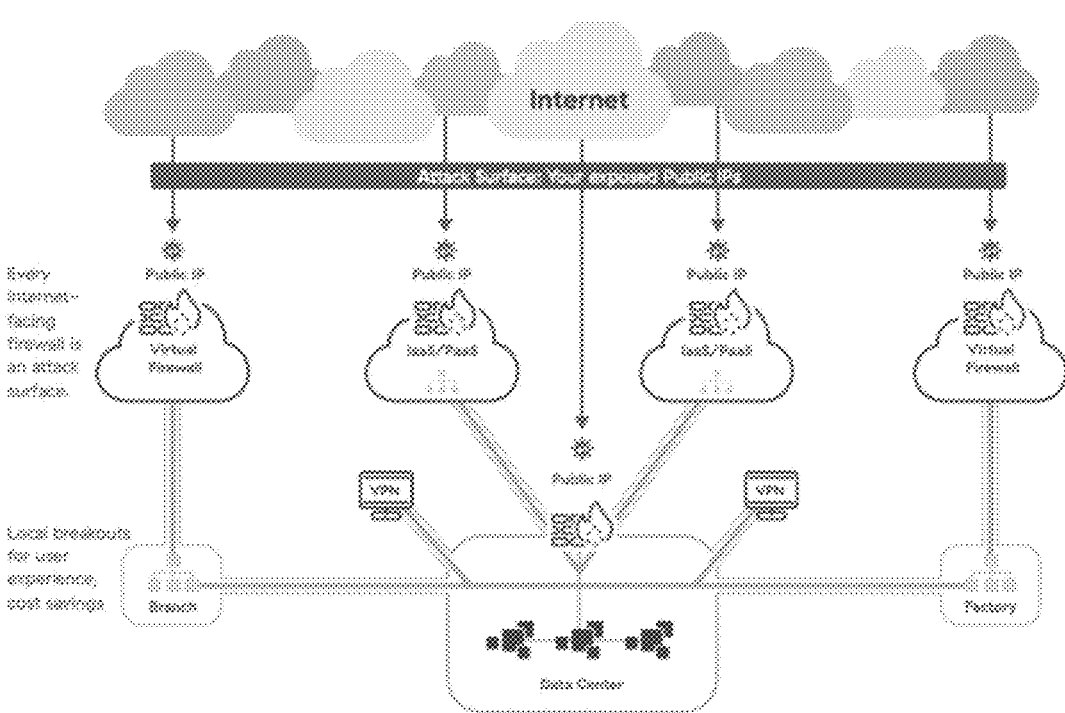

As shown in FIG. 11B, they find your attack surface. Every interconnected network may have an implicit trust in that anyone who can access these networks can connect to any application residing on them. The shared network context, be it Internet-based users connecting via VPN, workloads exposed for access (on any network), etc., ultimately leaves services open to receive a connection. The moment a service requires access from an initiator over a shared network, that service is exposed as an attack surface.

Hub-and-spoke networks have historically leveraged implicit trust to allow for connectivity, but the design also introduces performance problems when workforces and applications become distributed. To resolve this problem and its associated costs, many companies deployed local Internet breakouts to route traffic directly. Virtual firewalls can be deployed to protect these breakouts, but this also increases their Internet attack surface.

Internet-facing services, including firewalls—whether in the data center, cloud, or branch—can be discovered, attacked, and exploited. Remember, firewalls connect networks and attempt to apply controls at that network layer. The moment access is needed, an ingress network listener may be exposed. Subsequently, this exposed network listener is open to anyone and anything that shares this network, which could ultimately be the entire Internet.

As shown in FIG. 11B, they find you and compromise you. Everything exposed to the Internet is essentially your attack surface. Cybercriminals bypass conventional detection methods by exploiting the trust of common services. Attackers either directly target your exposed services (e.g., firewalls, VPNs, workloads) or entice end users by hosting malicious content. Firewalls and antivirus appliances, which once provided adequate protection, are anchored in a centralized network control point that hasn't kept up with the pace and sophistication of modern users, apps, and modern-day attacks. It is not a matter of if you will be compromised, but when. With an exposed attack surface, the organization is subject to both randomized and targeted attacks.

Attackers identify and target a corporation's weakest links to access its network. Once inside, they establish a beachhead, ensure they have multiple paths back into the network should the original entry point be secured, and begin scanning for high-value targets.

Figure 11C:
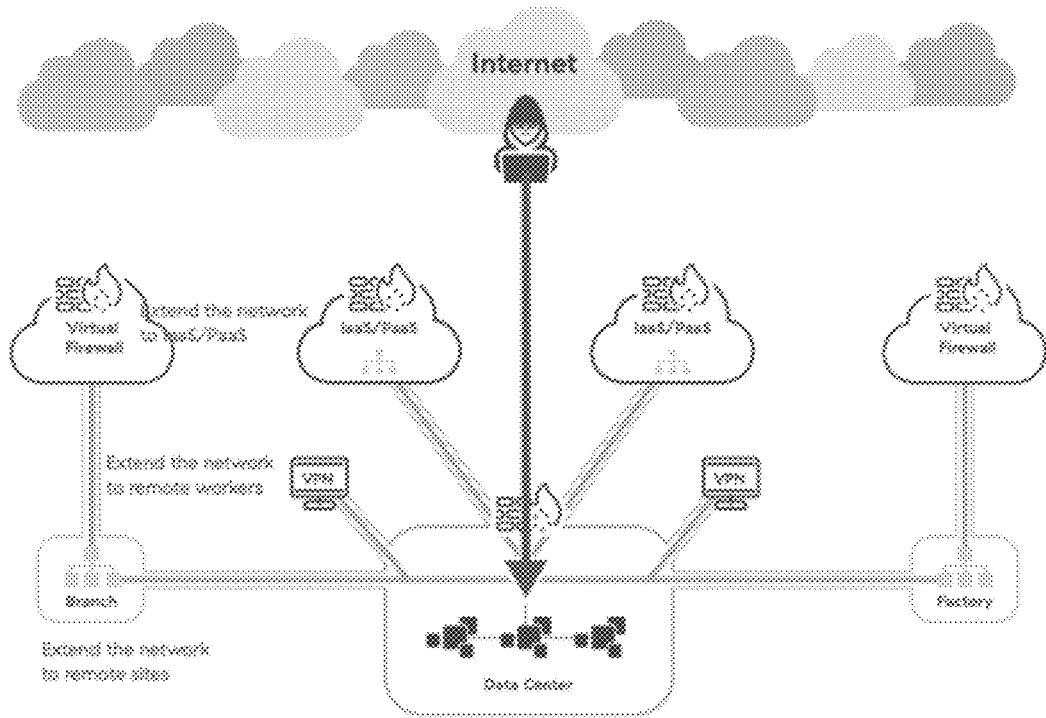

As shown in FIG. 11C, they compromise you, infecting users, devices, and workloads. They might do this by moving laterally. Extending networks for added functionality based on the principle of a shared network context allows for easy access, as users and apps are both on the network. But it also provides the same easy access to infected machines since network-based controls have difficulty controlling lateral or east-west movement across the breached network. A single infected machine in a user's home—or an infected workload in a public cloud—that shares the trusted network context can access applications, giving it the potential to cripple a business.

Figure 11D:
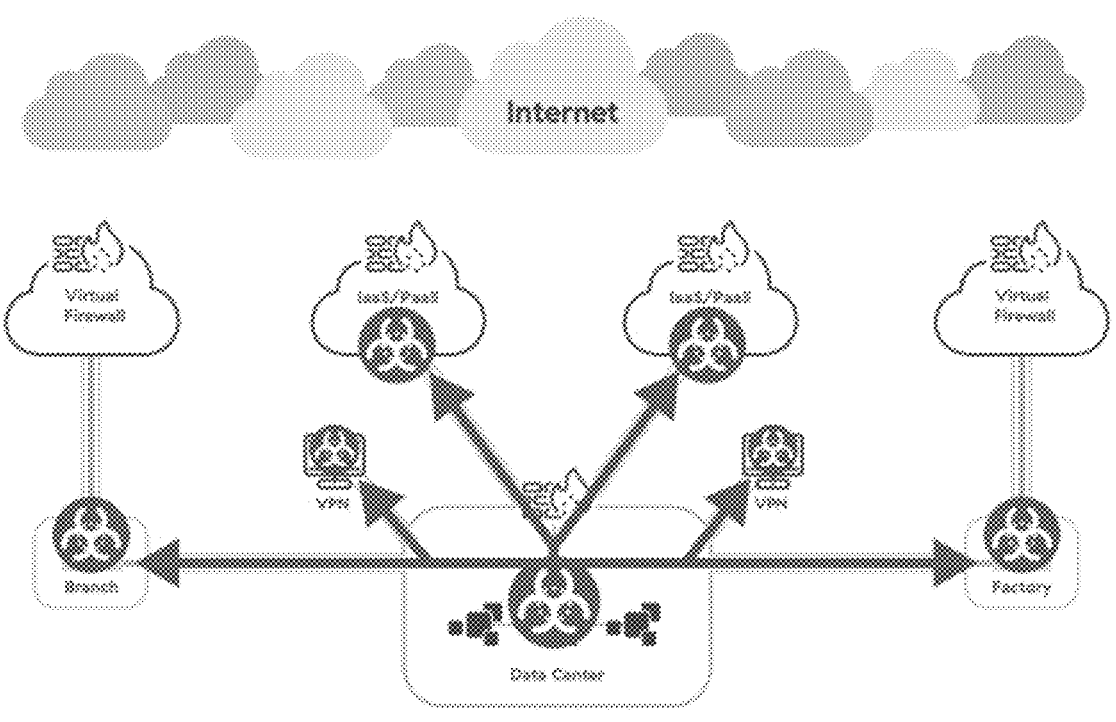

As shown in FIG. 11D, they move laterally, finding high-value targets for ransomware and other attacks. Also, they steal your data. After discovering and exploiting high-value assets, attackers will attempt to leverage trusted services like SaaS, IaaS, and PaaS—as well as known and accepted protocols like standard HTTPS encryption—to set up backchannels and exfiltrate data. An example is the Colonial Pipeline breach, where an attacker was able to use stolen VPN credentials to enter a corporate network, move laterally to access sensitive financial data and disrupt operations, and ultimately hold a piece of U.S. infrastructure for ransom—a practice known as ransomware.

Ransomware at a glance may include, for example:
1. Extortion: Attackers render enterprise information unusable and demand money for its return.
2. Double Extortion: Attackers threaten to release enterprise information if not paid.

3. Triple Extortion: Attackers leverage the stolen information to inflict additional damage, e.g., DoS of the customer or the sale of customer data in order to apply additional pressure.

Attackers continuously refine these tactics and have adopted double and sometimes triple extortion techniques to increase their chances of collecting payment by threatening to leak customer data or cripple operations.

Figure 11E:
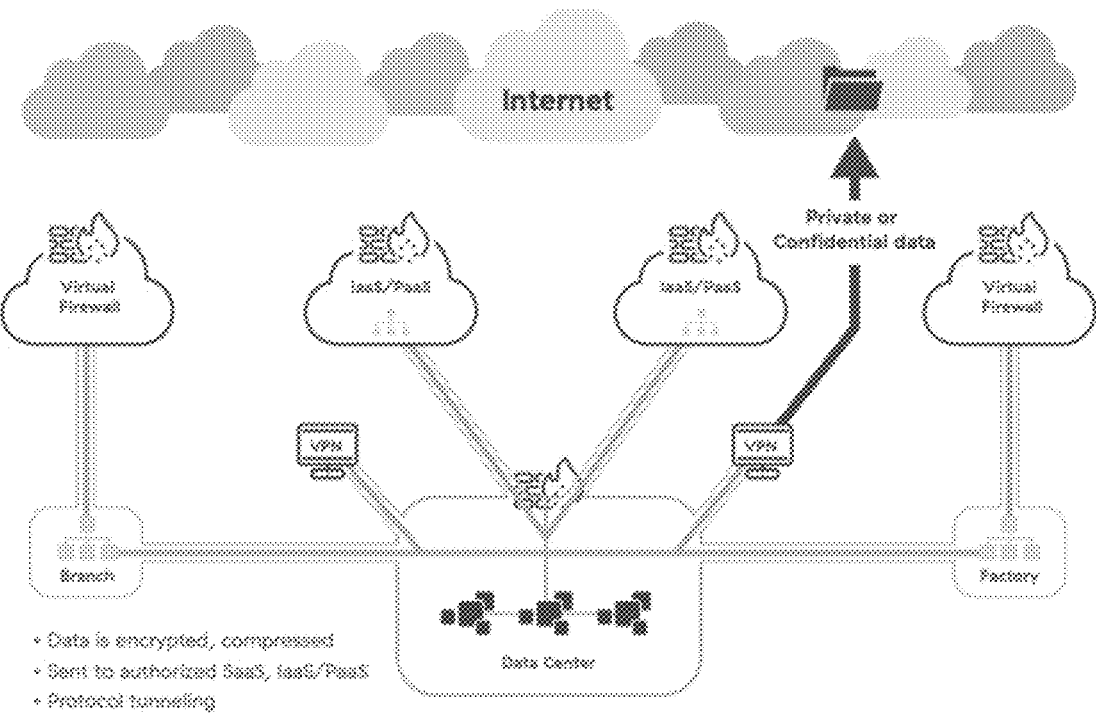

As shown in FIG. 11E, they steal your data and avoid firewall detection. Vulnerabilities inherent to legacy network and security architectures highlight an obligation to evolve the design into something radically different that addresses modern day attacks and exposure. This evolution involves both a network and security transformation, enabling a more ubiquitous and granular policy construct, and at the same time enabling digital transformation. The answer is a zero trust architecture that removes the attack surface and provides secure connectivity between users/devices, IoT/OT devices, and workloads, wherever they may reside.

Introducing Zero Trust Architecture

The challenges caused by legacy network and security architectures are pervasive and long-standing and may require a rethinking of how connectivity is granted in the modern world. This is where zero trust architecture can be leveraged—an architecture where no user or application is trusted by default. Zero trust is based on least-privileged access, which ensures that trust is only granted once, identity and context are verified, and policy checks are enforced.

NIST defines the underlying principle of a zero trust architecture as "no implicit trust granted to assets or user accounts based solely on their physical or network location (i.e., local area networks versus the Internet) or based on asset ownership (enterprise or personally owned)." It's an overhaul of the old proverb: "Never trust. Always verify."

This approach treats all network communications as hostile, where communications between users and workloads or among workloads themselves are blocked until validated by identity-based policies. This ensures that inappropriate access and lateral movement is prevented. This validation carries across any network environment, where the network location of an entity is no longer a factor and not reliant on rigid network segmentation.

Figures 12, 13:
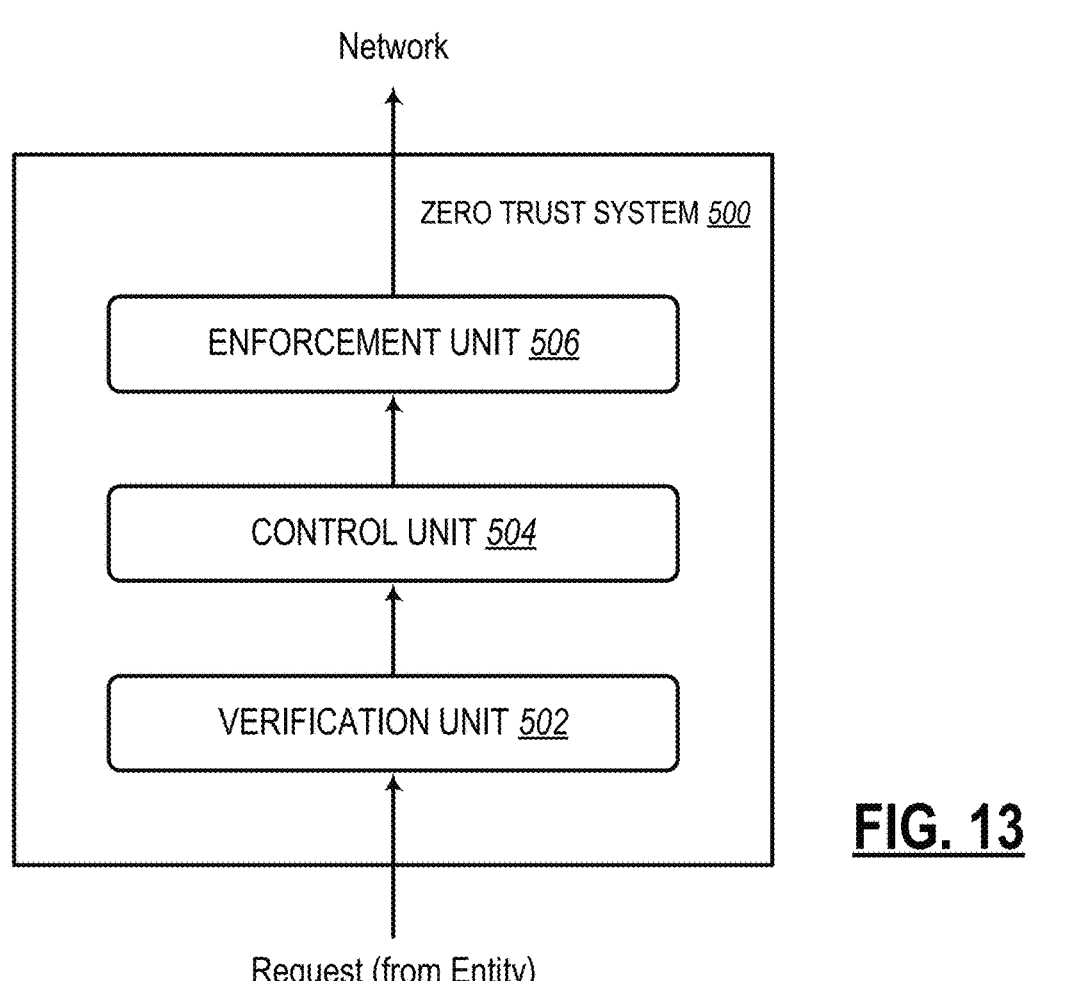
FIG. 12 is a table illustrating a high-level comparison of legacy network architecture versus zero trust architecture.
FIG. 13 is a block diagram illustrating an embodiment of a Zero Trust System, according to various embodiments of the present disclosure.

FIG. 12 is a table illustrating a high-level comparison of legacy network architecture versus zero trust architecture. Key architectural advantages of the zero trust approach versus legacy network security are summarized in FIG. 12. To fully understand zero trust architecture, it may be useful to break it down into individual building blocks (or "elements") that are executed before any connection is established. These elements ensure that enterprise services—user/devices, IoT/OT devices, and workloads—are subject to the same set of controls when requesting access to assets. According to some embodiments of the present disclosure, there may be seven elements of zero trust architecture, grouped into three categories.

FIG. 13 is a block diagram illustrating an embodiment of a Zero Trust System 500. According to various embodiments, the Zero Trust System 500 of FIG. 13 shows the three main categories mentioned above for establishing the zero trust architecture used in the embodiments of the present disclosure. For example, the Zero Trust System 500, as shown, includes a Verification Unit 502, a Control Unit 504, and an Enforcement Unit 506. For accessing a network, an entity (e.g., user, device, workload, etc.) provides a request to the Zero Trust System 500, which is received by the Verification Unit 502. The request can be manually or automatically sent to the Zero Trust System 500 depending on different scenarios.

After verification, the Verification Unit 502 communicates to the Control Unit 504 to perform control processes. The results of the verification and control processes are then supplied to the Enforcement Unit 506, which is configured to run enforcement policies for determining if access is to be allowed completely, allowed in part, blocked completely, and/or blocked in part. As described with respect to FIGS. 1A and 1B, the Zero Trust System 500 may be incorporated in the cloud-based system 100 that is communicatively between the users and the Internet 104 and cloud services 106. Thus, the Zero Trust System 500 can allow and/or block a user's access and communication with online or cloud-based services.

Figure 14:
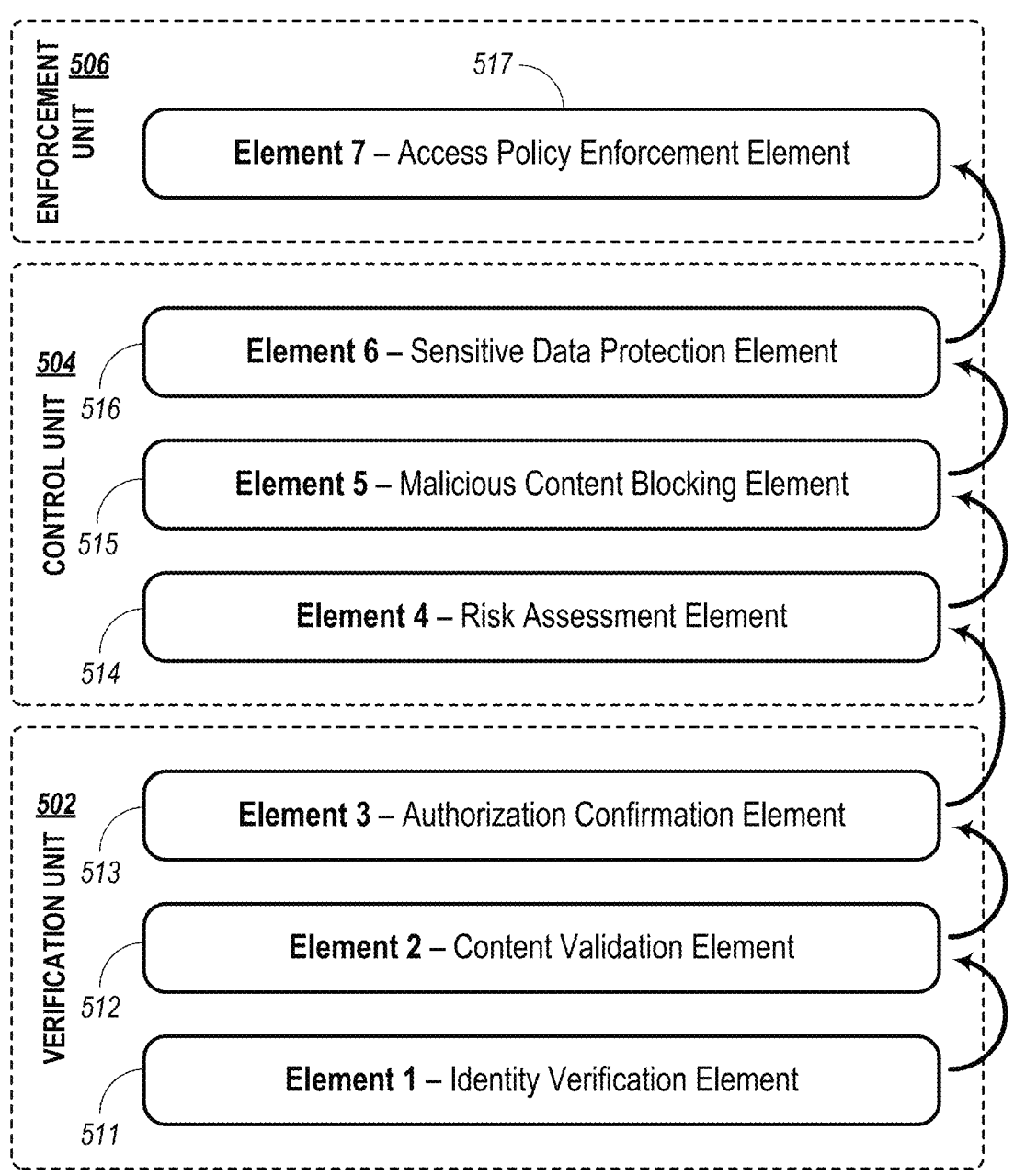
FIG. 14 is a block diagram illustrating an embodiment of the Zero Trust System of FIG. 13 having seven elements.

FIG. 14 is a block diagram illustrating an embodiment of the Zero Trust System 500 of FIG. 13, which includes a full stack of the control actions within a zero trust architecture. As shown in this embodiment, the Zero Trust System 500 includes seven elements incorporated in the Verification Unit 502, Control Unit 504, and Enforcement Unit 506. The seven elements include:

Element 1—configured for identity verification, labelled 511

Element 2—configured for content validation, labelled 512

Element 3—configured for authorization confirmation, labelled 513

Element 4—configured for risk assessment, labelled 514

Element 5—configured for malicious content blocking, labelled 515

Element 6—configured for sensitive data protection, labelled 516

Element 7—configured for access policy enforcement, labelled 517

Elements 1-3 are part of the Verification Unit 502. Elements 4-6 are part of the Control Unit 504. And Element 7 is part of the Enforcement Unit 506. The details of each of these elements are described throughout the present disclosure.

Figure 15:
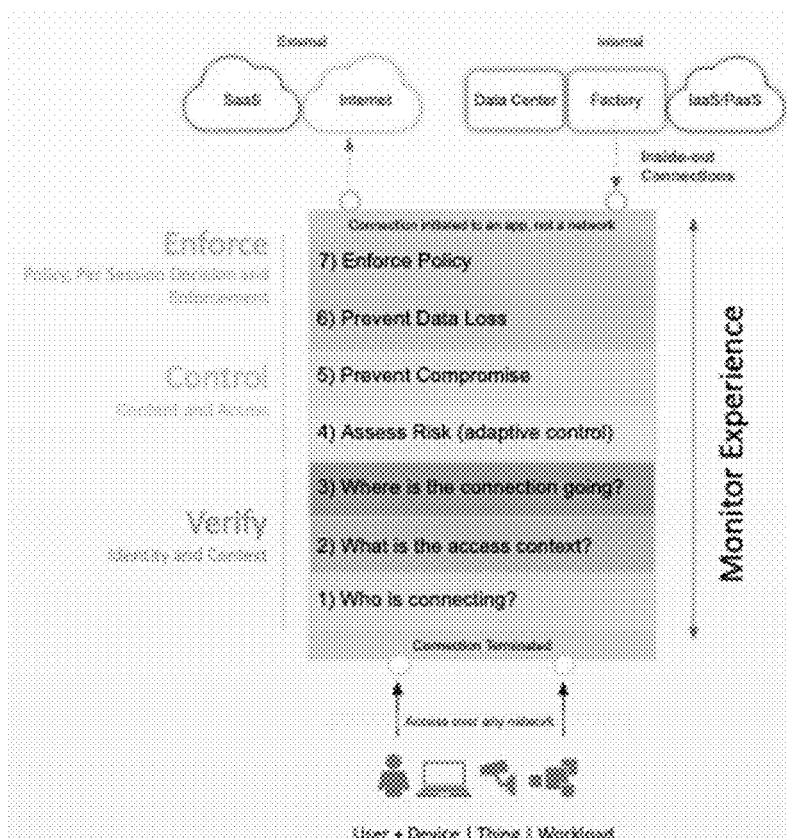
FIG. 15 is a diagram illustrating the use of the seven elements of the zero trust architecture of FIG. 14.

FIG. 15 is a diagram illustrating the use of the seven elements of the zero trust architecture of FIG. 14. The seven elements form the foundation of the zero trust design of the present disclosure.

Verify Identity and Context

Once the entity (e.g., user, device, IoT/OT device, workload, etc.) requests a connection, irrespective of the underlying network, the zero trust architecture first terminates the connection and verifies identity and context by understanding the "who, what, and where" of the request:

Element 1—Who is connecting?—This first element verifies the identity of the initiator, which could be, but is not limited to user/device, IoT/OT device, or workload through integrations with third-party identity providers (IdPs) as part of an enterprise identity access management (IAM) provider.

Element 2—What is the access context?—This element validates the context of the connection initiator, looking at attributes such as, but not limited to the role, responsibility, request time, location, and circumstances of the request. This profile data is collected from multiple sources, including IdP and third-party integrations.

Element 3—Where is the connection going?—This element confirms that the owner of the verified initiator identity has the rights and meets the required context to access the requested application or resource based on segmentation rules. This entity-to-resource segmentation is the cornerstone of zero trust.

Control Content and Access Risk

Once initiator identity and context of the requesting entity are verified and segmentation rules are applied, zero trust architecture then evaluates the risk associated with the connection request, as well as inspects the traffic for cyber-threats and sensitive data:

Element 4—Assess dynamic risk—This element leverages AI to dynamically, session by session, compute a risk score for the initiator, e.g. user/device, IoT/OT device, or workload based on factors including device posture, threats, destination, behavior, and policy.

Element 5—Prevent compromise—This element utilizes inline decryption and deep content inspection of entity-to-resource traffic to identify and block malicious content.

Element 6—Prevent data loss—This element also uses decryption and deep content inspection of entity-to-resource traffic to identify sensitive data and prevent its exfiltration through inline controls or by isolating access within a controlled environment.

Enforce Policy, Per Session Decision and Enforcement

After verifying the identity/context and controlling for risk, policy is enforced before ultimately establishing a connection to the internal or external application:

Element 7—Enforce access policy—This element uses the outputs of previous elements to determine what action to take regarding the requested connection. This action can take multiple forms, ultimately resulting in a conditional allow or conditional block.

It may be noted that the seven elements do not necessarily apply to every scenario. That is, one or more of the elements may be used in different scenarios depending on certain policies or types of traffic. For certain applications, such as VoIP, the choice may be to not inspect the content.

Each element in this process feeds into the next, as illustrated in FIG. 14, creating a dynamic decision tree that is utilized for each initiator, such as user/device, IoT/OT device, or workload-to-resource request. Every connection may be configured to evaluate identity, profile, user risk, site risk, posture, and content as criteria for deciding whether to grant access conditionally or to conditionally block, as shown in FIG. 16.

In some embodiments, the elements are configured to be performed under the condition that they do not come at the expense of the user experience. Zero trust architecture therefore is configured to be able to monitor performance and diagnose experience issues to ensure that these seven elements do not put an undue burden on the user.

Figure 16:
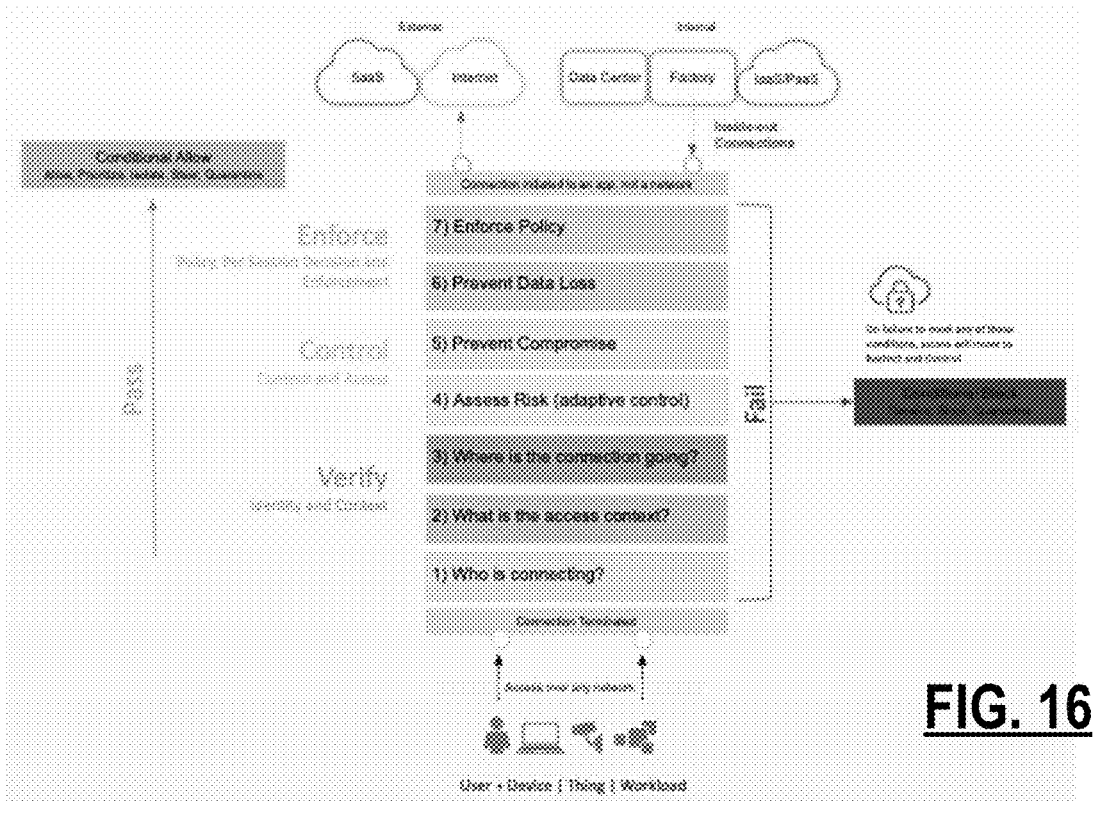
FIG. 16 is a diagram illustrating processes for allowing or restricting decisions based on zero trust principles of the seven elements of FIG. 14.

FIG. 16 is a diagram illustrating processes for allowing or restricting decisions based on zero trust principles of the seven elements of FIG. 14. This includes allow or restrict decisions based on zero trust principles of the Zero Trust System 500. Zero trust architecture can be implemented through the Zero Trust System 500. This integrated platform of services protects users and workloads using identity and context to securely broker user/device, IoT/OT, and workload communications over any network from any location. The Zero Trust System architecture secures users, applications, and data, rather than the network.

Figure 17:
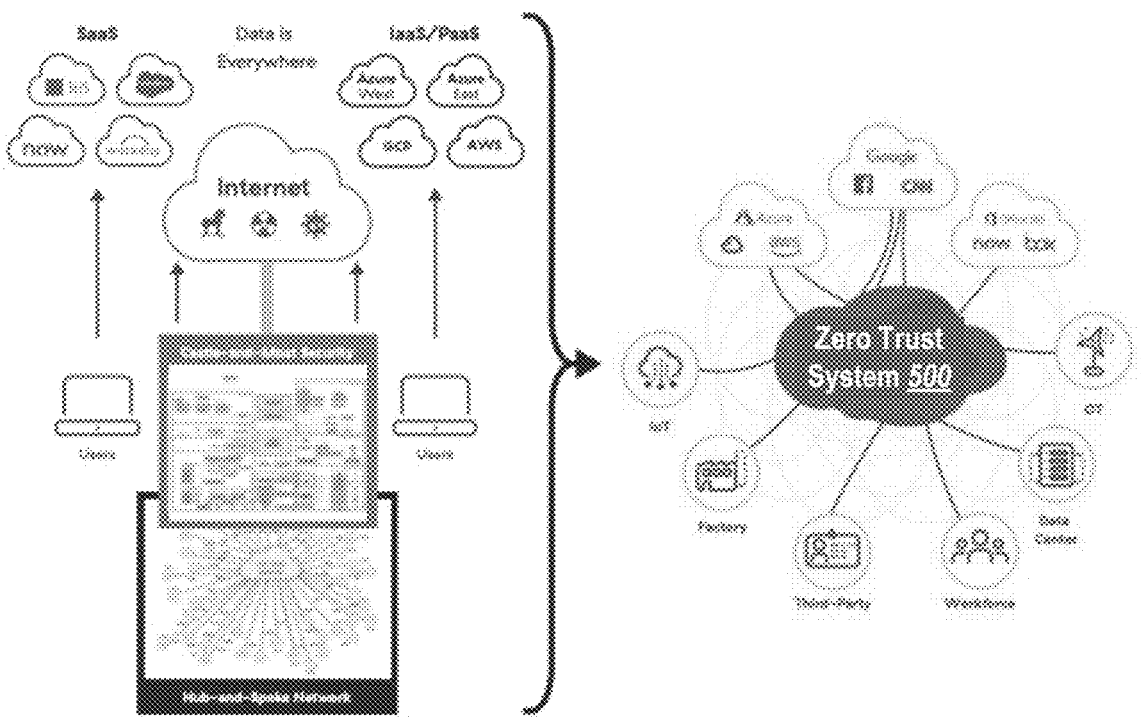
FIG. 17 is a diagram illustrating a transformation from the legacy architectures of FIG. 9 to the Zero Trust System of the present disclosure.

FIG. 17 is a diagram illustrating a transformation from legacy architectures of FIG. 9 to the Zero Trust System of the present disclosure. In some embodiments, this transformation may be related to the example of FIG. 8.

Figure 18:
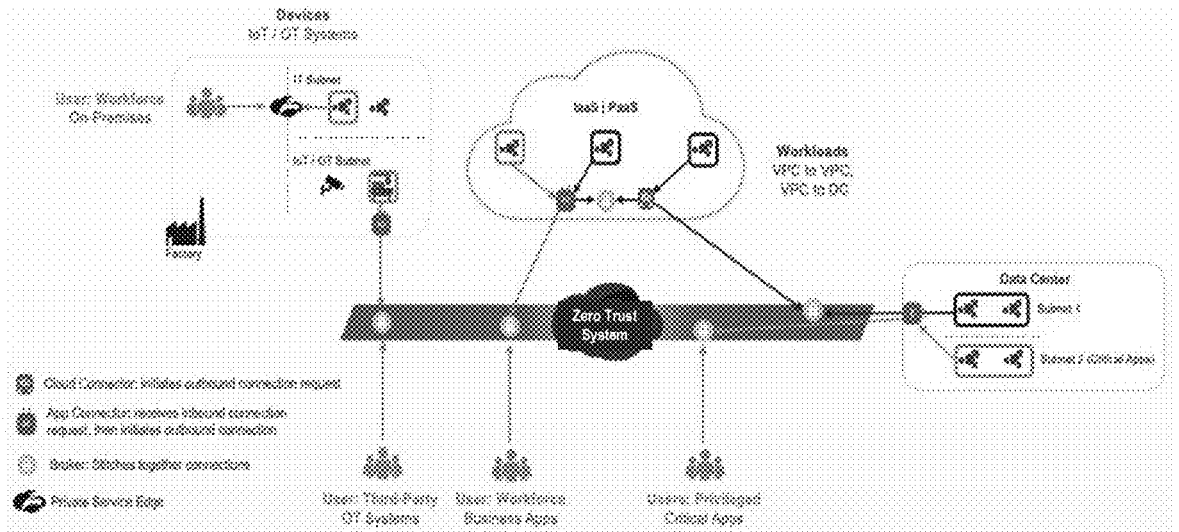
FIG. 18 is an identity-driven segmentation model using business policies to connect users, devices, and workloads over any network to prevent lateral movement.

FIG. 18 is an identity-driven segmentation model using business policies to connect users, devices, and workloads over any network to prevent lateral movement. As seen in FIG. 18, the Zero Trust System 500 uses identity-based controls to enforce policies that securely provide user-to-workload, third-party access, workload-to-workload, and location-to-location segmentation. These zero trust connections are brokered by the Zero Trust System without ever granting broad network access.

Zero Trust, SSE, and SASE

The document entitled "The 7 Pitfalls to Avoid when Selecting an SSE Solution," authored by the inventors of the present disclosure, defines and describes Gartner's Security Service Edge (SSE) in detail, while touching on the Zero Trust System 500 and its applicability to SSE and the broader Secure Access Service Edge (SASE).

The concepts of zero trust architecture, as described, relate to the broader concepts of SSE and are closely intertwined. Gartner's SSE provides a framework that combines the main elements of network security—including the Secure Web Gateway (SWG), Zero Trust Network Access (ZTNA), and a Cloud Access Security Broker (CASB), among other components—as provided from the cloud at a location near the end user. ZTNA in this context relates merely to user-to-private application access, according to Gartner's research.

Zero trust architecture may be a part of a much broader discussion beyond Gartner and NIST's narrower definitions. The Zero Trust System 500 has implemented zero trust as a core architectural component, and it may permeate through every element of the SSE framework or other networks. This includes a zero trust approach for users accessing any application (internal or external), IoT/OT connectivity, and workloads accessing resources in a multi-cloud environment or on the Internet itself. It includes not only verification but also deep inspection and enforcement at essentially every stage while dynamically controlling for risk.

Figure 19:
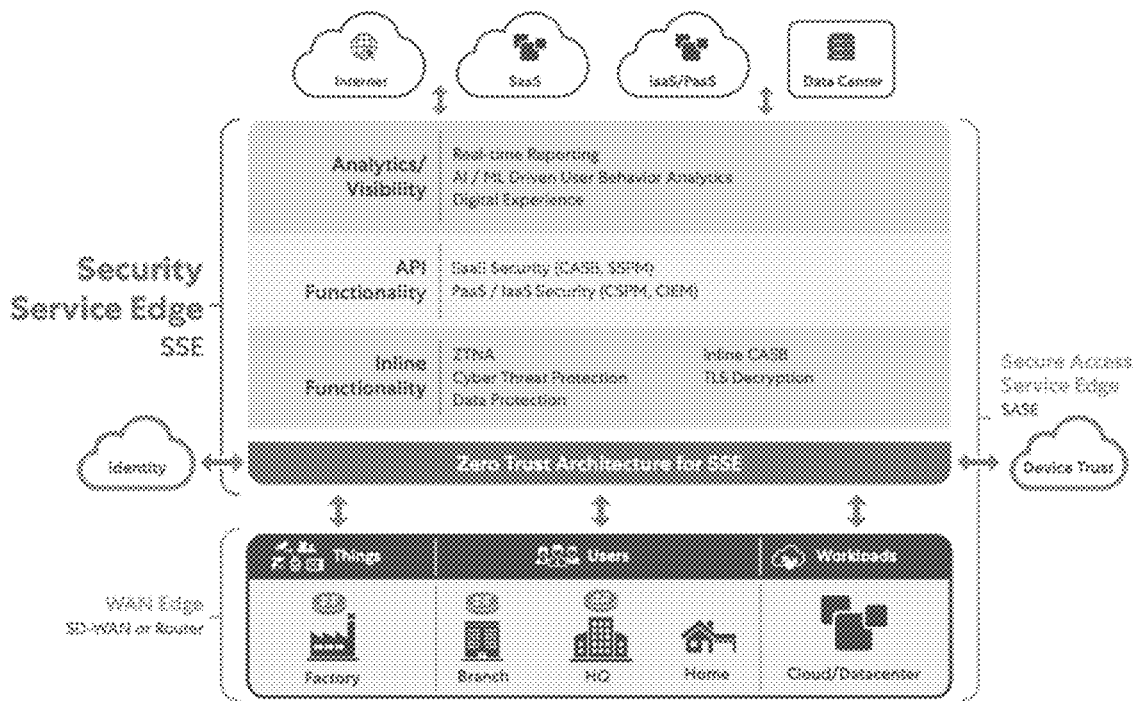
FIG. 19 is a diagram of a system in which the zero trust architecture of the present disclosure is incorporated in a Security Service Edge (SSE) and Secure Access Service Edge (SASE) system.

FIG. 19 is a diagram of a system in which the zero trust architecture of the present disclosure is incorporated in a Security Service Edge (SSE) and Secure Access Service Edge (SASE) system. SSE is a subset of the larger SASE framework, also from Gartner, that includes WAN edge components (e.g., SD-WAN) alongside SSE components. The Zero Trust System 500 may include a network-agnostic platform configured to work with any network underlay and can leverage integrations with SD-WAN vendors to provide users with a seamless experience.

The present disclosure explores and highlights each zero trust element in detail, the technology that can be used to accomplish it, architectural considerations, and how each is accomplished within the Zero Trust System 500. For each element, the present disclosure follows two example users, John and Jane Doe, on their journey through the zero trust process of accessing applications, including progress reports tracking their progression.

Connecting to the Zero Trust System

Before discussing these seven elements, the present disclosure explains how connections are established with the Zero Trust System 500. Zero trust elements are enforced via a cloud-native and globally distributed set of POPs that comprise the Zero Trust System. Users/devices, IoT/OT devices, and workloads may first establish a connection to this zero trust cloud platform, where it is subsequently terminated so security controls can be enforced.

The Zero Trust System is a highly available and globally distributed service, so that connections are requested and enforced at the most effective location to ensure the best user experience. The Zero Trust System can also be run wherever is most suitable for the enterprise, meaning that it can be within a customer's premises, cloud, or edge platform. This brings the power of the Zero Trust System as close to the consumer initiator as possible.

Zero trust connections are, by definition, independent of any network for control or trust. Zero trust ensures access is granted by never relying on a shared network between the originator (user/device, IoT/OT device, or workload) and the destination app. By keeping these separate, zero trust can be properly implemented and enforced over any network. The network can be located anywhere and be built on IPv4 or IPV6, since it is simply the means of connecting initiators to destination apps.

Figure 20:
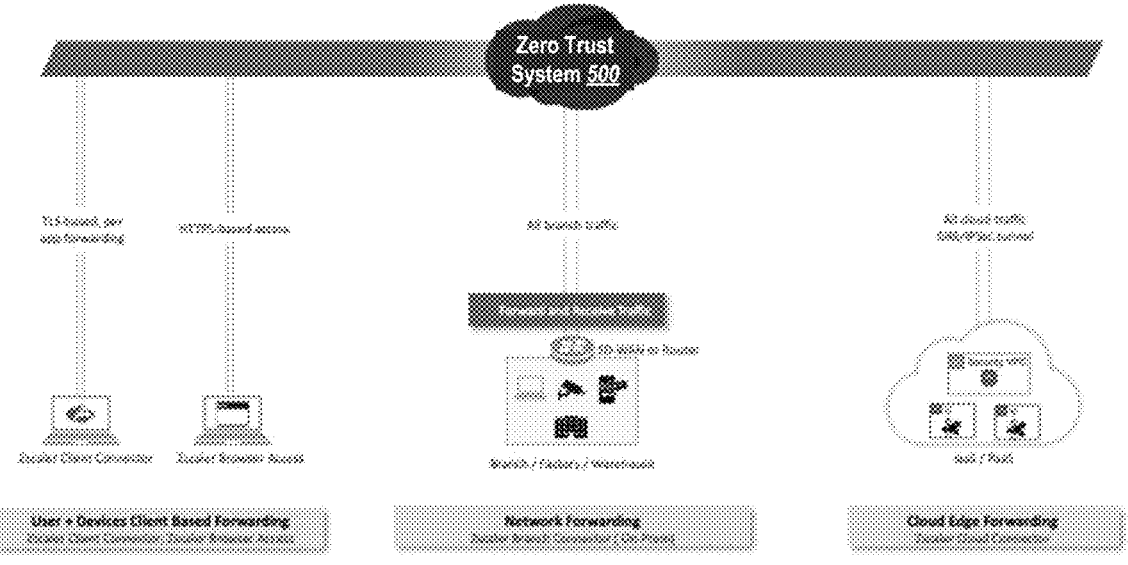
FIG. 20 is a diagram illustrating a representation of the mechanisms for forwarding traffic to the Zero Trust System of the present disclosure.

FIG. 20 is a diagram illustrating a representation of the mechanisms for forwarding traffic to the Zero Trust System 500. The architecture of the Zero Trust System 500 allows secure connections to be made in a number of ways. Most commonly, an agent called the Zscaler Client Connector can be installed on the endpoint to create a tunnel-based connection to the Zero Trust System 500 for the protection of SaaS and Internet-bound traffic. This same Client Connector also provides a persistent control plane and dynamic, micro-segmented data plane tunnels to the Zero Trust System 500 for the purpose of internal app protection. Traffic is delivered to the application via a corresponding outbound-only data plane tunnel from the Zscaler App Connector: detailed explanation of this connectivity is outlined in the section Connecting to the Applications.

In scenarios where Client Connector cannot be deployed, customers can leverage site-based forwarding options (e.g., GRE or IPSEC tunnels) to connect entire sites to the Zero Trust System. Note that connectivity to the Zero Trust System works in conjunction with SD-WAN as well as traditional edge device tunnels. Since zero trust is a network-agnostic architecture, Zscaler maintains integrations with most SD-WAN vendors so that tunnels can be automatically provisioned from an SD-WAN site to the Zero Trust System.

Site forwarding is meant to encompass all possible enterprise locations, from branches, offices, factories, and warehouses to IaaS cloud-hosted workloads, etc. Zscaler has additional form factors available to accommodate these enterprise locations. The deployment of site-based forwarding is not mutually exclusive. Devices running Client Connector can exist and operate on the sites that forward traffic to the Zero Trust System.

Zscaler Branch Connectors facilitate secure communication from these sites and can be deployed on-premises in locations like satellite offices and factories. Conversely, Cloud Connectors offer connection mechanisms from IaaS and PaaS locations, allowing protection for workload-to-workload (multi-cloud) and workload-to-Internet connections. Both the Branch and Cloud Connector variations allow bidirectional, secure communication.

For unmanaged remote user devices, where an agent cannot be installed, DNS CNAME redirects traffic to a protected, private portal. Users then authenticate against an IdP to access web, RDP-based, and SSH-based applications. This is called Zscaler Browser Access and does not require any explicit forwarding mechanism. This functionality prevents direct interaction with the services, while additional protection via browser isolation inherently prevents threats from reaching the user/server as well as provides data protection.

Once an inside-out connection is initiated with the Zero Trust System 500, that connection is terminated as the Zero Trust System 500 acts as a forward proxy. This termination initiates the seven elements, as the connection is not pass-through. Once the elements are completed, a new connection is established between the Zero Trust System and the application to complete the transaction.

Zero Trust Progress Report

As mentioned above, an architectural guide is demonstrated throughout the present disclosure showing progress reports. These progress reports show the status of the journey of two example users, Jane and John Doe. At each stage, their stats are displayed as examples of their access requests, assessments, and the ultimate policy control applied through the Zero Trust System 500.

Figure 21:
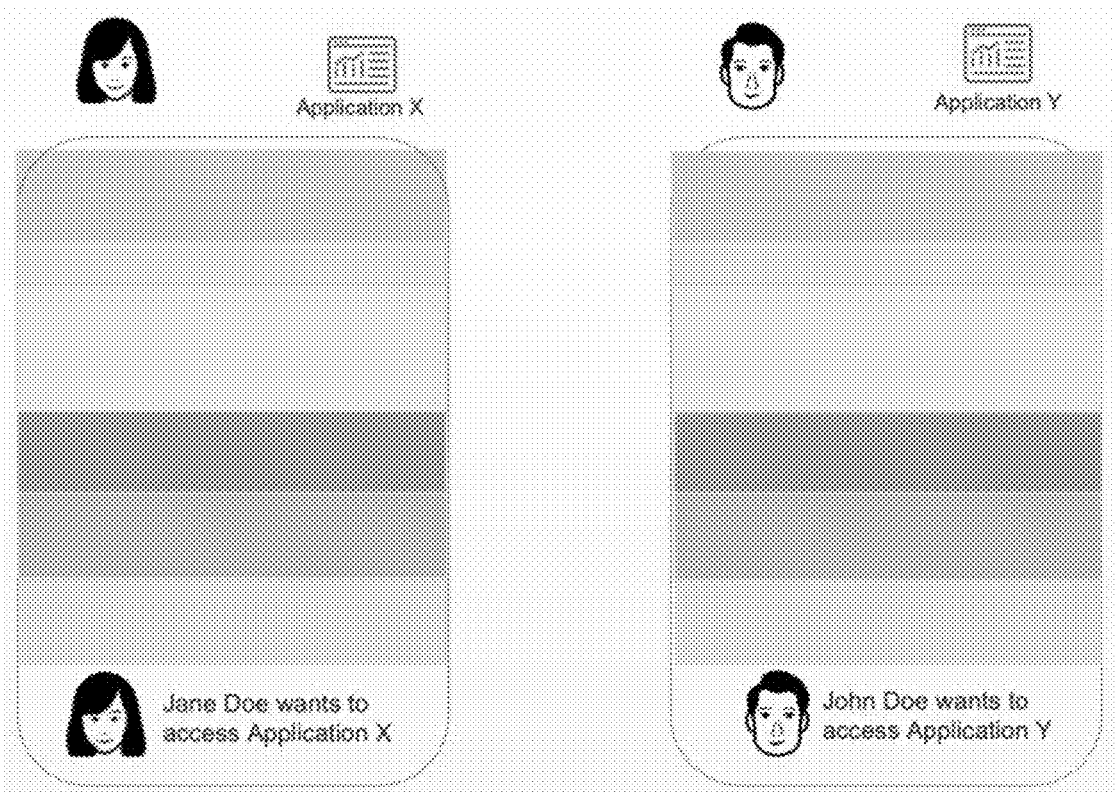
FIG. 21 is a diagram illustrating a first progress report of the status of two example users while they use the Zero Trust System of the present disclosure.

FIG. 21 is a diagram illustrating a first progress report of the zero trust journey of the two users while they use the Zero Trust System 500. The progress report, as shown, starts at zero, in which Jane and John Doe request access to applications X and Y, respectively.

Verification Unit

First Element 511

Figure 22:
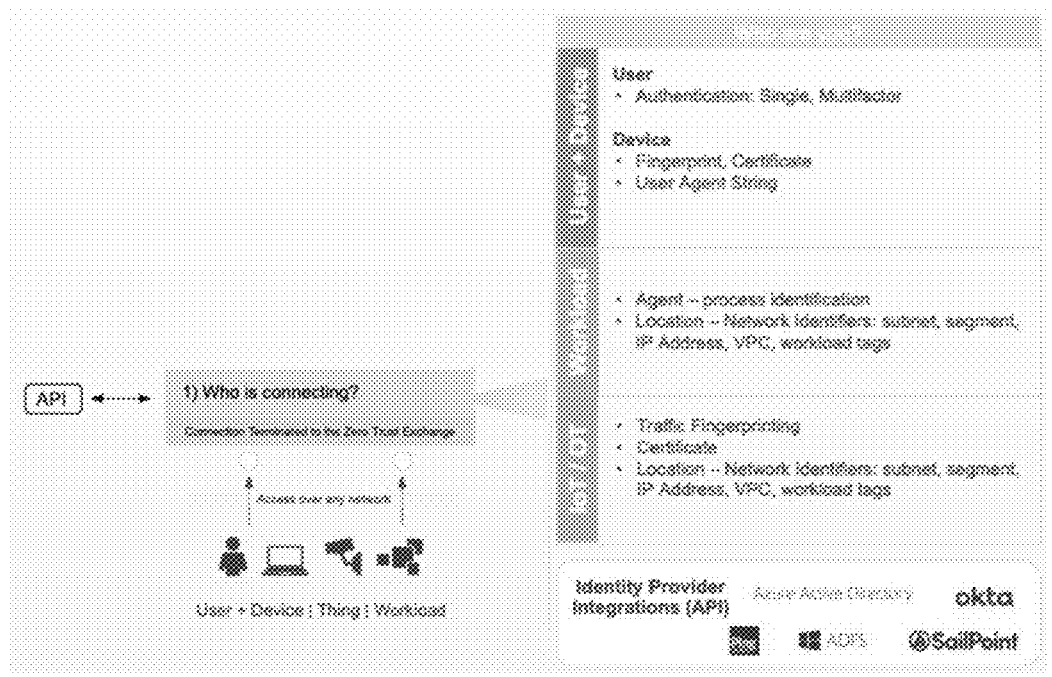
FIG. 22 is a diagram illustrating an embodiment of the first element shown in FIG. 14 for obtaining identity information.

FIG. 22 is a diagram illustrating an embodiment of the first element 511 (Element 1) shown in FIG. 14 for obtaining identity information. This first element 511 asks who you are, which is not a singular value. An initiator identity can be made up of various values, not just a user's individual identity. The first element 511 is configured to verify identity and context and asks, "Who is connecting?"

Common security wisdom states that "nothing, absolutely nothing, should ever implicitly happen." No person or thing should be allowed to access or view anything, not even the front door of the building, without first being verified and their access rights assessed. In other words, the requester may be verified before access is granted. Each requester should be treated individually and only granted access to what their identity allows. It's this initial identity verification that determines if a requester is able to proceed farther down the zero trust path. The idea of identity was formulated to understand the connection we have to groups that bind us. Today, at least outside of the enterprise, identity is a mechanism of individualization of initiators.

Within the enterprise, this definition of identity is especially apt. Employees are identified not only by who they are, but also assigned to groups that organize them. This alignment of identity and identity-based access led the computing industry to the revolutionary idea of least privilege—individuals should be granted access to specific resources based on their role's specific needs.

This may be important, for example, in that the specific, granular nature of initiator identity is the cornerstone of zero trust and the Zero Trust System 500, not only for people, but also for devices, Internet-enabled things, and workloads. These entities present a valid identity to differentiate themselves in order to gain access to allowed resources via the correct set of controls. All other access may be blocked.

Zero trust architecture is designed so that access is completely blocked until explicitly allowed. This differs from most traditional environments where network access was implicitly granted and managed via antiquated network controls. When an initiator presents the correct identity, then access may be granted only to the specific set of allowed services and nothing more. This "never trust, always verify" approach is the underpinning of zero trust architecture. Therefore, it may be significant that enterprises ensure correct integration with a trusted IdP provider.

The requesting entity's identity and profile are considered based on granular policy implemented in Element 7. For example, a verified user with the correct profile values a) may need access to SAP, b) may not need access to an IoT sensor, and c) may need access to YouTube. Whereas a verified IoT/OT device with correct profile values a) may need access to an IoT engine, and b) may not need access to YouTube. In addition, a verified workload a) may need to access a comparable workload, and b) may need access to the Internet.

In this simplified example, access policies can be ascertained solely by differentiating the type of initiator. Subsequently, identity can be further assessed and enriched with context, e.g., a valid user logging in from a company device, to deliver a more complete statement of identity (see Element 2). At this point, authentication moves from simply a contextual yes/no into an authorization stage, where values related to the authenticated identity such as role, responsibility, location, etc., can be used to further validate the initiator. By combining these values, identity control becomes quite powerful, and each identity should be unique at the moment of authorization (re-assessment will be discussed in Element 4 with dynamic risk scoring).

Technology & Architecture Considerations

One hurdle that enterprises face when getting started with zero trust is technical debt or environmental complexity. An enterprise may have laudable goals, but when it comes time to execute, these factors can obscure the starting point. Luckily, most organizations already have the baseline technology in place to begin this journey in the form of an IdP with the context of an enterprise IAM. By reviewing the types of users and role definitions within an IdP platform, IT admins can create an initial sketch of different roles within an organization. This is not to say that a zero trust identity may solely be a value delivered by an IdP. As FIG. 22 outlines, identity may consider multiple values by both asking who the entity is and also evaluating the profile of the entity. Nevertheless, an IdP platform may essentially be every enterprise's first step along the zero trust journey. After all, with least privilege, the Zero Trust System 500 may be configured such that nothing happens without validating identity.

In some embodiments, the Zero Trust System 500 may be configured to leverage HR departments or the organizational structure to define first round zero trust differentiation/segmentation (e.g., finance versus IT users). The Zero Trust System 500 may include a variety of technical features to accomplish the security checks needed for identity verification. First, a zero trust solution can establish integration with the enterprise IdP provider. This allows the zero trust solution to not only consume the output of a user identity verification but also receive updates on changes to that verification.

IdP integrations mean the zero trust solution is not the store of identity, but rather where validation and verification happen against a set of predefined controls. Common controls implemented in the IdP platform may include four common controls implemented in the IdP platform:

Two-factor authentication (2FA), such as a card and PIN

Multifactor authentication (MFA), such as a username, password, and token

Strong authentication

Password-less authentication

It may be noted that a minimum number of MFAs may be recommended to validate users.

Whatever the method, a zero trust solution may consume IdP-provided values of identity, certificates, and shared details including departments, groups, organizational units (OUs), email addresses, etc. The limit on identity values used and the values they contain may be set by the customer. What is key, though, is that these identity values may allow for differentiation among users.

FIG. 23 is a table showing a possible set of identity values and their explanations. The table shows some common examples of identity values that allow for differentiation. This element of the zero trust process may be dependent on the functionality of the IdP, including how identity is determined, managed, organized, and updated. As such, the level of identity differentiation may be unique to each company and should commonly be tied to roles as defined by HR.

For workloads and IoT/OT devices, configuring identity verification may be quite different and may vary widely depending on the deployments. The basic level of categorization may come from, but not be limited to the underlying architecture, e.g., "Manufacturing Site A" and "Machine A."

Additionally, each workload and/or IoT/OT service has a unique set of communication methods, such as destination application requests, unique headers, or other content, as part of the traffic flow that allow for device classification. Workload and IoT/OT identity verification using site architecture is generally based on network settings and defined trust zones within a network. In other words, "Manufacturing Site A" will have different trust settings than "Manufacturing Site B."

Further granular identity assessments are possible depending on the tools and machines in use. However, it may be best for enterprises to begin categorization with data and risk classification systems unique to each company. If the control assessment of Identity and Context cannot be met, the access may default, as outlined in FIG. 16, to a Conditional Block policy.

The Zero Trust System 500 may accomplish this, for example, by the following. For users, this stage of the zero trust journey may begin with robust APIs and standards-based integrations with an IAM, IdP, and other vendors. These enable the ingestion of user identity attributes via Security Assertion Markup Language (SAML), System for Cross-domain Identity Management (SCIM), or Open Authorization (OAuth).

Identity integration within the Zero Trust System 500 may be implemented in various categories. This allows enterprises to integrate identity values depending on the need to assess levels of trust. For example, users may not be authenticated, but are all within the bounds of a location, which has a distinct control policy. The zero trust solution may include incorporating user and location identity values in the Zero Trust System 500.

User Identity

The Zero Trust System 500 may have deep integrations with the following IdP partners: 1) Microsoft Azure AD (SAML & SCIM), 2) Okta (SAML & SCIM), 3) PingFederate (SAML & SCIM), 4) SailPoint (SAML), among others. Also, the Zero Trust System 500 may also be able to integrate with other common IdP providers who authenticate and share authentication values via SAML, including, for example, 1) OneLogin, 2) Google, 3) Microsoft ADFS, 4) CA Single Sign-On, among others. These integrations collect common individual attributes an enterprise would provide to differentiate a user, including those mentioned in FIG. 17 (e.g., departments, groups, email addresses, etc.).

As shown in FIG. 23, examples of different identity values are taken from a production Zscaler platform. Zscaler then combines identity data with additional device profile information, sometimes via APIs, from other third-party systems (e.g., endpoint detection and response (EDR) vendors) to understand the holistic identity of the user. Understanding an authorized user under various device-based circumstances also allows an enterprise to deliver access controls for users at differing levels of risk. Employees connecting from company-trusted devices should normally have a higher level of access than employees connecting from personal devices, for example. This contextual assessment is outlined in Element 2.

Location Identity

Circumstances may arise where enterprises need to deliver protection and control for users, workloads, and other miscellaneous devices, but are unable to differentiate between them. A common example would be a shared campus network that contains users, printers, and other devices, where the enterprise may not want to validate any of these initiators. This identity is not necessarily granular. By leveraging this location identity, the enterprise can define policies solely for this location.

For IoT/OT Devices and Workloads

IoT/OT devices and workloads that cannot perform authentication against an IdP may normally require alternative methods to validate the connection source. For example, Zscaler employs unique technology that fingerprints and classifies IoT/OT devices based on their behavior, e.g., a printer will act differently than a camera. In most cases, these devices will be outliers on a device validation path and trust should be determined based on their location.

Workloads may undergo a similar fingerprinting through Zscaler's identity-based segmentation capabilities. Here, an agent can be installed on a workload to ascertain its identity based on a set of characteristics, process functions, permissions, and other local device information. An example is a customer-hosted API that communicates with an AWS workload. No identity can be validated against an IdP, nor is it a managed or an unmanaged device. Therefore, leveraging its location is key to establishing its identity.

Workload or IoT/OT communication origins allow an enterprise to architect sites, zones, or "bubbles" that can be considered an identifier. An example would entail an enterprise isolating "file share servers" within a bubble reserved solely for file share servers. This allows the enterprise to determine identity based on functionality. Associating location-based values to devices and workloads allows for varying conditions to dictate the identity and ultimately enable the Control and Enforce functions of the zero trust platform.

FIG. 24 is a diagram illustrating the Zero Trust System 500 used to ensure that granular controls are applied to Internet of Thing (IoT) devices, Operational Technology (OT) devices, Industrial IoT (IIoT) devices and IoT/OT workloads. Zero trust identity at an IoT/OT and workload level is meant to ensure the appropriate initiating workload can communicate with a destination workload only if authorized to do so. The Zero Trust System 500 may leverage the following broad workload identities:

Locations of workloads, defined by customers to differentiate sites, e.g., DCs versus IaaS Sub-location details such as a VPC, VLAN, VNET, or even network criteria that identify different sets of location variables Workload network criteria such as IP anchors, connection gateways, etc. (This may rarely be used as a sole value of identity. Best practices may recommend not using IP addresses alone as an identity value.)

Figure 25:
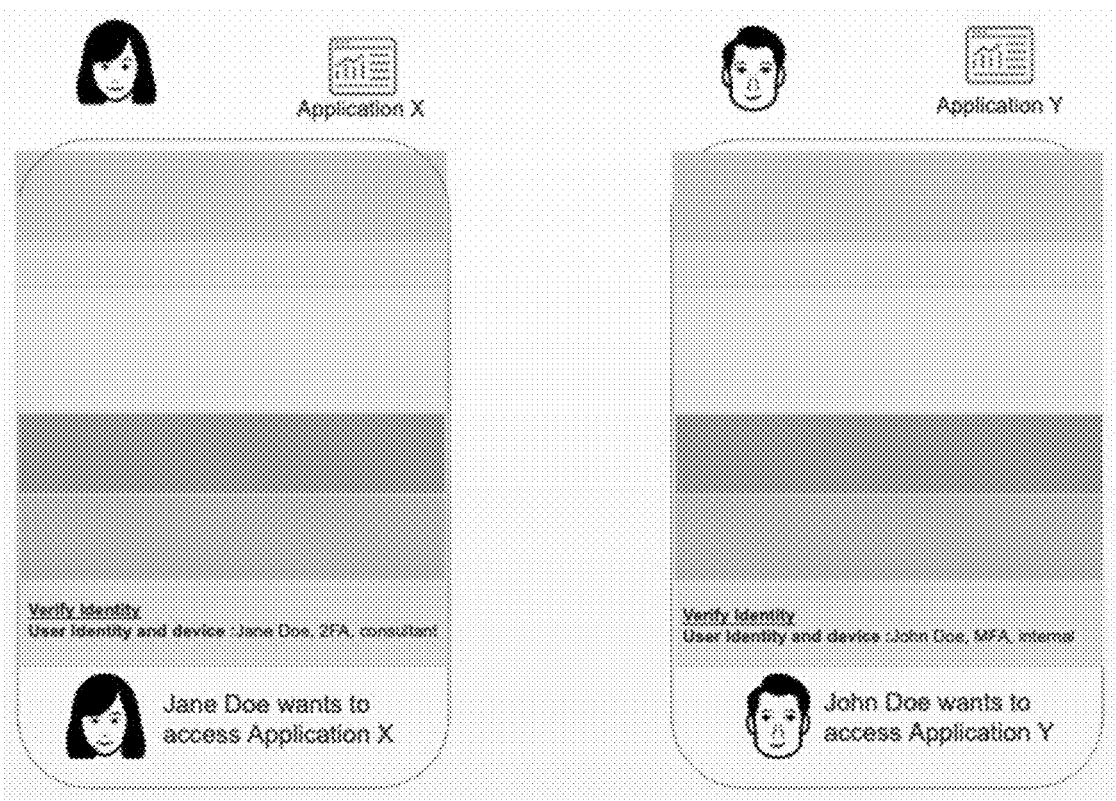
FIG. 25 is a diagram illustrating a second progress report of the status of the two example users while they use the Zero Trust System of the present disclosure.

FIG. 25 is a diagram illustrating a second progress report of the status of the two example users while they use the Zero Trust System 500. At the conclusion of identity validation, the zero trust process will submit values for risk assessment, inspection, and ultimately enforcement. This progress report verifies the identity of Jane and John Doe.

Second Element 512

Figure 26:
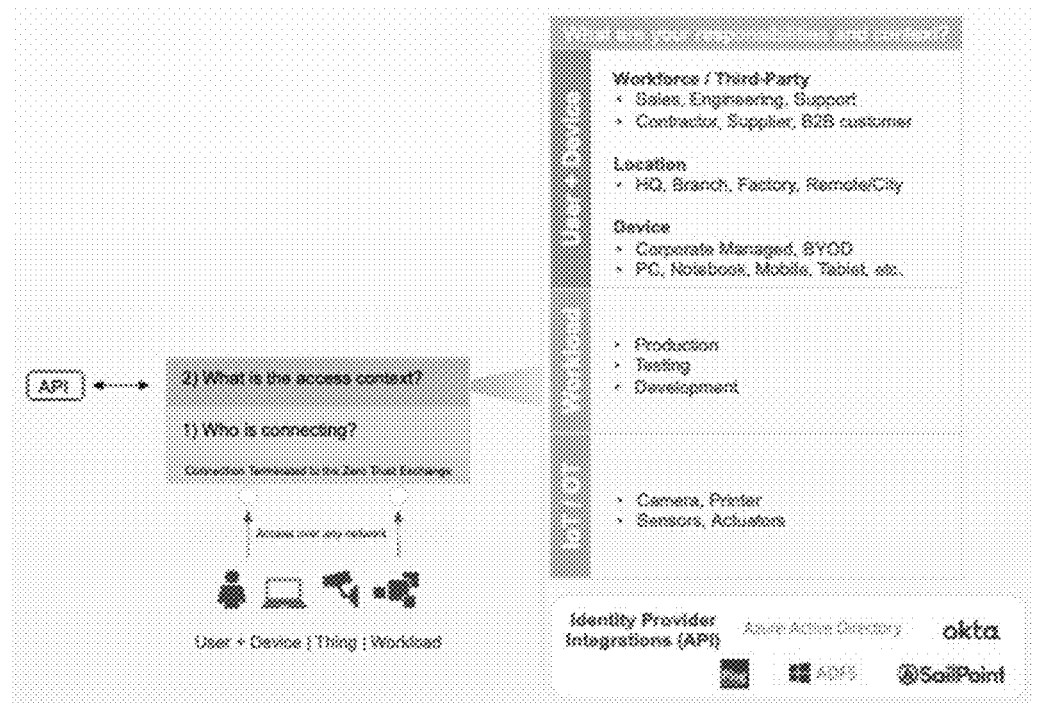
FIG. 26 is a diagram illustrating use of the second element shown in FIG. 14 to determine when access is verified and what additional criteria make up the access request.

FIG. 26 is a diagram illustrating use of the second element 512 shown in FIG. 14 to determine when access is verified and what additional criteria make up the access request. Element 2 asks the question, "What is the access context?" or "When access is verified, what additional criteria makes up the access request?"

Confirmation of the initiator (consumed in Element 1) is the first step initially verifying "who" requests or attempts access. Identity gives the Zero Trust System 500 an idea of who is connecting, their role and responsibilities, but might lack context around the connection.

Identity is initially considered the ability to deliver a "yes" or "no" binary output based on the initiating entity being authenticated or not. Now we can associate the details of who is connecting with the context of that connection, which allows for additional control of least privilege zero trust. This is made possible by leveraging various identity and profile values at a granular level.

Context in the identity space reveals various insights about the initiator. Continuing the example from Element 1, an employee may identify as Jane Doe. This can be validated by the enterprise IdP. Additional context, however, can be used to further verify their intent, their abilities, and ultimately allow for greater definition of identity.

To demonstrate this context, this time using a workload, the identity may be as simple as two RESTful API processes, let's call them "device-tickle" and "receive-name." The context in which these APIs are enabled and employed is what differentiates them from other API calls and processes. Let's compare these two APIs with contextual differences bolded and underlined:

device-tickle: Calls a remote device and uses an HTTP PUT function to tell the remote device "hello." Note: This is through JSON (JavaScript Object Notation). This could be used to confirm the remote device is still online.

versus receive-name: A service that asks the remote device (through an HTTP GET) to share its name. Note: This is in the format xml (extensible Markup Language). This call can be used to receive information about remote services.

In these access examples, while both are similar in that they are using the HTTP protocol to execute their function, there are fundamental differences beyond simply the initial identity (name). Given one's ability to prove the variable context, access should be different.

Context passes verification:

device-tickle: called at 9:00 a.m. on Monday, from a trusted DC, through a secure path Context fails verification:

device-tickle: called at midnight on Sunday, from a remote site

Zero trust controls allow an enterprise to set granular rules around the context in which device-tickle and receive-name can communicate and access services. This level of contextual granularity can be expanded to many aspects within an enterprise and are not solely related to workloads. The contextual values may be considered for each enterprise's requirements and included in the Verification of Identity.

This may be significant in the same way that a Netflix login gives the user access to Netflix, it is the things about the user—age, location, interest, viewing history, etc. This allows Netflix to recommend shows that will most interest the user.

Enforcement of control in zero trust architecture cannot be enabled simply based on who you are. There may be additional applicable understanding and control to set boundaries for access. For example, you may be an authenticated user, but to get access to necessary services, you may need verified context to prove several additional aspects:

The location you are accessing from (country, site, etc.)

When you requested access (within or outside timeframes)

How you are accessing (normal patterns vs. exceptions)

Which device you are connecting from (personal vs. enterprise)

Technology & Architecture Considerations

Each enterprise will have differing requirements to ensure the correct context is applied within their ecosystem. As such, enterprises may consider the following high-level categories of context:

Trusted Versus Untrusted Locations

A trusted location may be governed by enterprise-defined conditions that reduce its risk profile. An example would be an R&D lab where network resources are local, isolated, protected, and where an enterprise can ascertain which functional controls can and cannot exist. On the other hand, an untrusted location may be a campus-wide guest network where users connect to the Internet with zero access controls. It may be noted in this respect that a location does not need to be specific to a site, but it can be as broadly defined as a country.

Defined Versus Undefined Locations

A defined location may be an enterprise office space where users are more trusted than on the open Internet. Defined locations may have specific policies applied to them, e.g., user office networks can access the Internet, but office server networks cannot. These sorts of network divisions were historically managed by VLANs. An undefined location, on the other hand, would be anywhere not specifically defined, such as a user's home network.

Geographic Considerations

Defining geographic controls is important not only for security but also for functionality. From a security perspective, user access from specific sanctioned countries should be controlled. From a functional perspective, users should be able to access global resources like google.com in their native language, for instance. Geographic controls can also be used to stop the "impossible traveler" who accesses one service from their device in Sydney followed by an additional service from a location in São Paulo in quick succession.

Timing Bands

The time that a user requests a connection to an application is another contextual attribute zero trust architecture can base policy on. Users accessing certain sites outside of working hours would constitute a different contextual posture versus during business hours.

Device Type

Access to services should vary depending on the device requesting the access. For users, the following context should ultimately define various levels of access:

Personal vs. enterprise device

Operating system

Installed antivirus

EDR presence

Consider two examples, where the context is very different:

Jane: On her personal device with an unpatched operating system and no antivirus John: On an enterprise device with an up-to-date operating system and EDR running Similarly, when defining IoT/OT and workload access context, the requesting device plays a larger role in determining access context:

IoT process on a manufacturing sensor

OT human-machine interface (HMI)

In both of these examples, contextual details differentiate the access granted.

Of course, additional contextual mapping is possible as an enterprise builds granularity. That said, it's important to maintain the initial idea of zero trust, which states that the underlying network can be considered breached and therefore untrusted. An enterprise may operate as though all networks cannot be trusted, with traffic passing through secure mechanisms over the network.

The Zero Trust System 500 may be configured to accomplish this by the following. Given how Zscaler integrates with IdP platforms (outlined in Element 1), it may be important to look at various access scenarios to then illustrate how Zscaler provides contextual control. Understanding how to assess these devices and the level of acceptance for each can help enterprises enable various access paths.

Zscaler allows for a wide set of contextual validation integrations. These may be looked at in combination with other tests to deliver a contextual outcome acceptable to the enterprise. Having these variations of stacked device posture tests allows an enterprise to consume the outcomes of these posture assessments as an additional layer of user context in terms of control and, ultimately, policy. For user-based devices (e.g., desktops, notebooks, tablets, handhelds, etc.), we can further differentiate between managed and unmanaged devices:

Managed Devices

Managed devices are those that can be given a unique identity by an enterprise solution, such as MDM or corporate domain enrollment. These are typically corporate-owned assets where an agent can be installed. Evaluation and differentiation categories are dependent on the customer and deployment, but common contextual tests on managed devices may include a) client certificate validation, b) EDR/AV-integration, c) jailbroken or not (for handhelds), d) connected to a known or unknown network, and/or e) leveraging a trusted or untrusted location.

Note: The Zscaler Client Connector can be installed on these devices to validate these values as part of its zero trust policy without having to call out to external sources for validation. In addition, the Zscaler Client Connector is able to obtain additional insights on context from the IDP based SAML or SCIM response.

Unmanaged Devices

These are devices that have no relationship to the organization and include BYOD, third-party, or contractor devices. The ability to assess the status of these devices can be limited, making them immediately less trustworthy than managed devices. But there is a way to differentiate various unmanaged devices, e.g., a contractor working for the organization versus an employee's personal device. Access for unmanaged devices may require different access methods depending on an organization's risk tolerance.

Two common examples:

1. A trusted user connecting from an untrusted, potentially personal device. The personal device may be identified as untrusted and access restricted appropriately.

2. A third-party contractor connecting from an untrusted device. While the user is authorized, the device is not.

The contractor's access should thus be limited by leveraging Zscaler's Browser Access and Browser Isolation:

The client uses a web browser to access a URL.

This URL is actually a CNAME domain that is subsequently redirected to a trusted front-end portal for access, or isolated access, to the app.

Web isolation ensures that sensitive data never reaches the untrusted device.

This ensures the third party is able to complete the work, but the enterprise is protected.

Note: In most circumstances, the Zscaler Client Connector may not be installed on these devices.

It's possible to leverage the Zscaler Client Connector to ensure device validation can differentiate device trust compared to unmanaged devices. That value can then be used to allocate different levels of access. The following are examples of validated users using various devices: a) Validated internal user using a corporate-managed device, b) Validated internal user using an untrusted personal device, c) Validated external user (not part of primary auth domain) using an untrusted device, d) Validated third-party user using an untrusted device, etc.

Figure 27:
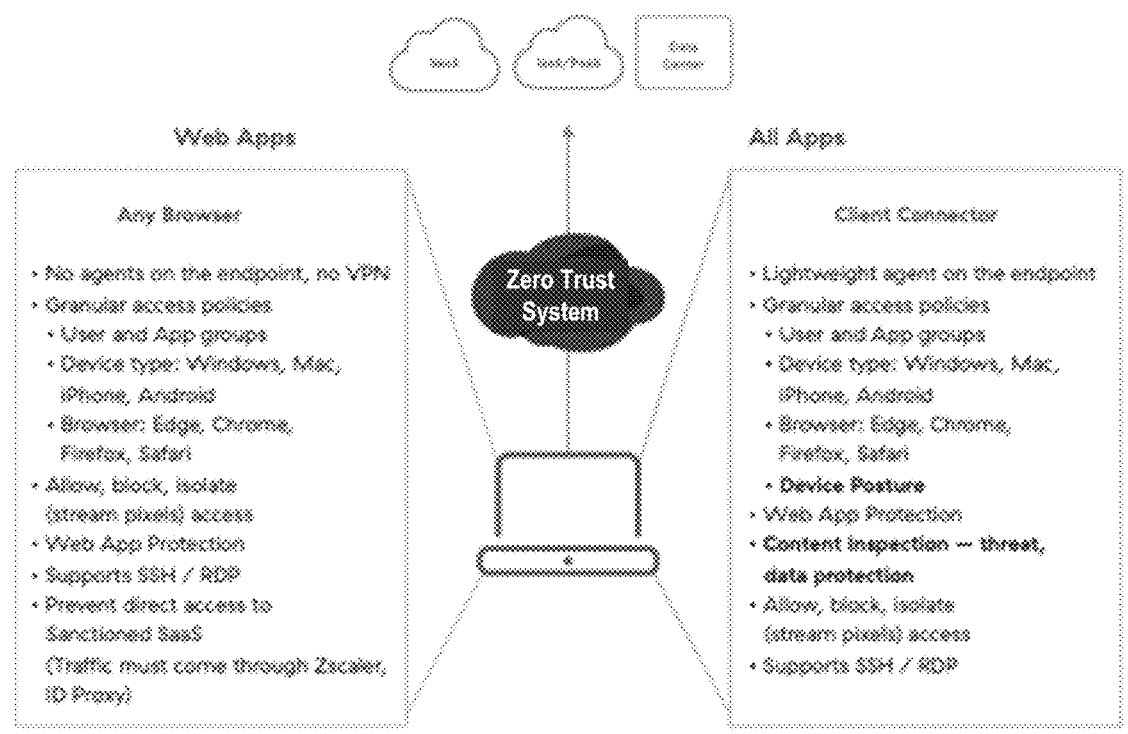
FIG. 27 is a diagram illustrating how both unmanaged and managed devices are protected by the Zero Trust System.

FIG. 27 is a diagram illustrating how both unmanaged and managed devices are protected by the Zero Trust System. Each of these identity verification/validation techniques generates an identity and context outcome to the Application Policy Enforcement engine in Element 7, where the identity can be successfully verified. If it cannot be met or if the policy requirements are not met, the user may be blocked from accessing the application.

Workloads and IoT/OT Devices

Zscaler also collects various sets of data to identify workloads. These are broken down into sub-functional groups based on the needs of the enterprise. The Zero Trust System 500 has a unique role in the implementation of control, in that it sits between the initiator and destination. Ultimately, the goal is to ensure that the appropriate initiating workload can communicate with a destination workload only if authorized to do so. Zscaler assesses the context of workload access based on attributes that include site, location, cloud, and environment level.

For connections between sites, data centers, clouds, the Internet, etc., Zscaler is able to consume network criteria, network segments, and IP information to deliver a zero trust policy of access between workloads in various sites. Connections between workloads within a location, like a VPC, can follow similar network paths and be greatly enhanced through process identity and context validation. This can be achieved and controlled through the deployment of agent software on the various workload systems. This ability of the Zero Trust System 500 to differentiate access down to a per-request basis of initiator to destination, regardless of the underlying network, allows Zscaler to deliver granular and uniform access controls to workloads.

Figure 28:
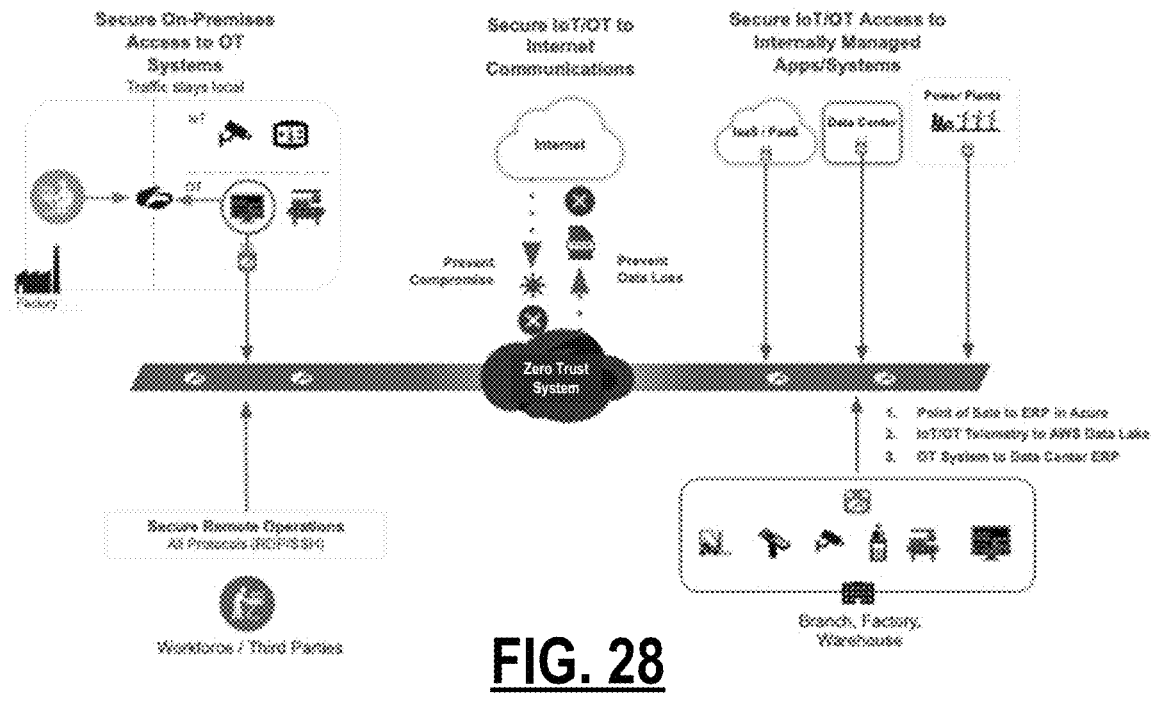
FIG. 28 is a diagram illustrating zero trust for IoT/OT systems across common access requirements.

FIG. 28 is a diagram illustrating zero trust for IoT/OT systems across common access requirements. As outlined in Element 1, IoT/OT devices may not normally be centrally authenticated today. This lack of central control also limits the ability to assign context. As such, Zscaler employs similar techniques for context identification to IoT/OT services as those outlined for workloads, connections, networks, sites, locations, etc. In these cases, context is often defined by an enterprise rather than automatically scanned or assessed by the Zero Trust System. Customers define various sites or device information that will be consumed as part of the identity and context verification. IoT/OT services and workloads may undergo a similar fingerprinting through Zscaler's identity-based segmentation capabilities. Here, an agent can be installed on an initiator to ascertain its identity based on a set of characteristics, process functions, permissions, and other local device information.

Figure 29:
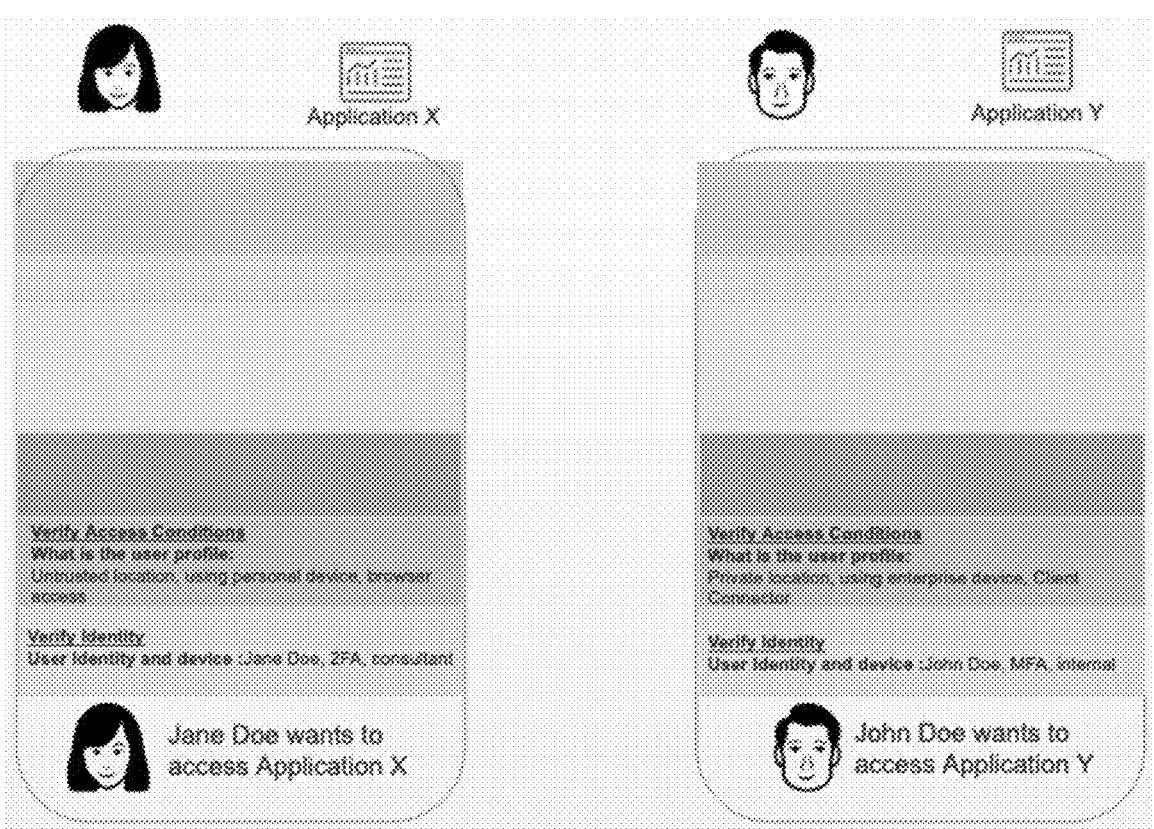
FIG. 29 is a diagram illustrating a third progress report of the status of the two example users while they use the Zero Trust System of the present disclosure.

FIG. 29 is a diagram illustrating a third progress report of the status of the two example users while they use the Zero Trust System of the present disclosure. As shown in this progress report, the user context has now been added to the access flow.

Third Element 513

Figure 30:
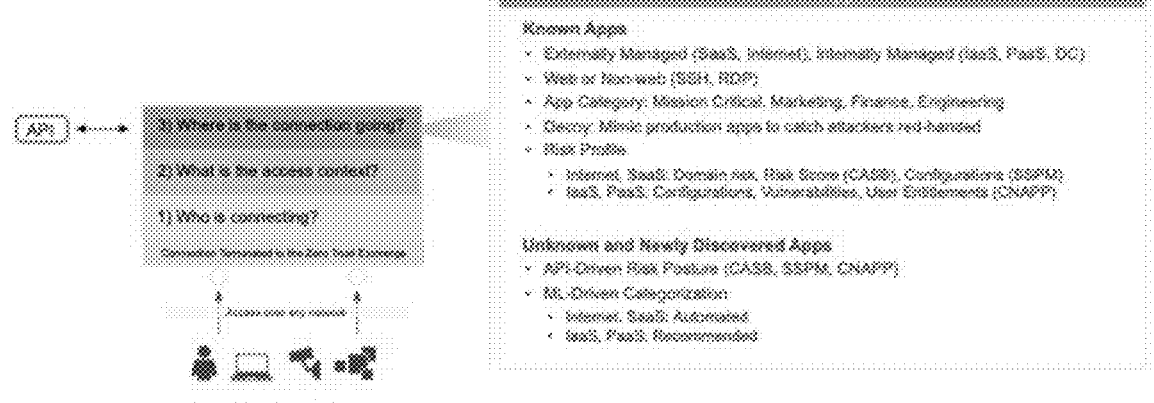
FIG. 30 is a diagram illustrating the third element shown in FIG. 14 where the application policy is determined based on a set of criteria.

FIG. 30 is a diagram illustrating the third element 513 shown in FIG. 14 where the application policy is determined based on a set of criteria. Element 3 asks the question, "Where is the connection going?"

As discussed, the first element 511 of the Verify process concludes with the initial identity assessment. The next element 512 may require understanding of the resource being requested (i.e., the application). The app is identified, but its function, location, known risks or issues, and relation to the identity of the access requester might also be evaluated. The app's condition can be understood at a high level. Examples of important considerations include whether the app is known or not, and whether the app is publicly available on the Internet. These conditions may determine how applications are submitted to the Control and Enforce phases of the zero trust process.

Determining which initiator can connect to which destination service may ultimately be an outcome of the Verify and Control phases of a zero trust solution. Zero trust services are not firewalls, which means they are neither pass-through nor static. Therefore, the implemented policy may be more than a simple definition.

This may be significant in that traditional network controls force traffic to pass through the same set of controls, regardless of the application type, location, function, etc. Firewalls are famously network-centric and attempt to add application-layer controls by layering them on top of their network function. In determining why this is important, one may recall how legacy IT controls are implemented statically based on network controls (e.g., using IP addresses and TCP port values to identify the service). This is not only limiting and subject to misconfigurations, but also inefficient to set up and maintain.

Take two common apps you may access: one internal (like an ERP platform) and one external (like YouTube). These apps have substantial differences in function, form, location, etc. With a firewall, both apps are treated the same. Controls are applied universally until the path is selected, a decision that typically happens post-control and is reliant on the network.

Figures 31, 32:
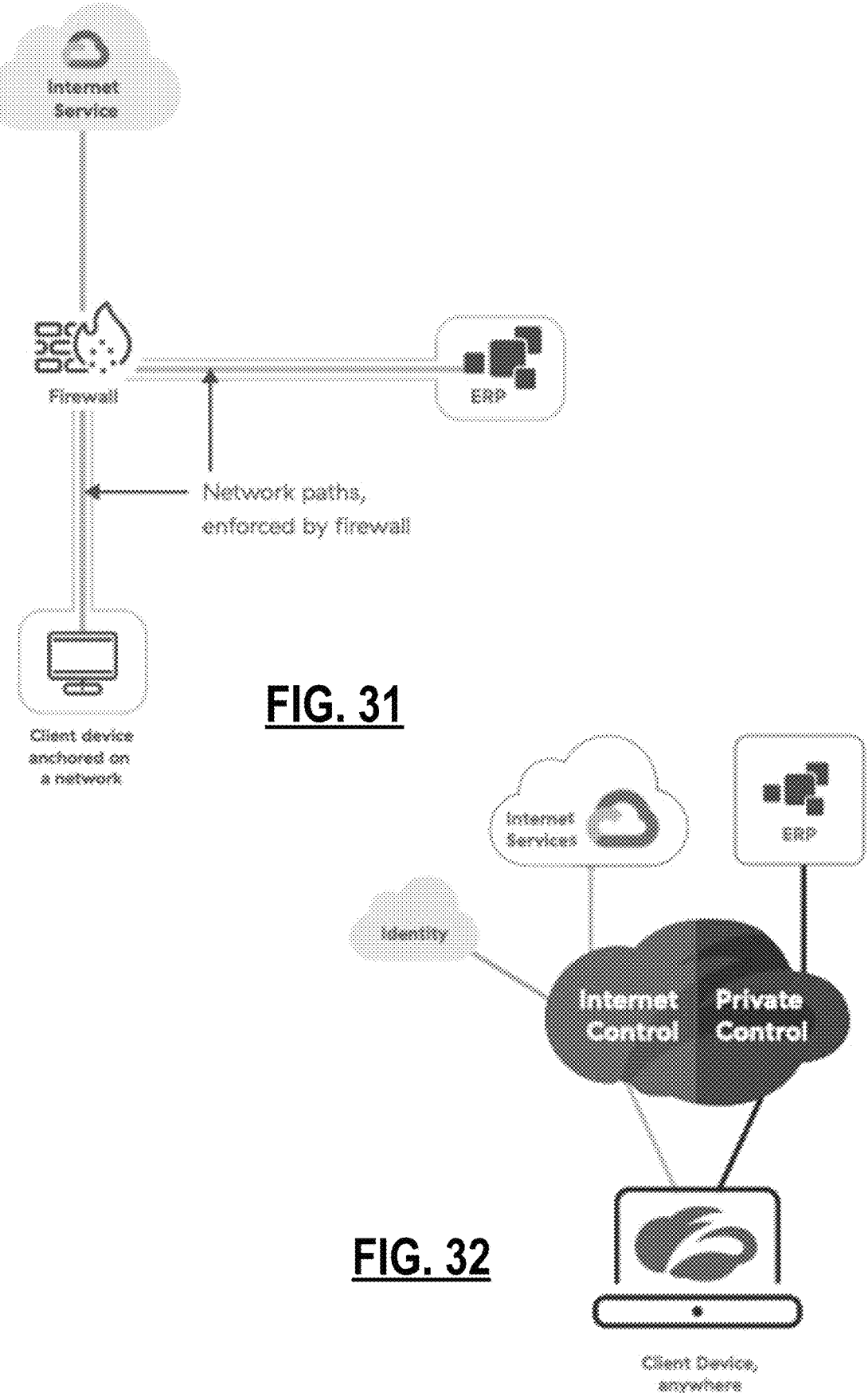
FIG. 31 is a diagram illustrating firewall-based protection, limited by network layer controls.
FIG. 32 is a diagram illustrating zero trust app access policy controls, which can be applied regardless of the client application location.

FIG. 31 is a diagram illustrating firewall-based protection, limited by network layer controls. Firewall-based architecture controls are constructed at layer 3 (network) of the OSI model. As such, they are not natively able to interpret beyond an IP address. This means any attempt to understand content beyond the IP-to-IP stateful control, such as the identity of individual users brokered from an IdP (SAML/SCIM/etc.), may require additional bolted-on functions or infrastructure, not only to manage identity values but also to associate any traffic with this identity and enforce controls for these sessions. This is impactful since cloud-hosted applications leverage IdP-based authentication and authorization, so features like single sign-on (SSO) are seamless when a user logs into a corporate Salesforce account or an internal SAP ecosystem.

Not understanding these authentication and authorization outcomes results in two distinct, negative impacts when using firewalls: First, users authenticate twice with two different authorizations. Second, these identity values may be managed in two locations, with two different sets of identity controls to consider.

Conversely, deploying a zero trust solution that is natively based on layer 4-7 proxies allows for inline integration and understanding of identity in relation to users' access requests. This means that, when access is requested with a true proxy-based zero trust solution, the control focuses on the identity and conditions of the initiator (all the values outlined in Element 1) plus the context of the destination application, rather than solely an IP address. User-to-application segmentation can therefore be achieved not based on cumbersome network controls but rather by identity-aware policies. This allows a zero trust solution to assess end-to-end (not solely network-based) context and apply controls for more granular categorization and access control.

With a zero trust solution, applications are evaluated individually. The ERP app is recognized as an internal app that should be utilized by few users, while YouTube is recognized as an external app available to anyone. Infrastructure, locations, and IP addresses related to YouTube are easily identifiable and should be actively updated within application context.

FIG. 32 is a diagram illustrating zero trust app access policy controls, which can be applied regardless of the client application location. Foundationally, services within a zero trust solution may not normally be trusted. Trust considerations have substantially shifted due to the dynamic nature of content and applications accessed. Least-privileged access in zero trust delivers multiple benefits to enterprises: a) applies the correct controls to the correct source, b) obscures protected resources from unauthorized sources, reducing cybersecurity risks, c) reduces waste, e.g., a Linux server isn't allowed to connect to a Windows patch system, d) provides granular visibility and learning of flows per access request, not network IP-to-IP, e) consolidates access based on identity and not on a network, allowing a network's function and infrastructure to be optimized, etc.

Defining application segmentation policies can be daunting given the size of enterprises. Below are three steps for beginning the segmentation journey:

1. Determine critical workloads and who should access them, beginning with a specific policy to protect "known-critical" assets if possible. If not, start with step 2.
2. For all other traffic, obtain visibility over access, thus giving visibility and an inventory of apps with a discovery policy.
3. Learn from insights offered by user-to-workload traffic flows and iterate your policies. An example of best practices for optimized policy is outlined in Appendix 1.

Creating application segmentation policies can be greatly simplified with machine learning insights (see FIG. 33 below).

Technology & Architecture Considerations

Figure 33:
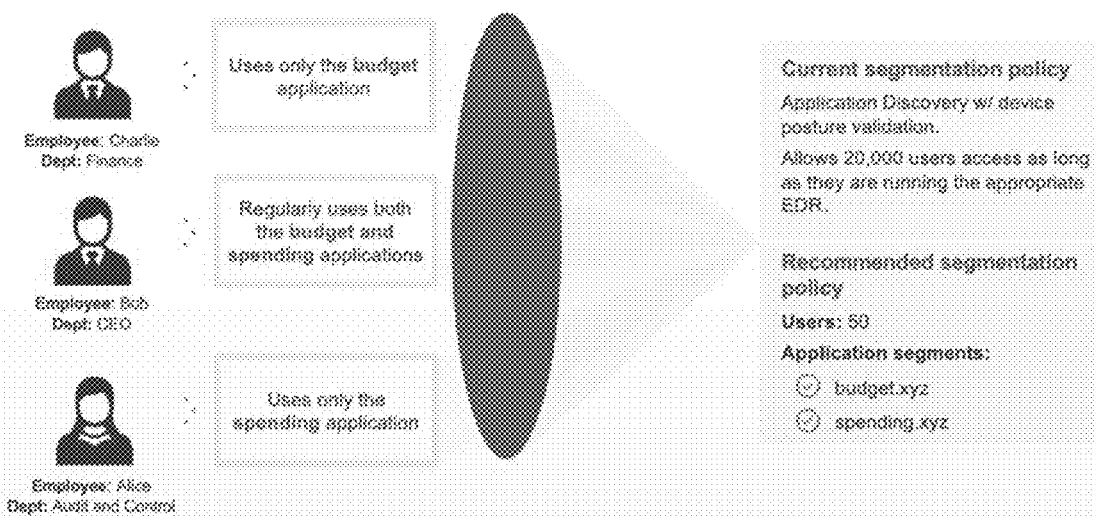
FIG. 33 is a diagram illustrating a machine learning technique that radically simplifies app segmentation in large, flat networks.

FIG. 33 is a diagram illustrating a machine learning technique that radically simplifies app segmentation in large, flat networks. The process of determining the application category and policy begins after validating the initiator's identity. Based on the initiator's request, applications may be differentiated between types: a) external or internal apps, b) known apps belonging to a predetermined category, c) unknown apps. Connectivity is not the goal of app determination. Rather, it's the implementation of rules to decide what conditions will be considered within the Control and Enforce phases.

Definition of Destinations/Apps/Segments

1. External or Internal Apps

An external app is one that is consumable from anywhere on the Internet and has some sort of inbound listening service that allows anyone on the Internet to attempt to connect to it. These are apps that exist on the open Internet may include google.com, salesforce.com, etc.

Internal apps are those hosted by the enterprise in their data center or in an IaaS/PaaS environment that have an inbound listener, but are generally privately hosted behind network layer controls like firewalls and connected to internal trusted network paths. These apps exist in internal address spaces, e.g., server1.local, or on a private IP (RFC-1918) space.

Known Apps Belonging to a Predetermined Category

These are applications that the zero trust system already knows and can be classified into one of three categories: a) Known Good: applications that are documented, assessed, and understood, e.g., salesforce.com, b) Known Bad: applications that are documented, reviewed, and determined to be malicious (e.g., illicit dark web marketplaces), c) Known Risky: services that are documented, reviewed, and are possibly risky depending on who accesses them, e.g., InfoSec websites.

Unknown Apps

These are applications that the zero trust system has newly discovered and has not yet categorized. These apps should be considered untrustworthy and risky until proven otherwise. This ensures Control and Enforce policies scrutinize these apps at the highest level.

An app's risk to the enterprise may be identified and categorized appropriately. If unknown apps are external, i.e., consumable on the open Internet, the zero trust solution may be able to quickly assess their risk level. This assessment concludes with a categorization of the site based on function, such as a video streaming site versus a sales tool. Internal apps may be flagged as newly identified, allowing the enterprise to determine which segment, app definition, policy, etc., best describe them.

Figure 34:
FIG. 34 is a flow diagram that depicts an application categorization and policy enforcement process culminating in an inspection decision.

FIG. 34 is a flow diagram that depicts an application categorization and policy enforcement process culminating in an inspection decision. There is further differentiation between application types, including IT and IoT/OT workloads, web and non-web apps, decoy apps, and critical apps.

IT vs. IoT/OT workloads

Both sets of apps generally rely on similar infrastructure and technology: connected devices communicating on a shared network. However, there are major differences: a) Information Technology (IT) apps deal solely with the processing of information for human users, e.g., email or video streams, b) IoT apps generally collect data from IP-enabled things and forward it to external IoT platforms for analysis, c) Operational Technology (OT) applications control physical devices, e.g., industrial or access control systems, etc.

OT is unique in that the hardware and software are designed to monitor and control specific physical environments, such as heating a space or slicing food. Typically, OT controls follow a standardized set of OT security controls depending on their function (e.g., IEC 62443 or the Purdue Model). OT services can manage industrial control systems (ICS) and supervisory control and data acquisition (SCADA), which often require human oversight. IT-based technology solutions like zero trust are able to provide privileged remote access connectivity to OT platforms. This allows for fully isolated, clientless RDP/SSH as well as secure file/data transfers.

Figure 35:
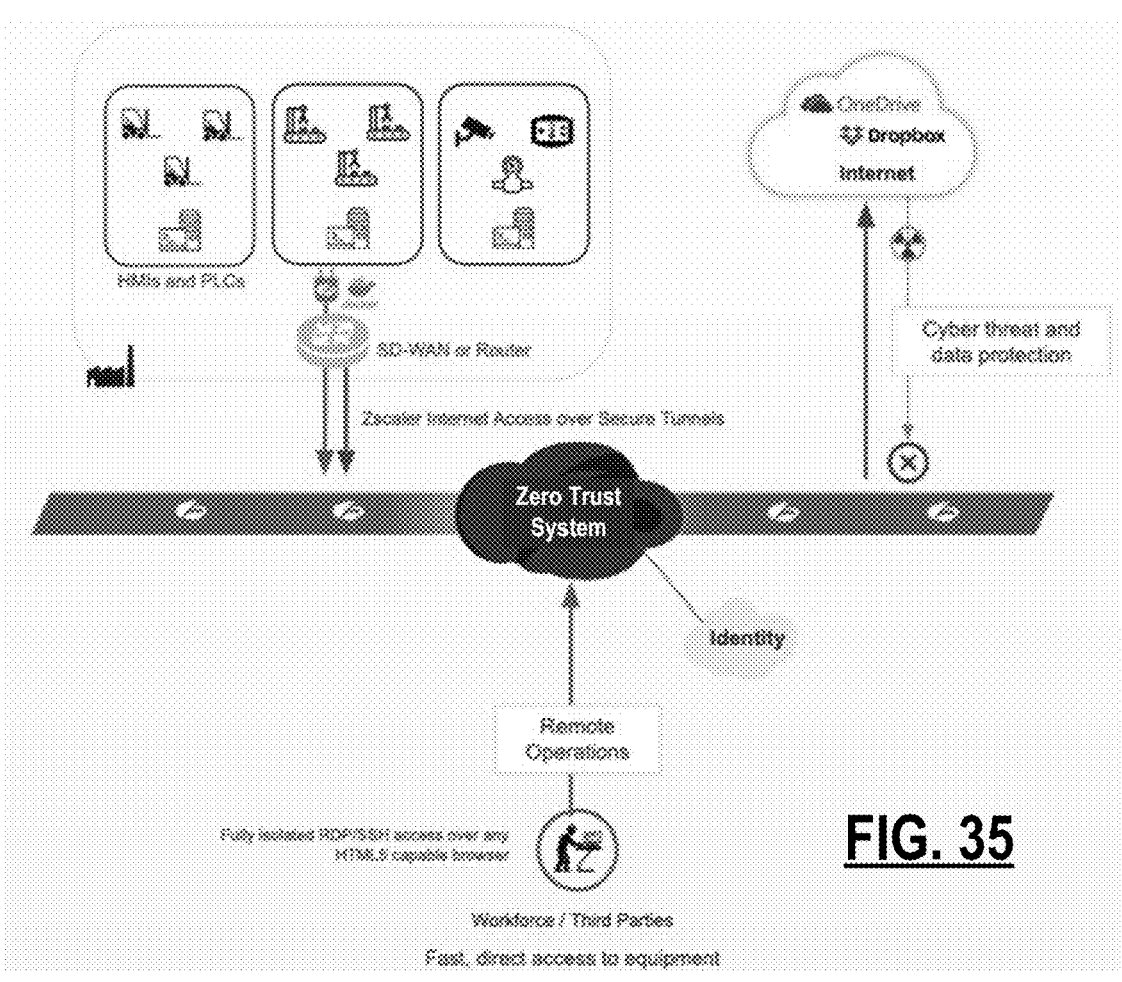
FIG. 35 is a diagram illustrating a privileged remote access for OT systems to the Zero Trust System.

FIG. 35 is a diagram illustrating a privileged remote access for OT systems to the Zero Trust System.

Web vs. Non-Web Apps

While web-based apps are the majority of traffic (over 80%), they are not the only traffic requiring categorization. Non-web apps might include categories enterprises map to certain functions, like "All file servers" as a group that contains IP addresses, FQDNs, and domain names for servers that host file servers running on port 445 (SMB).

Decoy Apps

Policy definitions should include the ability to define alternate destinations for app access. This allows enterprises to define honeypot-like services that help identify and mitigate threats posed by compromised users.

Critical App Definition

Not all applications, segments, or groups are created equal. Each enterprise may differentiate between app types based on its business and priorities. This normally involves risk and data classification requirements and/or enterprise "key assets." Differentiating these in policy may be important to subsequently defining access, roles, controls, etc. Critical applications could be considered core to the business function, such as an ERP system for a logistics company or a CAD system for a design company. Ideally, these apps receive the most restrictive set of rules and controls, allowing only necessary user access. Critical apps may be differentiated in policy and access control from less critical apps, where access is more open. Enterprises may clearly define and manage these apps. Ideally, this would be based on a classification system taken from standards like SOC 2, PCI, or similar. Enterprises should consult internal security risk and compliance teams to align specific classification requirements.

These destination values, coupled with Element 1 outputs, allow a zero trust solution to make a definitive policy decision and apply enforcement within Element 7 in accordance with enterprise requirements. Note: If the App Policy cannot be met, access may default to a Conditional Block Policy. One method for how the Zero Trust System 500 accomplishes this is explained with respect to FIG. 36.

Figure 36:
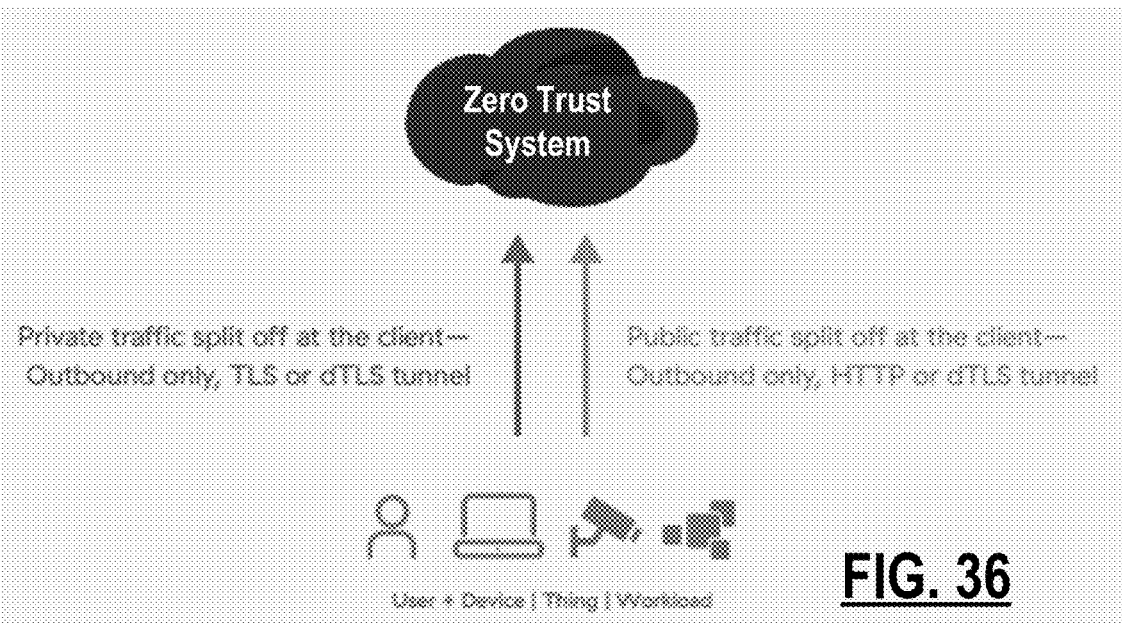
FIG. 36 is a diagram illustrating how external and internal traffic to the Zero Trust System are split at the source.

FIG. 36 is a diagram illustrating how external and internal traffic to the Zero Trust System are split at the source. The requested application is assessed only after Zscaler has validated the initiator in Element 1. Zscaler's assessment involves multiple phases to ensure three key points:

1. External and Internal Traffic are Separated at the Initiating Source

Determination of the path and controls based on traffic type. Rather than sending all traffic to a distant edge service to determine external and internal paths, as with typical network-based connections like VPNs, the Zscaler Client Connector is able to intelligently understand the type of application (external or internal) and steer it over the correct tunnel to the correct security edge service, as in the following instances: 1) YouTube is an external Internet app and may have its controls implemented at the Internet control layer. 2) erp.company.local is an internal app and requires not only a different set of access controls but also separate access paths. By intelligently breaking off traffic at the client layer, Zscaler delivers two distinct advantages:

1. End-user Experience—Traffic is evaluated according to its own, unique access path. The lack of dependency on networks for control allows for effective and best-path selection to be determined per app.

2. Simplification—Policy enforcement is performed where required, inline between the initiator and the destination. It is not centralized with lots of complex routes or network interconnections needing to be managed.

2. Application Categorization

Process to decide if the app has been seen before. Once an application request reaches the correct enforcement point, the app's actual function and category are evaluated, categorized, and if necessary, updated. This ensures that, once the Control and Enforce phases process the traffic, the correct control is applied to the correct access request. The first step is to determine if the application is known or unknown, asking whether the Zero Trust System has already categorized it or not.

If the application is known, it means that it is part of an existing and predefined app category. This is not always simple, however, and requires dynamic app categorization. Take, for example, Internet-based services that scale with demand. Updating control policies in network infrastructure means adding new IP addresses to the rules. In dynamic app categorization, any additional application information can automatically be added to the app and/or cloud app category. Zscaler maintains predefined and updated categories, such as the one-click integration with Microsoft 365, to address these requirements.

FIG. 37 is a screenshot interface illustrating an application example with multiple associated addresses and services. Zscaler provides customers multiple ways to categorize applications:

Pre-Defined

Common apps can be prepopulated with data available on the open Internet. This mostly applies to Internet-based services.

Manual Definition

Details of applications are set by the client. While Internet-based services are rarely left to customers to define, internal applications are often best defined by the client, especially when restricted.

Cloud Definition

This includes services consisting of various sets of apps and functions, like YouTube. Zscaler leverages active learning from traffic across the cloud to ensure the latest information is included in the application policy.

API-Driven Definitions

Leveraging integration with cloud services, Zscaler actively learns from platforms, like Microsoft 365, to deliver the latest app segment definitions.

Unknown and Newly Discovered

This category is used when initiators request an application unknown to Zscaler or our partners. Identification of the services and applications making up a policy may be dynamically updated. Ensuring that all new functions, services, IPs, hostname, etc., are automatically updated means that—when an enterprise defines a policy of "block all video streaming," for example—all new IPs related to YouTube, TikTok, etc., are detected and added to the policy controls. Zscaler actively communicates optimizations to group categorizations through email and web updates, so it's clear whether apps, categories, or values are changing.

FIG. 38 is a table illustrating an example of URL re-categorization of a newly discovered app. Zscaler allows any Internet-connected individual to assess its current categorizations and suggest changes through its Site Review assessment tool. If the application is not known to the Zero Trust System or the customer, it may be flagged as newly discovered. Zscaler subjects newly discovered apps to various assessments to understand their function, risk, and other insights. Within Zscaler, the app is categorized and evaluated in the following manner:

1. Assess the app to identify its type, e.g., web app
2. Identify any reputation for the app or domain
3. Assess the content and function of the app
4. Categorize, if possible
5. If not, flag as uncategorized Process to differentiate unknown from known apps & categorize. Uncategorized apps receive separate conditions in Element 7 to determine the appropriate actions and outputs. App categorization by group allows for efficiencies in the size and scope of apps to be taken into account.

The Zscaler Zero Trust System creates and manages apps across various categories, including: a) Collaboration & Online Meetings, b) Consumer, c) DNS over HTTPS Services, d) Finance, e) Healthcare, f) Hosting Providers, g) Human Resources, h) IT Services, i) Legal, j) Productivity & CRM Tools, k) Sales & Marketing, l) System & Development, etc. Zscaler Help provide a more complete list of cloud app categories or URL categories. Zscaler automatically updates most of its predefined app categories using knowledge collected from the cloud, partners, threat intel, and other sources.

FIG. 39 is a diagram illustrating the Zero Trust System using numerous factors to identify suspicious domains. Customers can also manually create and modify their own app segments based on their application classification requirements.

3. Application Policies Based on Categories

After an app is categorized, it may be assigned to a policy to ensure traffic destined for the app is correctly controlled. Zscaler implements app categories for various sets of functions relevant to policy enforcement. Note: A complete overview of access policy is outlined in Element 7. App Policy is built within Zscaler by applying application categories to various security controls. These categories for Internet services include the following examples: a) Web-based (HTTPS) gambling websites should be restricted, b) Cloud apps, like Microsoft 365, should be allowed with controls, c) Apps with sensitive data where data loss prevention should be deployed, both inline and out-of-band, d) Bandwidth-intensive apps where bandwidth controls should be applied, etc. Applications may be correctly defined and categorized to ensure the subsequent Control and Enforce elements are appropriately applied.

Decoy Apps

An entirely unique type of application exists whereby the Zero Trust System will identify and direct a compromised user to a decoy cloud. This decoy cloud will mimic the behavior of an actual internal application while preventing lateral movement and the loss of sensitive data. By observing behavior of the compromised user within the sensitive application, further damage is prevented.

Figure 40:
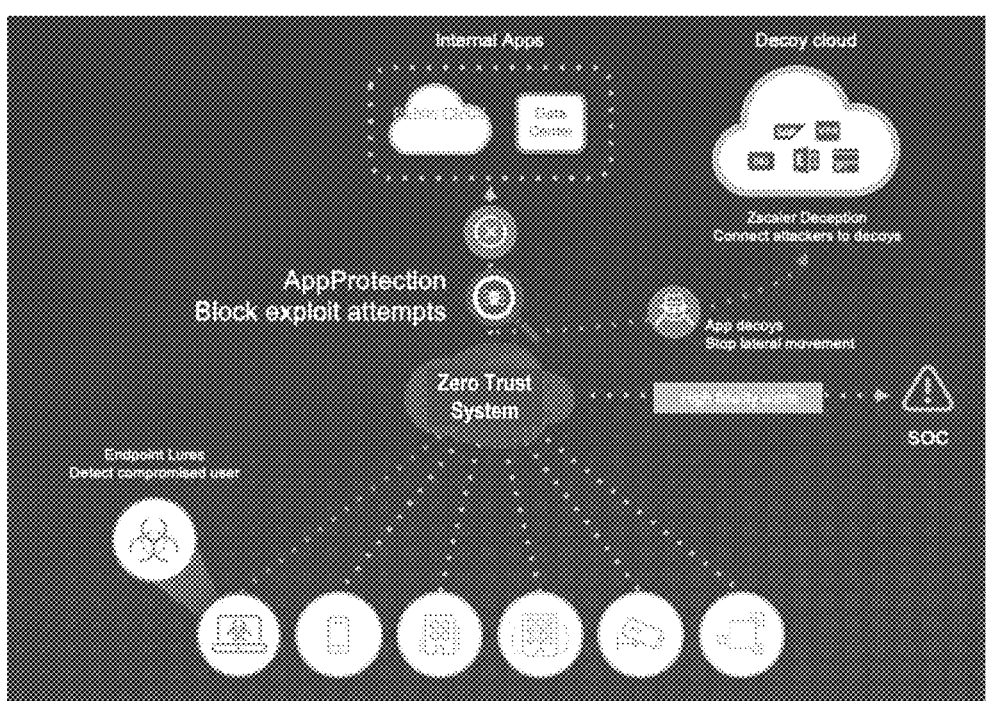
FIG. 40 is a diagram illustrating the use of the Zero Trust System for connecting attackers to decoy sites and preventing access to live environments.

FIG. 40 is a diagram illustrating use of the Zero Trust System for connecting attackers to decoy sites and preventing access to live environments.

Application Segmentation

Once application destinations are categorized with appropriate access control policies, it is then necessary to specify which groups of users can access those applications. This allows for user-to-application segmentation independent of network-based controls. These controls are implemented based on access policy rules. These rules define the users and then define which applications or segment groups they can access.

For application-based access control, an enterprise can create an access policy rule for specific application segments or segment groups. Different policies can be used to grant access for individuals or groups of users to individual applications or across a group of applications. The criteria used to create these controls include user profile, device posture, connected network, IdP attributes, and others. These attributes can be used to create segment groups or machine groups.

The creation of access policy rules can seem daunting, especially when moving from a VPN-based solution where such rules were not needed since users were granted wide network access. It's often useful to start the app segmentation journey with no segmentation at all and leverage the Zero Trust System by applying a *.* application policy. While this mimics the level of access provided by the VPN, it has the benefit of removing the attack surface caused by an externally exposed VPN concentrator. Using this as a starting point, the enterprise can go on to create more granular access control policies. Machine learning-based techniques allow Zscaler to recommend access policies based on the actual traffic flows. More details on application segmentation can be found in Appendix 1.

Figure 41:
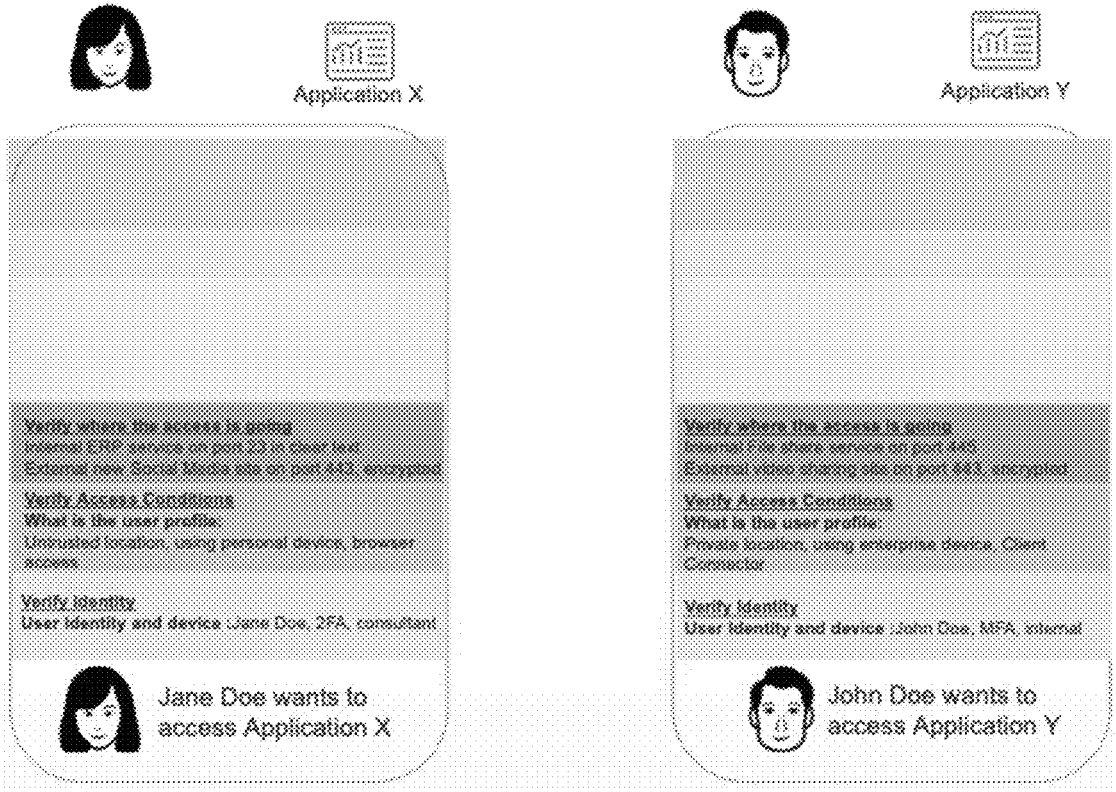
FIG. 41 is a diagram illustrating a fourth progress report of the status of the two example users while they use the Zero Trust System of the present disclosure.

FIG. 41 is a diagram illustrating a fourth progress report of the status of the two example users while they use the Zero Trust System of the present disclosure. Identity and context have been verified for both John and Jane, and the next step is identifying where the connection request is headed, as well as the implications of that application connection.

Inspection and Control Unit

Section 2—Control Content and Access

There's no point applying controls, computing power, or even electricity to something that's outside your mandate to protect. In fact, controls should never be wielded against objects outside your control structure. This is why, in Section 1, we validated who the identity is, what the context of the connection is, and where the connection is going.

In Section 2, it's important to take decisions of identity, context, and application policy and start applying the first levels of control policy. This may require the zero trust architecture to break initiators' connections and examine what they're doing, much like an airport security checkpoint. Section 2 is about understanding risk and looking inside to see what's going on. Element 4 describes how risk is assessed, while Element 5 and Element 6 discuss how content is inspected for cyberthreats and possible sensitive data exfiltration.

Figure 42:
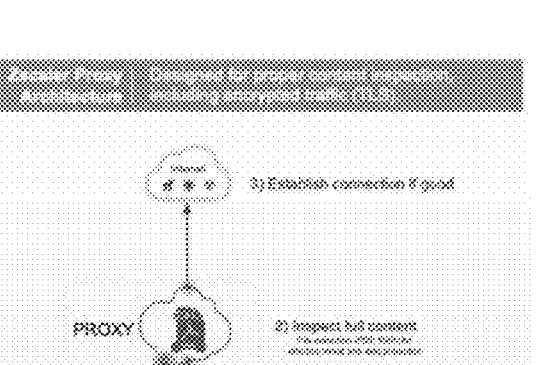
FIG. 42 is a diagram comparing pass-through and proxy architectures.

FIG. 42 is a diagram comparing pass-through and proxy architectures. It is important to remember that this level of control is difficult to achieve with firewall-based architectures and necessitates the move to a zero trust architecture. Pass-through, stateful controls of legacy firewall deployments may require additional layers of services be daisy-chained or bolted on. This is compared to a true inline proxy solution from Zscaler, where additional controls are included directly with no additional layers needed.

Fourth Element 514

Figure 43:
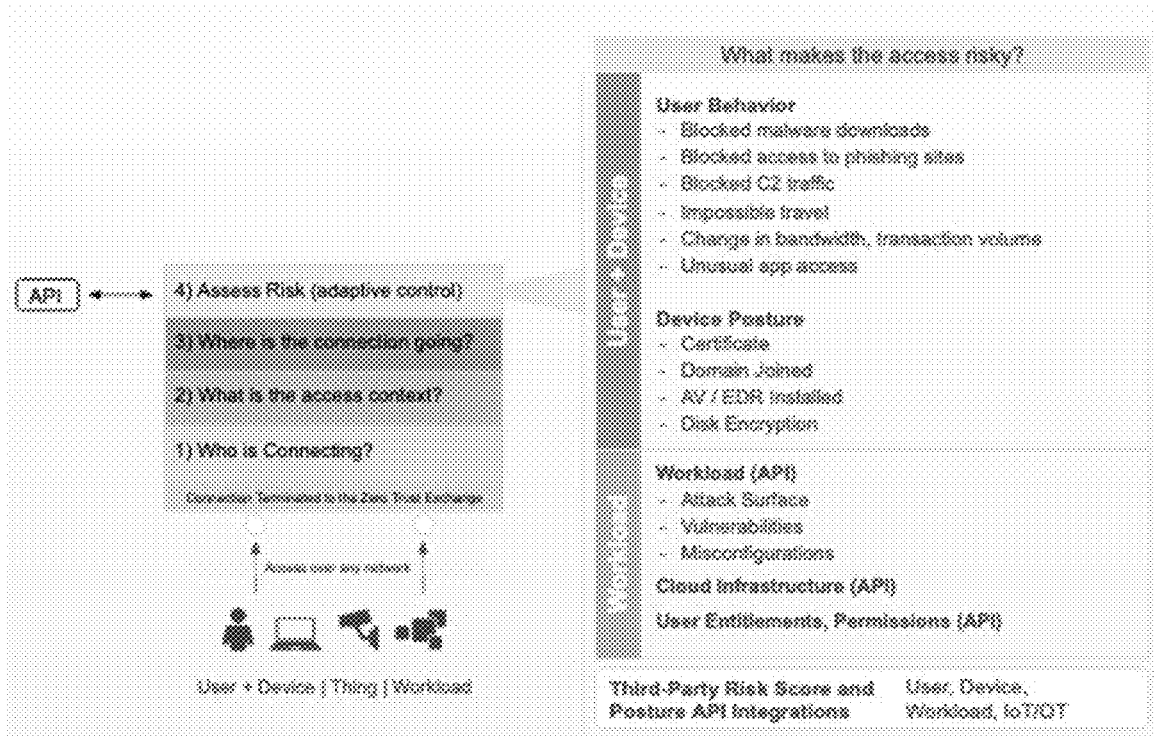
FIG. 43 is a diagram illustrating an embodiment of the fourth element shown in FIG. 14 where various factors go into the calculation of a dynamic risk score.

FIG. 43 is a diagram illustrating an embodiment of the fourth element 514 shown in FIG. 14 where various factors go into the calculation of a dynamic risk score. This is used to assess risk (adaptive control). In life, we're all judged by the outcome of our last performance. The same goes for zero trust. The previous elements are only as good as the latest assessment. The solution may account for an enterprise's tolerance for risk via a dynamic risk score. Subsequent and ongoing risk assessments may be dynamically calculated from a set of signals to ensure the score is updated based on new developments. This risk then feeds into a decision engine to determine whether ongoing access should be granted.

This may be significant in that values captured in Elements 1-6 may be presented at Element 7, the enforcement layer. In its raw form, this is simply the submission of values to apply policy, enforce controls, and establish connections as allowed. True zero trust normally requires continuous evaluation of values related to the authentication, inspection, and access determinations based on the destination service. For example, identity verification may be continuously updated in the event the original authentication criteria are no longer met. Dynamic risk calculation is important for making risk-based access decisions throughout the life of a connection. A marked change in user/device posture or behavior can trigger an update on the access decision in near real time based on updates to a risk score.

Technology & Architecture Considerations

Calculating risk may dynamically require varying inputs that cannot be consumed in a uniform manner. There may be mechanisms to regularly assess user/device profile values to confirm the status, change, updates, and ultimate risk of the initiating request. Pro Tip: Risk can be complicated to calculate, so start with areas worthy of further investigation, e.g., third parties vs. employees. Then, narrow the category to include third parties with unlimited access compared to those with limited access.

Understanding user behavior may be used to distinguish between risky and benign actions. This analysis learns patterns of normal behavior to then determine when behavior is anomalous. Analyzing these patterns and evaluating them against company policy leads to better access request determinations. More simplistic methods of risk calculation focus on measuring rates of undesirable traffic or blocked access requests generated by a user. Collection and collation of risk inputs also can't be limited by an initiator's location. While these methods give some indication of risk, they are neither truly dynamic nor based on a sufficiently broad set of input criteria. Additionally, calculating accurate risk scores isn't workable as an add-on service.

Dynamic risk scoring may be a feature of a zero trust solution, able to scale with an enterprise's ideas of acceptable risk. Values may be collected regardless of whether the initiator is connected at home, a coffee shop, in the office, or elsewhere. Zero trust solution providers may deliver global, highly-available, scalable, and network-agnostic solutions that offer consistent policy decisions and a seamless user experience while mitigating risk. Just as behaviors vary among user identities, workloads may also be evaluated relative to their known and comparatively static activity; an SQL client should talk to an SQL server, but rarely if ever should it communicate with an unrecognized server. Independent of the request initiator's identity, the outcomes of these assessments are used to create a risk score, which is then sent to the application policy decision engine described in Element 7. It's at this point where the decision of which action to take, based on the risk score calculated from user posture, device posture, and anomalous behavior is made. Customers may also decide on the frequency with which this determination may be made when risk scores are dynamically evaluated.

Third-party solutions can provide additional insight into user and workload risk assessments. Those garnered from EDR, SIEM, or SOAR services may add context for improved determinations. Note: If the control assessment of Risk Score cannot be met, the access should default, as outlined in FIG. 16, to a Conditional Block policy.

The Zero Trust System 500 can accomplish this by including multiple mechanisms for identifying issues and ultimately calculating company-wide risk scores. This allows enterprises to view and investigate risk using: a) risk score by authenticated user (showing which known and authenticated users are considered risky), b) comparison of the enterprise risk against its industry vertical, c) risk distribution through an organization, d) behavior of the riskiest users, e) locations with the highest risk. These values are dynamically identified and delivered to the policy enforcement stage discussed in Element 7, allowing enterprises to regulate access based on the latest, dynamically collected scores.

Figure 44:
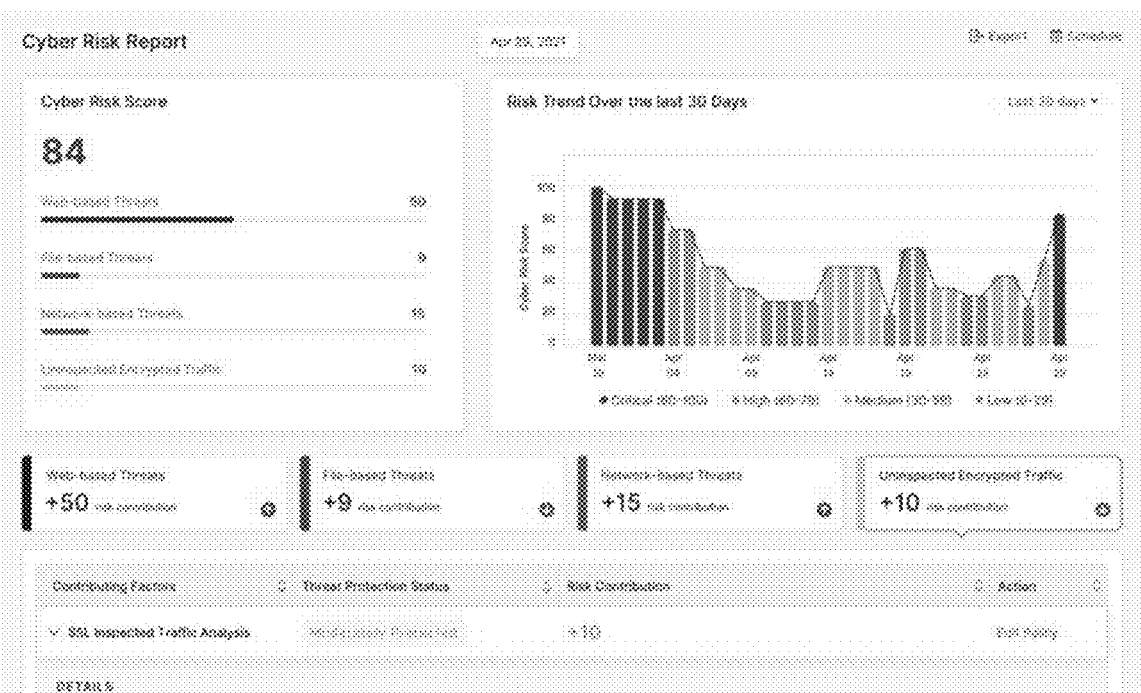
FIG. 44 is a diagram illustrating a screenshot of a Cyber Risk Assessment of the Zero Trust System.

FIG. 44 is a diagram illustrating a screenshot of a Cyber Risk Assessment of the Zero Trust System 500. Zscaler's risk scoring is informed by a proprietary algorithm that takes profile, posture, and behavior into account before assigning a value. These risk values and their outputs vary based on the entity making the resource request, be it a user, IoT/OT device, or workload. The goal of risk evaluation is to allow customers to apply organizational, locational, departmental, and user-level risk telemetry to policy enforcement. This, in turn, allows for greater control and visibility of overall risk assessment and management strategy. Beyond company-wide risk scoring, there is also user-based risk scoring. There are three key categories of user-based risk evaluation, which include pre-compromise behavior, post-compromise behavior, and suspicious and anomalous behavior.

Figure 45:
FIG. 45 is a diagram illustrating a screenshot of a User Risk Score for an example user to measure against factors including overall risk and compare with peers.

FIG. 45 is a diagram illustrating a screenshot of a User Risk Score for an example user to measure against factors including overall risk and compare with peers. The Zero Trust System 500 actively collects information to support risk assessment scores from the individual customer's set of configurations, uses, and insights—for example, looking both at the number of malicious callbacks from a client during a time frame along with global inputs from the Zscaler cloud. An example outcome of a user risk score analysis that would result in a particularly high risk score is demonstrated in FIG. 45.

FIG. 46 is a diagram illustrating an example of events that will influence how a user's risk level is calculated. Zscaler customers can quickly create views of user-centric and company-wide risk. This visibility, along with insights from Zscaler's ThreatLabZ team and the global cloud effect, allows for accurate categorizations of user behavior, which are then applied to policies to ensure dynamical control. Workloads generally have a limited set of risk identifiers for defining how one differs from another. Thus, they should be considered based on the location from which they attempt to initiate a session. Defined as such, workload risk scores are a function of a location's sensitivity combined with tendency toward anomalous behavior. For example, a protected file share workload should not have access to Netflix, with any deviation being the cause for a change in the site's risk evaluation. Given the lack of unifying identity solutions for IoT/OT devices and the fact that identity is static, the riskiness of any "thing" is calculated by Zscaler using device traffic flow. As such, traffic flow is broken into two categories, outlined in Element 5 and Element 6.

Cloud-Native Application Protection (CNAPP)

When delivering services across many IaaS, PaaS, and SaaS offerings in addition to leveraging microservices and serverless architectures, siloed on-premises security solutions can't scale fast enough to secure mission-critical cloud applications anymore. The Zscaler Zero Trust System offers a cloud-native application protection platform (CNAPP) that takes an approach to cloud-native application security with an agentless solution that correlates multiple security engines to prioritize hidden risks caused by misconfigurations, threats, and vulnerabilities across the entire cloud stack, reducing cost, complexity, and cross-team friction. These security engines operate out-of-band to provide another level of risk assessment, focusing on ensuring that cloud entitlements and security posture conform to enterprise requirements.

FIG. 47 is a diagram illustrating a fifth progress report of the status of the two example users while they use the Zero Trust System of the present disclosure. After a dynamic risk assessment, risk values are included with original identity outputs to round out the view of the requesting entities, John and Jane Doe. The zero trust process will consume this verified identity as part of its policy implementation. The calculation of risk for Jane is quite different than for John.

Fifth Element 515

Figure 48:
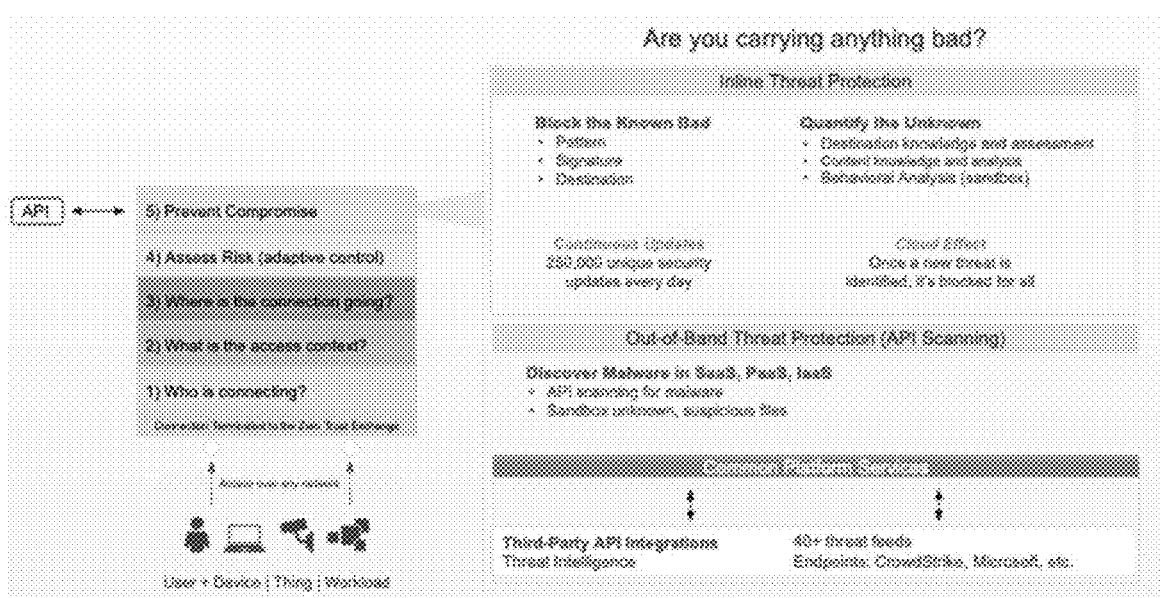
FIG. 48 is a diagram illustrating an embodiment of the fifth element shown in FIG. 14 of the Zero Trust System for providing inline inspection to prevent compromise.

FIG. 48 is a diagram illustrating an embodiment of the fifth element 515 shown in FIG. 14 of the Zero Trust System for providing inline inspection to prevent compromise. The number of threats using SSL/TLS encrypted channels increased 314% annually between 2020 and 2021, comprising more than 80% of attacks. Thus, implementing a corporate policy of SSL/TLS inspection can be done for the identification of risky content and subsequent protection of the enterprise. Note: For a live view of the volume of encrypted traffic at any one time across the Zscaler cloud, see the ThreatLabz Encrypted Traffic Dashboard.

Encrypting HTTP Internet traffic has become a trivially simple process. This has led to a greater degree of protection for consumers, ensuring their information and personal details are not exposed to unscrupulous snoops on the Internet. Services like LetsEncrypt allow anyone to obtain trusted public key certificates, driving an incredible rise in encrypted traffic.

The bad guys have also caught on and now deliver their attacks via encrypted channels like HTTPS. In the 2022 Zscaler Ransomware Report, ransomware as a service (RaaS) was leveraged by eight of the top 11 ransomware families. Each of these RaaS services uses SSL/TLS encryption to protect its actors as well as for delivering ransomware payloads.

Identifying and protecting against such ransomware attacks can therefore only be achieved by inspecting SSL/TLS traffic. Without this inspection, it is not possible to protect against initial attacks against enterprises or to stop the exfiltration of data (see Element 4). Nor is it possible to have visibility into command and control (C2) traffic as infected devices speak back to malicious command centers since C2 traffic is mainly encrypted via SSL/TLS. Identifying C2 traffic greatly reduces this threat.

SSL/TLS communications are encrypted and undecipherable without decryption. Compromise prevention may take into account threats targeting enterprises, which fall into two categories:

Inline Threats

Malicious actors, code, plugins, and more also use SSL/TLS encryption as a means of transport. SSL/TLS public key encryption is the global standard for data protection of secure web transactions for the majority of the Internet. Each data packet is turned into a code string decipherable only between an initiator and a destination service, regardless of the network.

This helps users protect sensitive information like passwords and credit card details and prevents untrusted parties from observing or making sense of private communications. This protects against eavesdropping and data tampering by untrustworthy parties, but also gives threat actors the ability to hide their attacks. To protect against threats via inline communication, enterprises may be able to do inline traffic decryption at scale.

Out-of-Band Threats

It's important to also address the risks that are stored within SaaS, PaaS, IaaS, or other cloud solutions. An out-of-band assessment, as part of a unified threat management solution, provides enterprises with a full view of inbound threat paths and actively identifies threats before malware is downloaded, shared, or launched. This may be significant in some cases in that the ability to view traffic and cloud app use may be important for ensuring malicious content (e.g., botnets, malware, etc.) is not hidden in encrypted traffic. With the bulk of Internet-bound traffic being encrypted, allowing this traffic to pass through unexamined or services to be used without inspection is risky. Inspection of both external and internal application access may be important since both traffic flows may be encrypted.

Figure 49:
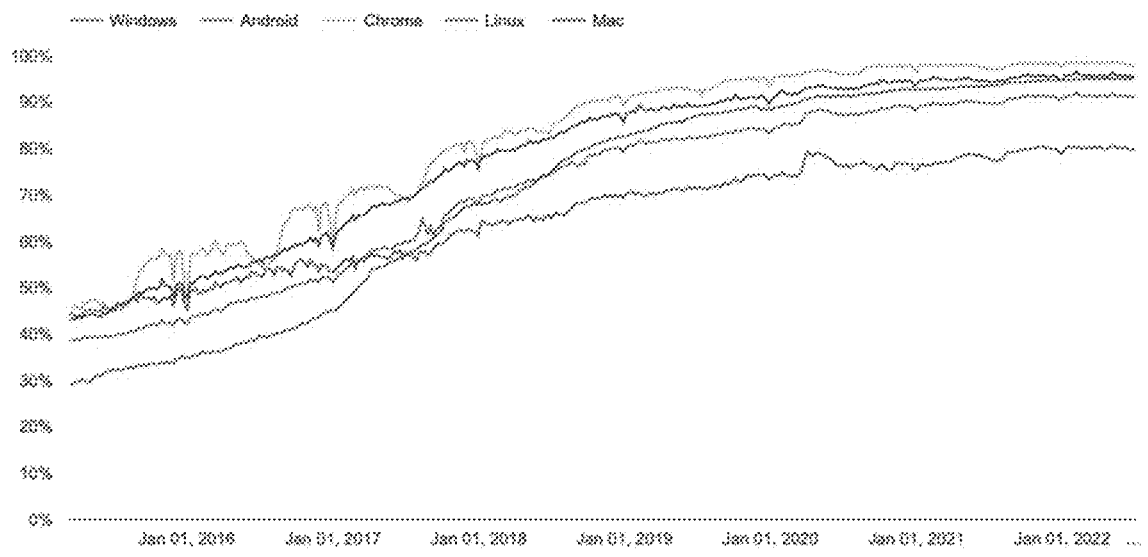
FIG. 49 is a graph showing growing rates of encryption used on various apps.

FIG. 49 is a graph showing growing rates of encryption used on various apps. The graph shows growing rates of encryption used on the Chrome web browser. Effective zero trust platforms employ comprehensive inline and out-of-band functions so customers can inspect content under proper circumstances, thus mitigating risks hidden in encrypted traffic or locales.

Pro Tip: Inspection in many geographies may take time and effort to find the right balance of privacy appropriate for workers' councils. Identifying the correct balance of risk reduction and privacy is not static and should be incremental, starting with less controversial geographies and traffic types.

Enterprises may consider the value of the visibility and insight garnered by inspecting traffic. This value may be assessed, however, in relation to privacy controls and restrictions for end users. Organizations may establish a balance between their right to be protected from threats and a user's right to privacy.

This balance may be considered and implemented granularly, not as a binary "inspect or don't inspect" policy. It should be implemented based on business risk and application type (see Element 2 for details on application categorization). Controls should provide protection where needed—e.g., to stop malicious files from being downloaded—while also ensuring end-user privacy is protected when personal data like healthcare or finance information is involved.

Technology & Architecture Considerations

Visibility of enterprise threats requires the ability to uniformly look inside traffic in motion (inline) and files stored in services (out-of-band). Each discipline has different implementation considerations, but ideally should be managed with one set of policies.

Inline Considerations

The ability to inspect encrypted traffic may require a forward proxy architecture that's built for the cloud to allow for intensive inspection with minimal latency. For Internet-bound traffic, decryption standards may support up to TLS 1.3 on all ports (which have improvements over earlier versions to ensure the confidentiality and integrity of communications) and check against techniques like DNS tunneling. Inspection also integrates with technologies like sandboxing, where potentially risky files can be "detonated"

before being served to the user, as well as browser isolation, where pixels can be streamed to the user instead of the actual web page.

Figures 50, 51:
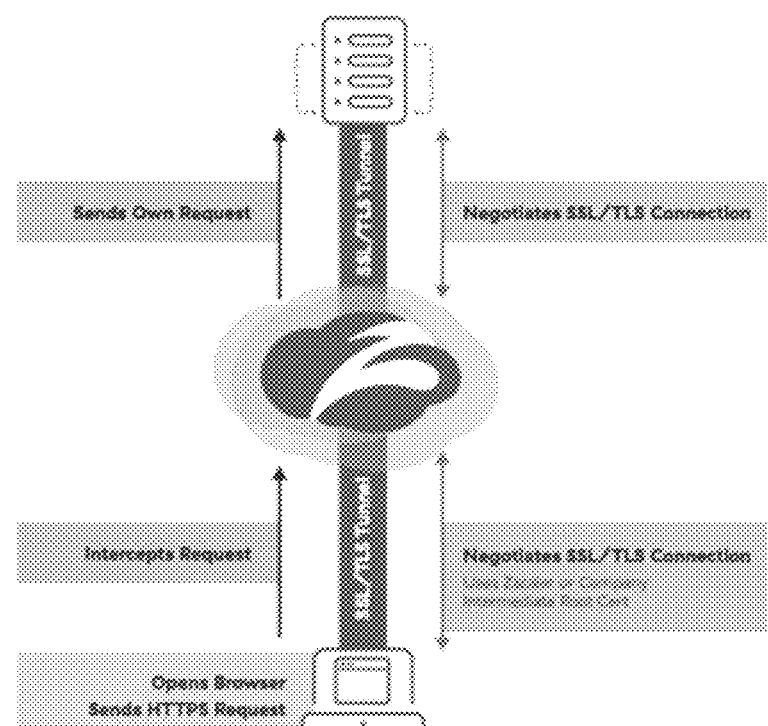
FIG. 50 is a diagram illustrating a process by which a client negotiates a secure session with a destination server.
FIG. 51 is a table showing a comparison of common SSL/TLS inspection techniques.

FIG. 50 is a diagram illustrating a process by which a client negotiates a secure session with a destination server. Zero trust architecture may scale to function as an SSL/TLS, person-in-the-middle proxy that provides complete inbound and outbound content analysis able to immediately block threats detected anywhere in the enforcement plane. Threat actors continue to evolve their tools, techniques, and procedures, which include abuse of legitimate storage service providers like Dropbox, Box, OneDrive, and Google Drive for hosting malicious payloads.

In addition to stopping hackers, SSL/TLS inspection is useful when an enterprise wants to know when employees are intentionally or accidentally leaking organizational data. SSL/TLS inspection may also be required for maintaining compliance by ensuring employees are not putting confidential data at risk (outlined in Element 6).

Therefore, true zero trust vendors may provide full inline SSL/TLS inspection capabilities. The most effective implementation of SSL/TLS inspection is through a native, proxy-based solution that is transparent to the end user. Bolting on a function to existing next-generation firewalls (NGFWs), which have inherent challenges scaling, is not recommended.

SSL/TLS decryption is resource intensive. NGFWs with added inspection capabilities that have moved to virtual instances on CSP compute nodes will inevitably encounter limitations. Ensuring that data is secure at rest and not just in motion is also part of overall inspection controls (data at rest will be addressed in Element 6).

Implementing SSL/TLS inspection has been historically challenging for various reasons. Your own chosen zero trust vendor should be the foremost trusted expert and provide guidance, understanding, and implementation when enabling SSL/TLS inspection. Again, SSL/TLS inspection is non-negotiable for the SSE, but it need not sacrifice speed for security.

Out-of-Band Considerations

FIG. 51 is a table showing a comparison of common SSL/TLS inspection techniques. Leveraging the same policy controls for inline inspection, a zero trust platform should govern data at rest within cloud applications, preventing dangerous file sharing and even file oversharing. When considered holistically, out-of-band controls complement previously outlined inline controls so cloud apps cannot be used as an attack vector. Note: If the control assessment of Prevent Compromise cannot be met, the access may default, as outlined in FIG. 16, to a Conditional Block policy.

The Zero Trust System 500 may accomplish this as follows. Zscaler is a true inline SSL/TLS proxy. It terminates SSL/TLS connections established by the client and establishes a new SSL/TLS connection to the server. From the client's perspective, Zscaler becomes the server and, from the original SSL/TLS server's perspective, Zscaler becomes the client. Since Zscaler is not only inspecting SSL/TLS traffic on the wire but also terminating the connections, Zscaler has full visibility to common name (CN) and other certificate parameters typically not visible to passive SSL inspection devices.

Zscaler's proven ability to inspect SSL/TLS has made it a Gartner-recognized industry leader for more than ten years. It was designed as a proxy architecture to enable low-latency throughput regardless of where an initiator or destination is located. The Zscaler Zero Trust System inspection function is a cloud-native architecture that supports all current and future encryption requirements, including TLS 1.3 or earlier versions.

Zscaler's comprehensive set of inline protection with the Zero Trust System provides a unique ability to understand the threats an enterprise faces. With these insights, Zscaler is able to offer a global dashboard of threats, including attacks Zscaler sees across its clouds.

Figure 52:
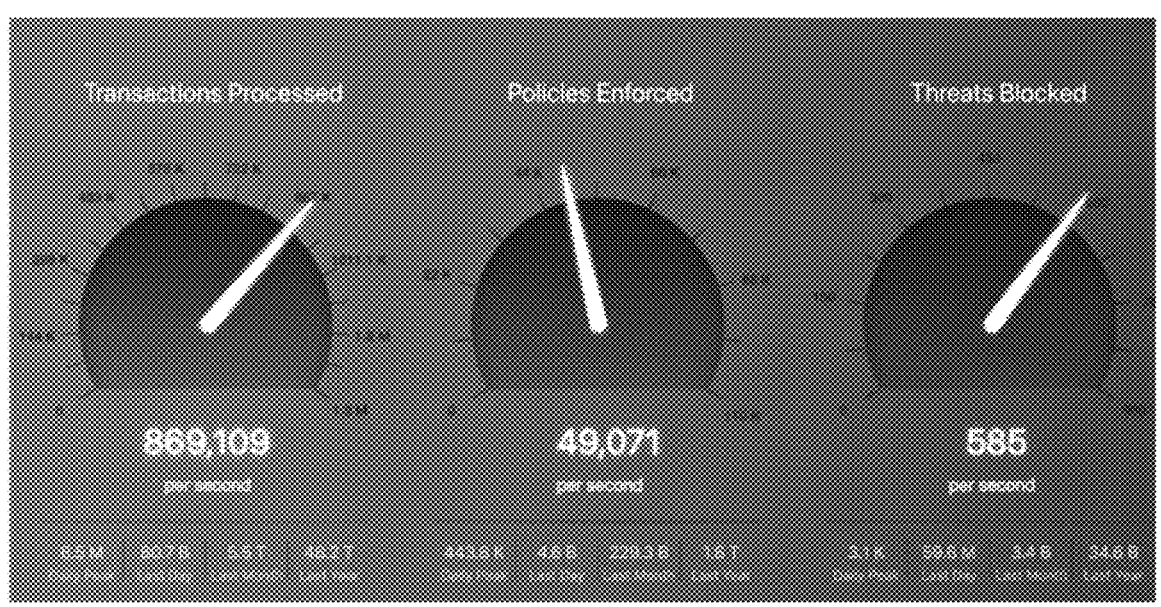
FIG. 52 is a screenshot of a dashboard of the Zero Trust System showing cloud activity and threats blocked.
Figure 53:
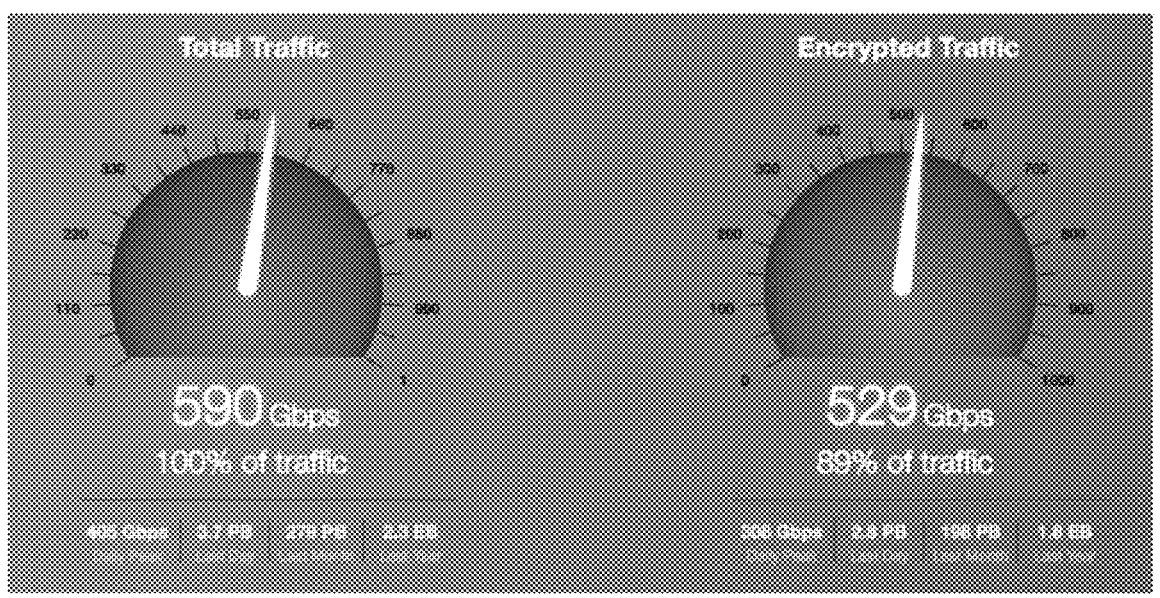
FIG. 53 is a screenshot of a dashboard of the Zero Trust System showing total and encrypted traffic.

FIG. 52 is a screenshot of a dashboard of the Zero Trust System showing cloud activity and threats blocked. FIG. 53 is a screenshot of a dashboard of the Zero Trust System showing total and encrypted traffic. Since data privacy is a common concern, Zscaler allows customers to granularly select which services to inspect. This allows Zscaler to protect against malware, for example, without delving into sensitive banking, healthcare data, etc., whilst delivering controls that are applicable to local laws and compliance requirements. It may be beneficial to deploy inspection for SSL/TLS-encrypted data files. Too often inspections focus on the transport and not the content. This is especially important for common file formats like 7-ZIP, TAR, RAR, PDFs, and Microsoft Office files.

Figure 54:
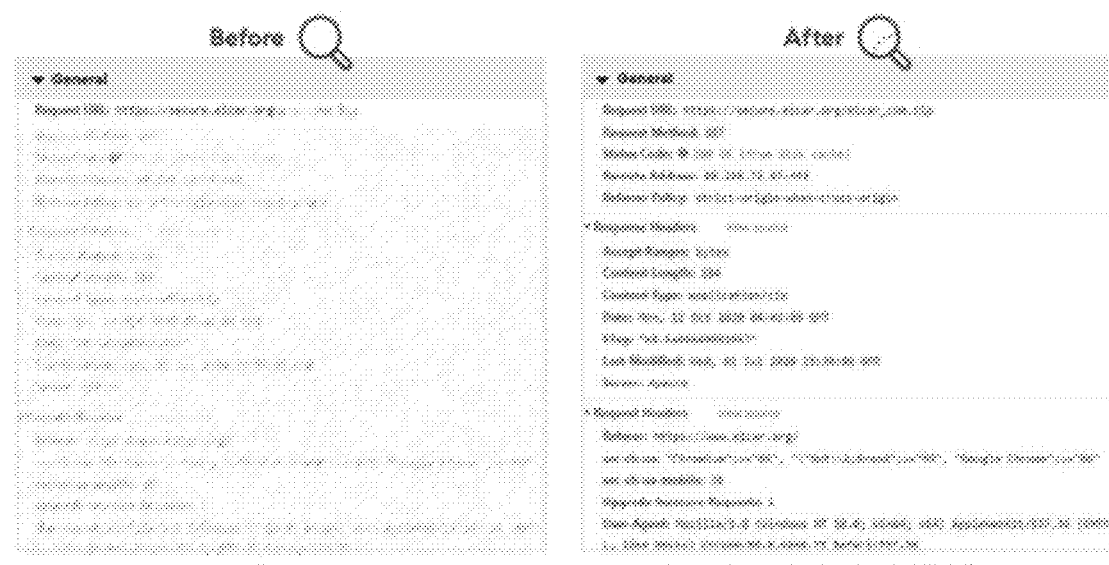
FIG. 54 is a diagram showing an example of SSL/TLS inspection for observing visibility for any security organization.

FIG. 54 is a diagram showing an example of SSL/TLS inspection for observing visibility for any security organization. SSL/TLS may be inspected as follows. Traffic inspection has historically meant initiators and destinations sharing a network context, i.e., connected via the Internet or a local network. Zscaler removes the need for a shared network context by connecting the initiator to the destination at the application layer rather than the network layer (see Element 6 for details).

The Right Control for the Right Application

The Zero Trust System 500 was built on the zero trust premise of ensuring only the correct controls are applied to the correct services. Ensuring these paths are accurate means effective connections and sessions for users, but more importantly, conserves resources. Enterprises may consider that not all traffic types can be, or should be, inspected. These may be addressed by each company under their specific use cases. Why send a video conference stream of real-time voice/video traffic via UDP (Zoom, Teams, etc.) through an inspection path, for example? There's nothing malicious within the video stream itself, so the goal should be to inspect the voice and video control plane traffic while bypassing real-time traffic without inspection.

Another common example is the use of pinned certificates. Often considered obsolete in terms of modern security designs, these are still employed in apps to ensure trust directly between the app and the client without relying on external certificate validation. If these apps are identified and want to be allowed, the appropriate bypasses should be set up to ensure that they function under the conditions for each enterprise.

Zscaler has deployed its inline inspection controls for two different sets of destination workloads: 1) External applications—Internet destinations and SaaS, 2) Internal applications—data center and IaaS/PaaS hosted.

1. External Applications

Figure 55:
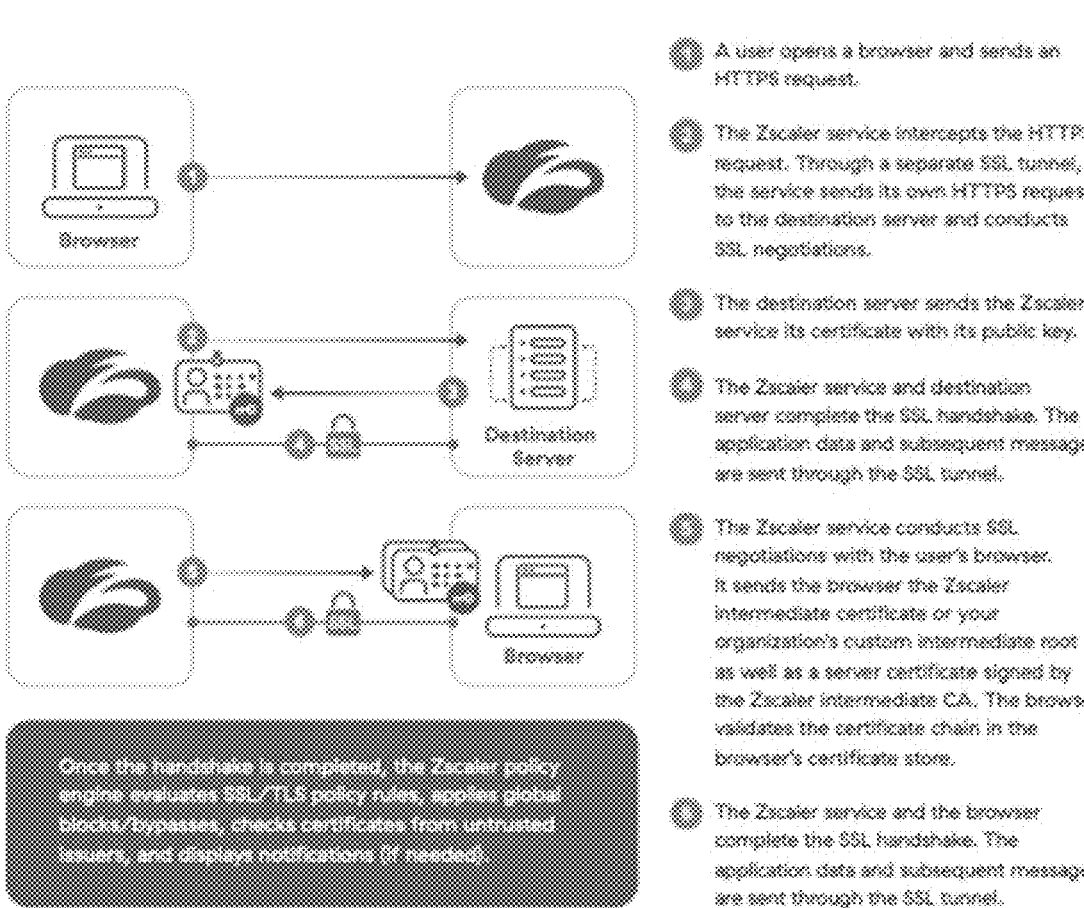
FIG. 55 is a diagram illustrating how the Zero Trust System provides inline inspection for web applications.

FIG. 55 is a diagram illustrating how the Zero Trust System provides inline inspection for web applications. The Zero Trust System 500 may employ a single-scan, multiple access (SSMA) approach to inspection, allowing for multiple checks to be conducted on traffic that is entered into memory only once and providing significant performance enhancements.

Upon inspection of an Internet-bound session with Zscaler, additional advanced threat protections can be simultaneously deployed to ensure the safety of an environment:

Secure Web Gateway (SWG)—SWGs provide a safe, seamless web experience for enterprise end users. They eliminate ransomware, malware, and other advanced attacks in real time by leveraging the best of Zscaler's AI-powered analysis, URL filtering, and control.

Cloud Firewall—Cloud firewalls extend protection to all ports and protocols for industry-leading protection by replacing edge and branch firewalls with a cloud-native platform.

Intrusion Prevention Systems (IPS)—Fully inline, always-on IPS in the cloud allows any connection to receive inline control for stopping malicious activity from being delivered to the enterprise, including blocking activity like DNS tunneling.

Cloud Sandbox—Advanced AI/ML-based cloud sandboxes stop patient-zero attacks with instant verdicts for common file types, automating the quarantine of high-risk, unknown threats.

Leveraging the entire set of post-SSL/TLS inspection tools allows enterprises to establish full visibility of traffic both on and off the corporate network. These insights allow enterprises to protect against malicious attacks without performance impact or compromise. Insights aren't limited to user traffic, either. The ability to inspect any Internet-bound content has knock-on benefits, such as blocking unwanted, malicious server traffic so enterprise workloads can only access sanctioned services, protecting against incidents like the SolarWinds compromise;

identified IoT/OT services in the ThreatLabz Internet of Things Dashboard are updated live with content from our entire cloud; and visibility and protection from threats including botnets, command-and-control, infiltration, etc., allow security operations greater context regarding affected infrastructure.

This inspection ability allows the Zero Trust System 500 to inspect the SSL/TLS traffic on the wire, but even as the Zero Trust System terminates the connections, it retains full visibility over other certificate parameters not typically visible to passive SSL inspection devices. This makes the Zero Trust System:

Cloud scalable—Zscaler's custom TCP and SSL/TLS stack handles encrypted traffic on a global scale. Its architectural advantage ensures that SSL/TLS inspection becomes a non-issue for enterprises. Inspecting traffic, including encrypted traffic, in real time allows the Zero Trust System to identify attacks while keeping an eye out for traffic that may include corporate secrets (see Element 4).

Designed for the future—The majority of SSL/TLS traffic leverages TLS 1.2. While Zscaler has supported TLS 1.2 for years, it has also extended support for PFS with ECDHE and ECDSA ciphers. With Zscaler, supporting TLS 1.3 becomes a seamless change rather than a major configuration overhaul.

Simple—Zscaler's "security-as-a-service" architecture operates seamlessly, without imposing new hardware planning requirements or costly upgrades to accommodate future TLS versions.

2. Internal Applications

When an initiator requests a service within the limits of your own security boundaries—VPCs or on-premises architecture, for instance—the threat model shifts. HTTP-based services may be inspected even after a valid user and acceptable risk score have been verified.

FIG. 56 is a diagram illustrating protection of internal apps with inline inspection. Zscaler is able to protect against the most prevalent web-borne attacks with inline inspection and prevention capabilities for these internal services. These capabilities run within each security boundary of an enterprise app, such that inspection for attacks on Segment A may differ from the inspection controls of Segment B, thus delivering granular control of functions based on the segment and access control needed.

Benefits of inspecting traffic passing through internal trusted services include: a) shielding internal apps from web-based attacks stemming from malicious and non-compliant user traffic, such as OWASP Top 10 attacks, b) detecting compromised or malicious user accounts, since authorized users or devices should not be attacking internal services, and c) the ability to build customized rules to protect enterprise-specific environments.

The Zero Trust System 500 is a complete data protection platform built for both inline and API-based (out-of-band) inspection. It provides detailed visibility of data at rest and in motion to help teams make better data protection decisions and quickly identify malicious content that may be stored in cloud repositories. Further discussion of data protection is provided in Element 6. Inline protection acts as the building block for establishing which data should travel versus which shouldn't. Out-of-bound controls allow enterprises to apply controls to counter any threats against data at rest.

FIG. 57 is a diagram illustrating a sixth progress report of the status of the two example users while they use the Zero Trust System of the present disclosure. The progress report shows the inspection of traffic reveals and blocks malicious content. After the SSL/TLS inspection and threat prevention phase, the zero trust process has oversight of the applications the initiator has accessed. The contents of this view allow further insights to be applied to the policy decision.

Sixth Element 516

Figure 58:
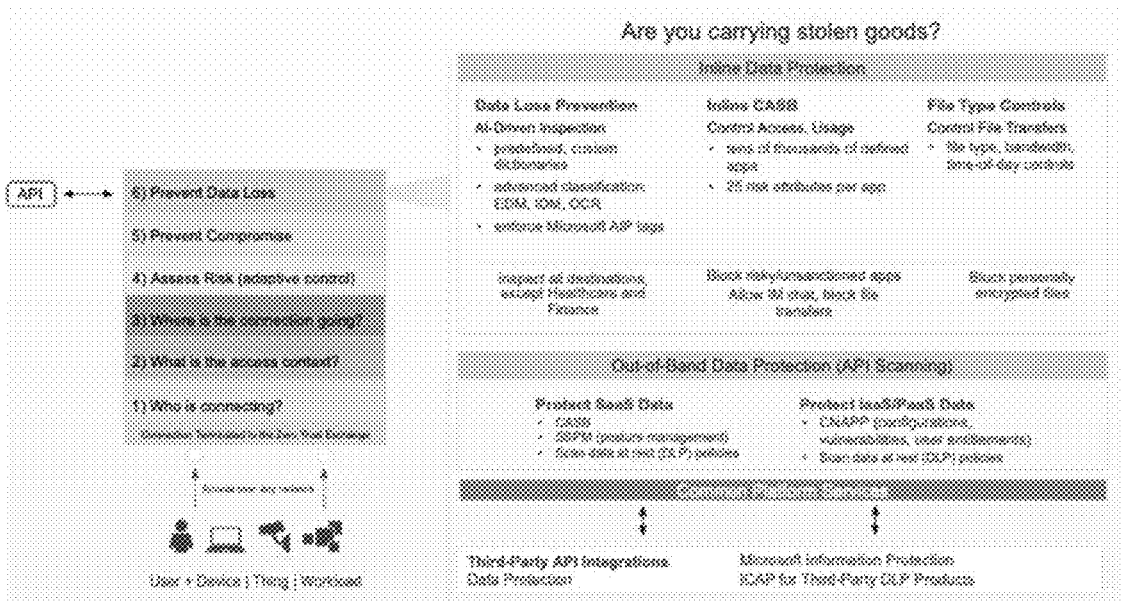
FIG. 58 is a diagram illustrating an embodiment of the sixth element shown in FIG. 14 of the Zero Trust System to leverage inspection for the protection of sensitive data.

FIG. 58 is a diagram illustrating an embodiment of the sixth element 516 shown in FIG. 14 of the Zero Trust System to leverage inspection for the protection of sensitive data. This includes the process of preventing data loss and leverages inspection for the protection of sensitive data. As part of the control phase of the Control Unit 504, enterprises may consider what data leaves the organization. SSL/TLS inspection at scale ensures that attacks against an enterprise are stopped, and this same inspection can also be applied for data egress controls.

This may be significant in that the ability to inspect traffic destined for the Internet, SaaS, or internal applications may be important for identifying and preventing the loss of sensitive data. The use cases may be applicable for the Internet, where both inline decryption and inspection and out-of-band API scanning may ensure that sensitive data is not leaked or exfiltrated to unauthorized cloud services. However, the same protections should be extended to internal application access. This capability applies to both managed and unmanaged devices and is also important when considering IoT/OT devices and workload communications.

As outlined in the previous element, 80% percent of web traffic may be encrypted, including common tools used by both enterprise and private users such as the file-sharing services Dropbox and Google Drive, or collaboration tools like Microsoft 365 and Google Chat. If this traffic is completely encrypted, enterprises are powerless to understand what's being sent to these environments. This means businesses are unable to protect against both inbound malicious payloads and illicitly outbound intellectual property. However, concerns are not limited solely to users. As the 2020 SolarWinds breach showed, enterprises not monitoring server data sent outbound to the open Internet are unlikely to be able to stop the exfiltration of sensitive data, e.g., via a supply chain attack.

Once SSL/TLS interception is enabled, an enterprise deploys the necessary inline controls to protect against information and intellectual property leakage. Traffic inspection allows enterprises to identify not only what intellectual property is being accidentally shared but also enables greater identification and protection against ransomware attacks.

Figure 59:
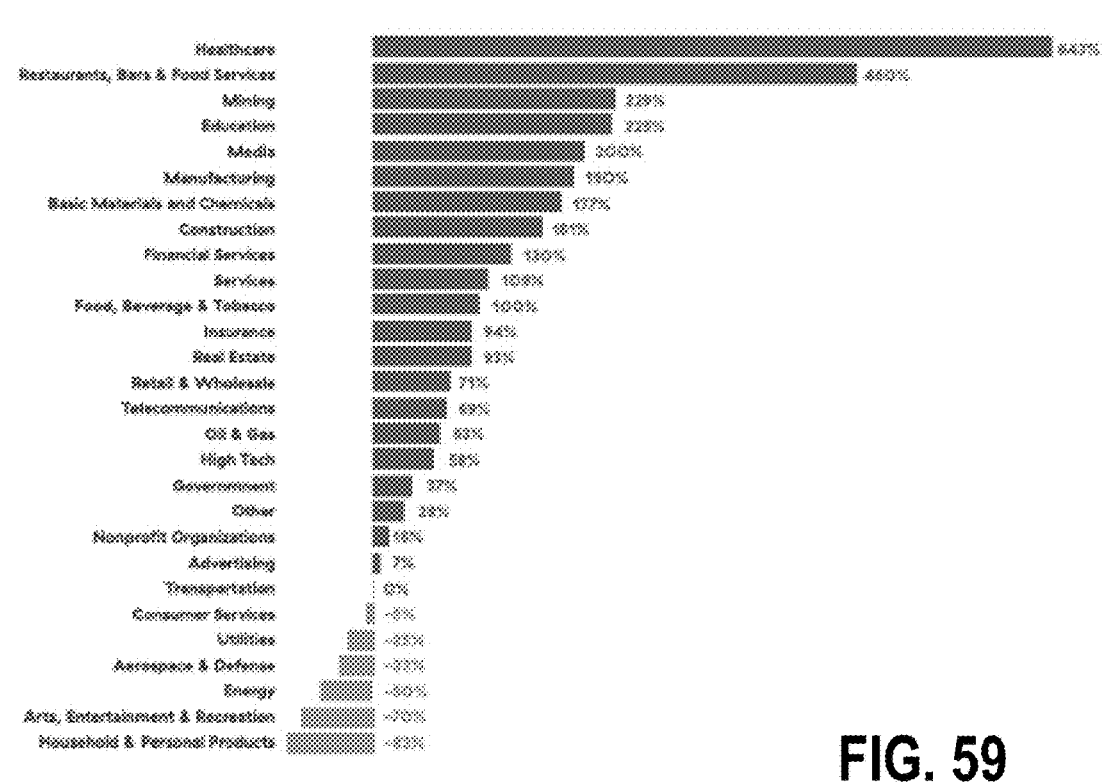
FIG. 59 is a chart illustrating an example of an industry breakdown of double extortion attacks in 2021 compared to 2020 from Zscaler's Ransomware Report.

Zscaler's 2022 Ransomware Report documented a substantial increase in attackers now exfiltrating data as part of double extortion attacks. Attackers are now asking for ransoms not only to decrypt enterprise systems but are also increasingly stealing intellectual property only to ransom it back to the same company. FIG. 59 gives a high-level view of the rate of change from 2020 to 2021.

FIG. 59 is a chart illustrating an example of an industry breakdown of double extortion attacks in 2021 compared to 2020 from Zscaler's Ransomware Report. FIG. 60 is a diagram illustrating business challenges due to lack of data protection. Again, we arrive at the problem of determining the correct balance between inspection and privacy. This review may be understood in terms of enterprise risk.

Technology & Architecture Considerations

Widespread adoption of cloud applications means organizations' sensitive data is widely distributed. The top two enterprise data exfiltration channels are cloud desktop and personal email applications. Adequate protection technologies should deliver complete contextual visibility and enforcement capabilities when rogue users upload sensitive data to personal cloud desktops. They should also stop data exfiltration on personal and unsanctioned webmail services like Gmail and Outlook.

Protection starts with blocking access to unauthorized users. This is the simplest protection policy. Consider two examples: 1) For users and devices—Implementing controls against destinations that contradict corporate policy, such as webmail services. 2) For IoT/OT devices and workloads—Restricting workload or OT services to communications with relevant services such as patching solutions or preventing a workload's access to unnecessary services such as YouTube.

The protection outlined in Element 3 may be able to seamlessly create sets of common apps that relate to a singular service—for example, Microsoft 365 is a set of separate applications that can be addressed as a group or individually. These protection solutions may also be able to differentiate between personal and professional applications and cloud services and apply sets of rule definitions appropriately. As an example, a CEO should be able to upload financial reports to a corporate SharePoint file store, but unable to upload the same files to a personal file sharing service.

FIG. 61 is a diagram illustrating an example of functions of the Zero Trust System for an effective data protection solution. Enterprise resource protection may also include the ability to view resources that may be out-of-band, which entails scanning the APIs of SaaS providers to protect data at rest, or inline, which may require the scanning of data in motion in some cases.

Pro Tip: Building data protection libraries can be intimidating. Start with predefined dictionaries, but also ask what types of data, like intellectual property, shouldn't be exposed to competitors.

Inspection and subsequent protection policy application may happen at scale, wherever the user is located. It cannot be centralized in a data center or destination cloud if it's to pass through at scale. Upon decryption, protection policies may deliver appropriate controls based on the identity and app access permissions verified in Elements 1, 2, and 4. This protection policy includes two key areas, data in motion and data at rest.

Data in Motion (Inline Controls)

Information passing from the initiator to a destination application may be reviewed to ensure it does not contain sensitive corporate information. With inline inspection, enterprises can prevent data from being uploaded to unsanctioned apps, being downloaded to unauthorized devices, and malicious content from being downloaded or uploaded.

Data at Rest (Out-of-Band Controls, Independent of SSL/TLS Inspection)

Data stored in cloud services may also be assessed to mitigate corporate information leakage. This should be queried via APIs to identify. Cloud access security broker (CASB) solutions offer these out-of-band controls for granular access based on a rich set of cloud app definitions, file type controls, and risk attributes. Note: Any file store that leverages file-level encryption like AES would be visible to an out-of-band API as an encrypted file only. There is no visibility within the contents of the file.

Both of these functions may rely on protection solutions including: a) File type control—Define acceptable files for enterprise access, b) Cloud app control—Determine which cloud apps are allowed and which are not, c) Machine learning-enabled DLP—Improve the accuracy of sensitive data departure detection, d) Exact data match—Index structured data (for example, your specific credit cards versus a 16-digit number that algorithmically could be a credit card, etc.) to help reduce false positives, e) Optical character recognition—Block sensitive data found in images or screenshots, f) Indexed document matching—Protect high-value documents containing sensitive information like intellectual property, etc.

These protection solutions empower enterprises to break an attacker's kill chain, as outlined in the white paper Transforming Cybersecurity Response with Zscaler using the MITRE ATT&CK Framework. Note: If the control assessment of Prevent Data Loss cannot be met, the access should default, as outlined in FIG. 16, to a Conditional Block policy.

The Zero Trust System 500 may be configured to accomplish this as follows. Protection may be considered to be more than simply cloud access security. The Zero Trust System 500 protection follows users wherever they go, ensuring that data protection controls are applied even when users connect direct-to-cloud. This provides a range of benefits that can only be delivered by a global, purpose-built security cloud.

The Zero Trust System 500 is a complete data protection platform built for both inline and API (out-of-band) inspection. It provides granular visibility of data at rest and in motion to help teams make better data protection decisions and quickly identify malicious content that may be stored in cloud repositories or unauthorized uses of shadow IT. Essentially, inline data protection acts as the building block for establishing the paths data should travel versus the ones it shouldn't.

With the Zero Trust System 500 in place to control what data should leave your network and what sanctioned apps need to be secured, enterprises can start considering out-of-band CASB for protecting data at rest. This prevents sensitive information from being shared via open Internet links or handed over to unauthorized groups. Out-of-band controls can scan cloud apps for dangerous malware and leverage AI/ML-enabled sandboxing to quickly identify files that shouldn't be mixed in with sensitive data.

Inspection and prevention policy application happens at scale regardless of user location through a single, globally distributed platform without the need for multiple prevention solutions to be cobbled together. This gives enterprises full visibility and control of any and all intellectual property or sensitive content being in motion or at rest. These Zero Trust System functions are built on integrations across various SaaS applications and public clouds.

Zscaler implements technologies to identify such assets, including: A) Visibility of and insight into cloud apps, such as 1) Tens of thousands of cloud app definitions, 2) Multiple levels of risk attributes per app definition, etc.; B) Data loss prevention, such as 1) File type/size control, 2) Predefined dictionaries and engines, 3) AI/ML dictionaries and engines, 4) Custom dictionaries, 5) Reg-ex and proximity filters, 6) Advanced classification, 7) Exact data match, 8) Indexed document matching, 9) Optical character recognition, 10) AIP/MIP integration, etc.; C) User and Entity Behavior Analytics (UEBA) (which also contribute to risk scores discussed in Element 5), such as 1) AI and ML-based analytics, 2) Threshold-based user anomalies, etc.; D) SaaS and Cloud Security Posture Management (SSPM/CSPM), such as 1) Evaluate SaaS and IaaS configurations and permissions to automatically remediate issues, etc.; and E) Out-of-band (API-driven) CASB, such as 1) Predefined, customizable DLP dictionaries for SaaS and public clouds like AWS, 2) Collaboration management searches for risky file shares and revokes access, 3) Cloud sandbox scans data at rest to identify and respond to zero-day malware and ransomware, 4) Zscaler's Browser Isolation streams pixels instead of actual web content to protect data, etc.

Figure 62:
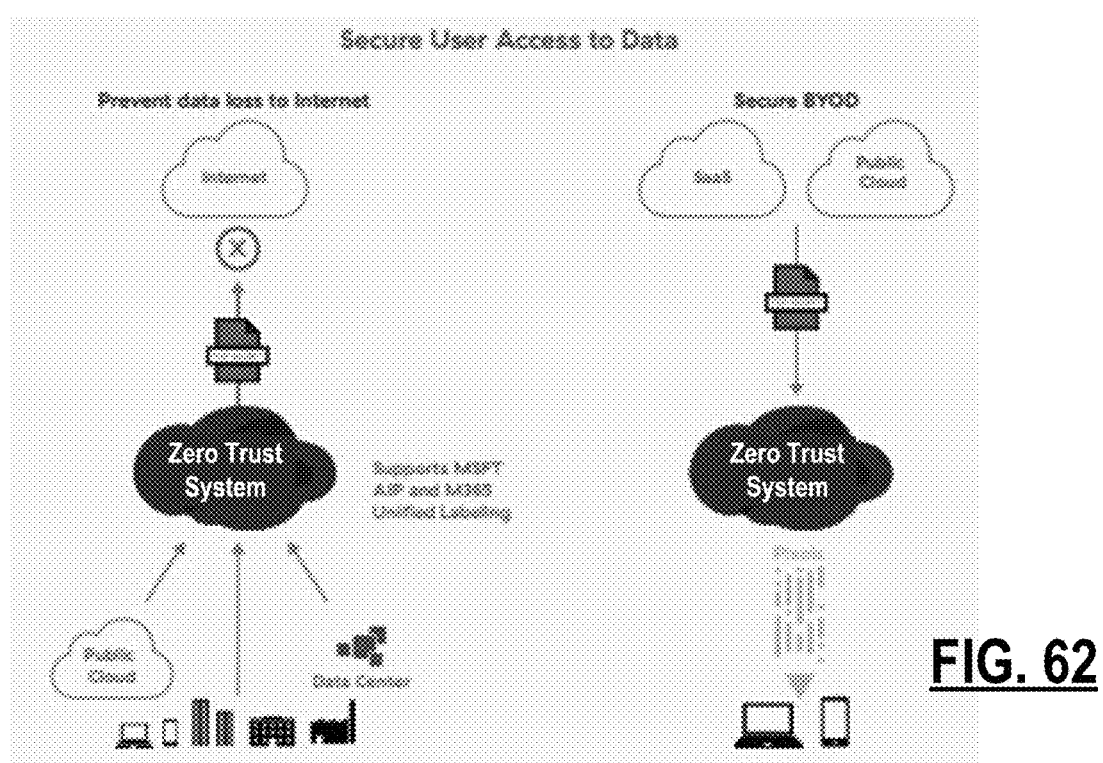
FIG. 62 is a diagram illustrating an example of the use of the Zero Trust System to provide secure user access to data.
Figure 63:
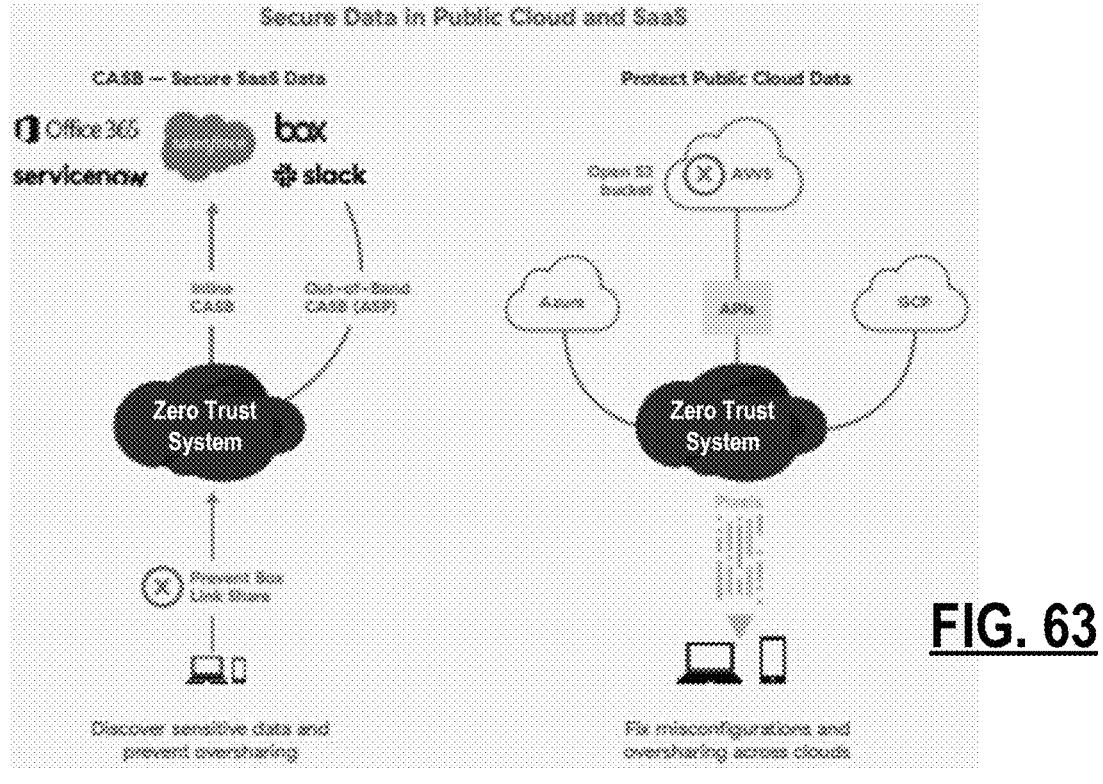
FIG. 63 is a diagram illustrating an example of the use of the Zero Trust System to secure data in the public cloud.

FIG. 62 is a diagram illustrating an example of the use of the Zero Trust System 500 to provide secure user access to data. FIG. 63 is a diagram illustrating an example of the use of the Zero Trust System to secure data in the public cloud. Zscaler can also provide secure, controlled access for unmanaged devices (BYOD) requesting information. What happens to the information once it's downloaded to an unmanaged device is that organizations may control how this data is accessed and where it resides. Thus, Zscaler's Browser Isolation enables access to private data without allowing the data to persist on the device by streaming pixels rather than allowing unfettered browser access.

Beyond inspection of traffic and content, Browser Isolation can deliver a safe gap between users and the Internet and SaaS-based web apps that they connect to. By rendering app content as a stream of images, Browser Isolation allows enterprises to deliver access to services to valid users without ever allowing direct connections to the app itself. This eliminates the possibility of data leakage or threat delivery. Zscaler delivers isolation for both external and internal services as outlined in Element 7 covering policy enforcement.

This comprehensive set of inline protection controls gives the Zero Trust System the unique ability to provide views of who is accessing what on the Internet. Given this capability, Zscaler is able to offer reports including: a) A Shadow IT report—A per-tenant view of unknown, Internet-connected devices, b) An IoT Dashboard—A global view of IoT services using Zscaler's cloud, c) Cloud Application Dashboard—Insight into cloud apps consumed across Zscaler's clouds, etc.

FIG. 64 is a chart illustrating an example of a Zscaler Cloud Application Dashboard. In assessing what information should be protected for each session, the control section identifies anything that may be unnecessarily exposed, then exercises the appropriate controls.

FIG. 65 is a diagram illustrating a seventh progress report of the status of the two example users while they use the Zero Trust System of the present disclosure. This progress report includes an evaluation of data loss.

Enforcement Unit

The Enforcement Unit 506 is configured to enforce policy. The Verification Unit 502 and Control Unit 504 include stages that present a status snapshot in time. It may be noted that these identity and context processes are evaluated, perhaps on a constant basis, before policy is applied. The policy engine considers the output of a dynamic assessment, which may includes various categories, criteria, and insights pertaining to each access request. Policy can only be enforced precisely when the full context of the user, app, device posture, etc., informs the decision. The policy outcome is to either allow or restrict access based on this context.

Seventh Element 517

Figure 66:
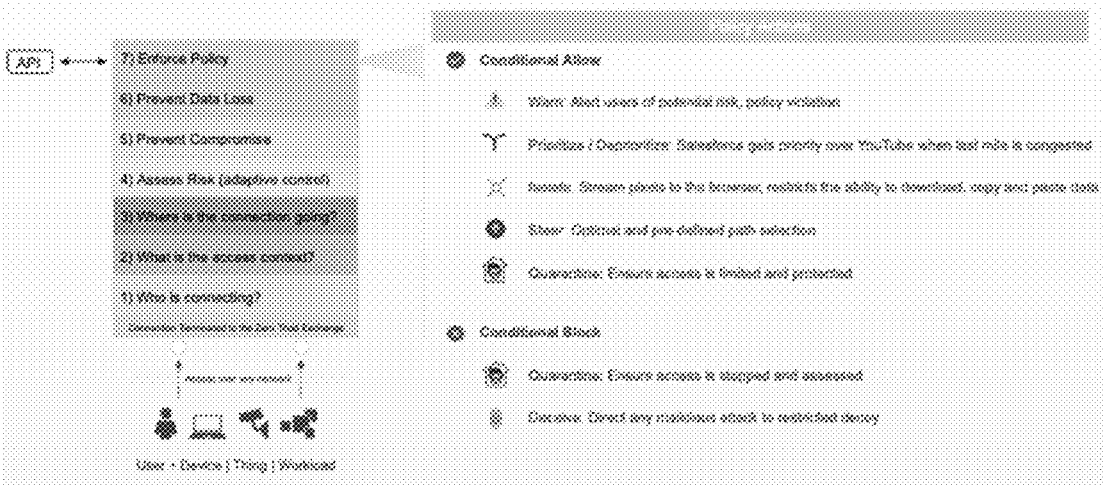
FIG. 66 is a diagram illustrating an embodiment of the seventh element shown in FIG. 14 of the Zero Trust System where access policy is enforced based on a number of Conditional Allow or Block actions.

FIG. 66 is a diagram illustrating an embodiment of the seventh element 517 shown in FIG. 14 of the Zero Trust System 500 where access policy is enforced based on a number of Conditional Allow or Block actions. Following the Verify and Control stages, and armed with an understanding of dynamic risk assessments, we arrive at the point of enforcement. Enforcement is not centralized on a network of dedicated equipment, as is often the case with traditional security solutions. Authorization decisions made in Element 1 and the assessments in Element 2 influence enforcement in our current stage. This may be significant in some cases that policy enforcement may be constantly and uniformly applied. This is only possible when policy remains the same and is applied equally regardless of location of the enforcement point.

Technology & Architecture Considerations

Zero trust allows us to start at zero. Access is denied to anyone or anything as an initial condition. This means no services, FQDNs, or IPs are exposed or can be discovered. An initiator can only connect to their requested destination as befitting their access criteria. This type of invisibility-until-permission is only possible if policy is enforced independent of the network and, most importantly, if the initiator and the destination are abstracted from one another.

Policy enforcement may take into consideration previously validated qualities: 1) Identity, 2) Context, 3) Application destination, 4) Dynamic risk, 5) Malicious content, 6) Data loss, etc.

Policy Enforcement Actions

Following any decision, enforcement takes on one of the following actions, either conditional allow or conditional block.

Conditional Allow

Access is granted to the requested application not as a blind allow-and-connect, but with the ability to deliver additional controls, such as isolation, inspection, and warnings.

Conditional Block

If conditions of an access request are flagged in Elements 1-6, access is blocked. Block controls can be called at any time during Elements 1-6 if an initiator fails one of the tests. For example, access would be blocked if an authorized user and device are validated, but then malware is downloaded. The Zero Trust System 500 may be configured to accomplish this as follows. Traditional, network-based solutions connect initiators to a shared network, either physically on a local network or logically via a virtual private network (VPN). This extends the network to wherever a user is connected, and control is applied at the network layer.

Anyone on that network can see other nodes. A control, such as a firewall, can minimize some of the attack surface, but if access is needed to a service, there may still be an open path through the controls. This is similar to FIG. 67 below where standing on a street allows an onlooker to see each house, approach it, and test if their key works in the door.

Figure 67:
FIG. 67 is a diagram illustrating conventional network controls that preserve visibility so anyone can see all of the metaphorical houses and doors.

FIG. 67 is a diagram illustrating conventional network controls that preserve visibility so anyone can see all of the metaphorical houses and doors. The Zero Trust System 500 has the enforcement policy which allows for various controls to be enforced based on the formula indicated in FIG. 68.

Figure 68:
FIG. 68 is a diagram illustrating the use of valid inputs of the first through sixth elements shown in FIG. 14 for obtaining a valid output of the seventh element for an accurate and granular policy to be enforced.

FIG. 68 is a diagram illustrating the use of valid inputs of the first through sixth elements shown in FIG. 14 for obtaining a valid output of the seventh element for an accurate and granular policy to be enforced. Enforcement within the Zero Trust System 500 is not simply limited to the two options of "conditional allow" or "conditional block." Its controls are at the application layer, not at the network layer as with legacy network control solutions. The Zero Trust System is implemented as a proxy for applications and thus allows for policy control at a very granular level.

Figures 69, 70:
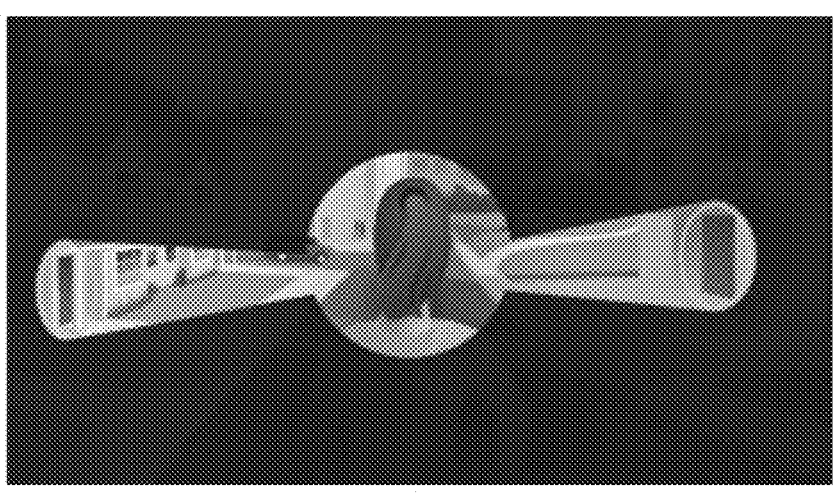
FIG. 69 is a diagram illustrating a metaphorical example use of the Zero Trust System to ensure users can access what they need and nothing more.
FIG. 70 is a diagram illustrating a policy enforcement of the Zero Trust System to provide either a "conditional allow" or "conditional block" output.

FIG. 69 is a diagram illustrating a metaphorical example use of the Zero Trust System 500 to ensure users can access what they need and nothing more. The Zero Trust System 500 provides numerous Conditional Allow and Conditional Block outcomes:

A. Conditional Allow
   1. Allow: If all elements are answered, then the Zero Trust System will allow traffic to pass.
   2. Warn and Allow: Similar to the Allow outcome, a warning allows a company to state that, while access is allowed, the risk of the initiator or the destination is not clear. The enterprise can then prompt the initiator to be aware of the risk and then continue.
   3. Prioritize (bandwidth control): Empowers enterprises with dedicated network links to preserve access to business-critical applications regardless of network bandwidth consumption. This allows the creation of rules to prioritize business-critical application traffic.
   4. Deprioritize (bandwidth control): Empowers enterprises with dedicated network links to preserve access to business-critical applications regardless of the Internet pipe consumption. This allows for the creation of restrictive rules around social media and streaming media.
   5. Isolate: This creates a safe gap between users and the web, rendering content as a stream of pixels to eliminate data leakage and the delivery of active threats.
   6. Steer: This decision instructs on how to send traffic. Steering is a mechanism for sending traffic to non-standard destinations. This could be for leveraging an anchored IP address for geo-specific solutions or sending traffic through a more effective path.
   7. Quarantine and Allow: This result uses cloud sandbox and AI/ML to identify potentially harmful content, which is then "detonated" in a safe environment. If benign, the connection is granted.

The Zero Trust System 500 allows for multiple enforcement controls to be applied in policy and not simply make a binary decision of allow or block. For example, if users are connecting to an external portal that has a source IP trust requirement, a Zscaler policy could be built to (1) steer traffic from an egress IP address, (2) prioritize traffic, and (3) isolate the session in a web browser. This multilayered policy enforcement delivers powerful controls for enterprise protection and decisions. Enterprises can build various levels of policy enforcement based on the outcomes of the previous six elements. These policies should enforce business outcomes, risk mitigation, and security posture, as examples.

B. Conditional Block

1. Block: If the conditions of your access requests do not pass the evaluations of Elements 1-6, then the Zero Trust System will block the session.

2. Deceive: Deception is a proactive defense approach that detects active threats by populating an environment with decoys: fake endpoints, files, services, databases, users, computers, and other resources that mimic production assets for the sole purpose of alerting of an adversary's presence.

3. Quarantine and Block: This uses cloud sandbox and AI/ML to identify potentially harmful content, which is then "detonated" in a safe environment. If dangerous, the connection is blocked.

FIG. 70 is a diagram illustrating a policy enforcement of the Zero Trust System 500 to provide either a "conditional allow" or "conditional block" output. Upon the completion of the policy enforcement phase of the Zscaler Zero Trust System: a) All elements will have been evaluated, b) Assessments are completed, c) Scores are assigned, d) Access has been conditionally allowed or conditionally blocked, etc. Should access be granted, then the last step for access is the ability to get traffic to the correct destination application.

Figure 71:
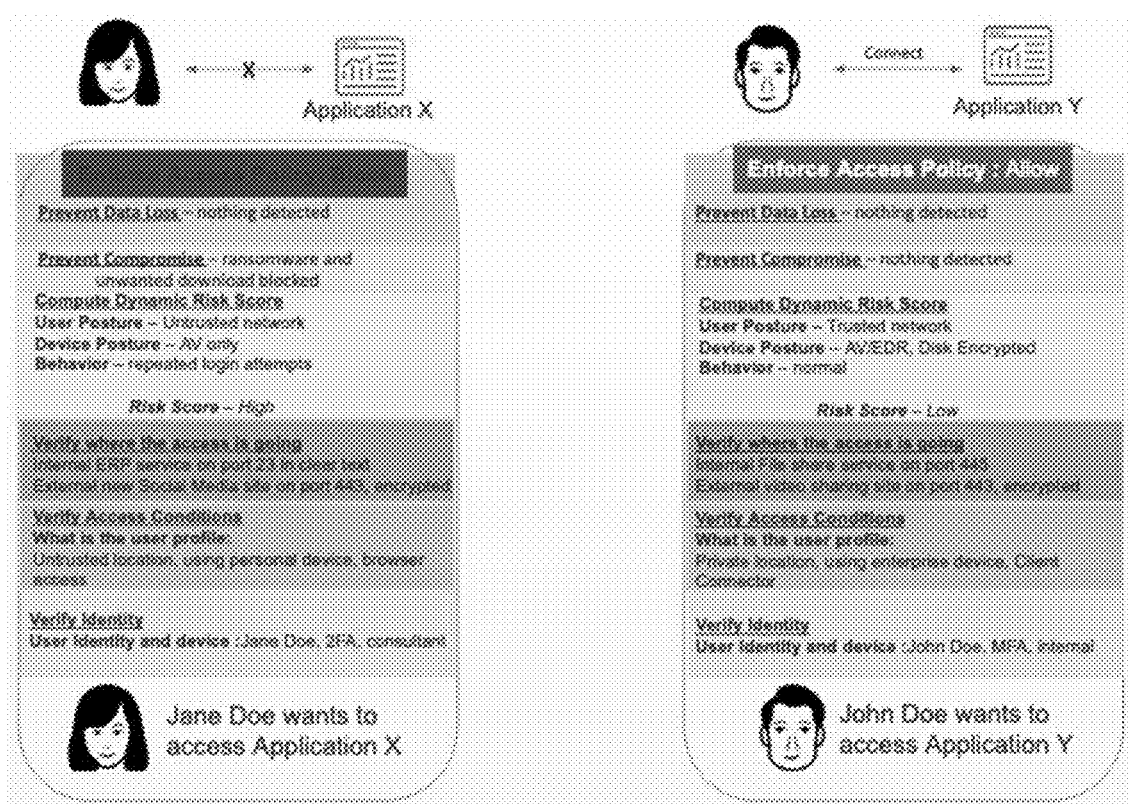
FIG. 71 is a diagram illustrating an eighth progress report of the status of the two example users while they use the Zero Trust System of the present disclosure.

FIG. 71 is a diagram illustrating an eighth progress report of the status of the two example users while they use the Zero Trust System of the present disclosure. In this progress report, Jane's request is blocked based on an evaluation of the seven elements, while John's access is allowed.

Connecting to the Applications

Figure 72:
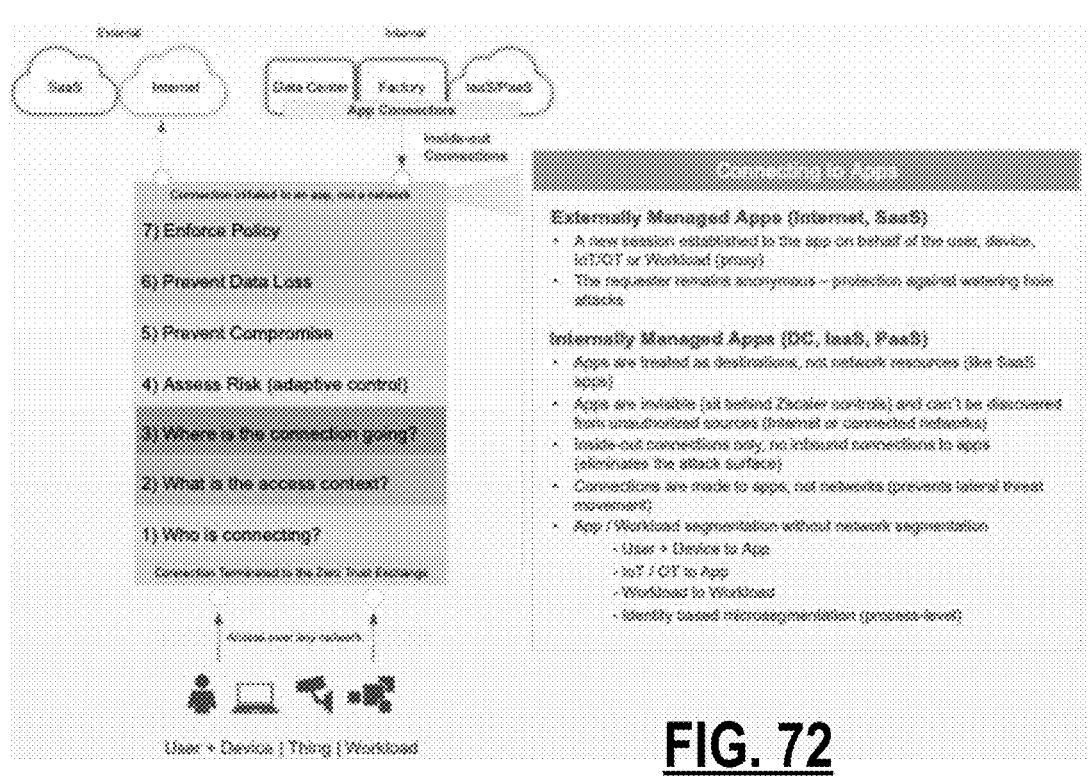
FIG. 72 is a diagram illustrating an example use of the Zero Trust System to ensure users can access allowed apps and nothing more.

FIG. 72 is a diagram illustrating an example use of the Zero Trust System to ensure users can access allowed apps and nothing more. This may be significant because of the following. It may be noted that policy enforcement may normally be constantly and uniformly applied, and this is only possible when policy is applied equally no matter where the initiator is based or where the applications are hosted.

Take your house or apartment, for example. The locks on your doors are for your doors only. You can't use your keys to enter someone else's house and, conversely, people can't use their keys on your locks. Each key is meant to be unique. This idea of local control has long been utilized within traditional security controls.

The network to which a user was connected historically determined security control. The challenges for this sort of control may become obvious when a user moves from one network to another. Once the "other network" is being used, controls can no longer be applied to the user. Again, it's like taking your own keys and trying to use them to open doors on another house.

It is highly inefficient to move network controls and infrastructure to where users are based. Control solutions that move networks to the cloud or extend the network to the user are simply extending an already costly solution over additional networks to farther and farther reaches of the Internet.

Figure 73:
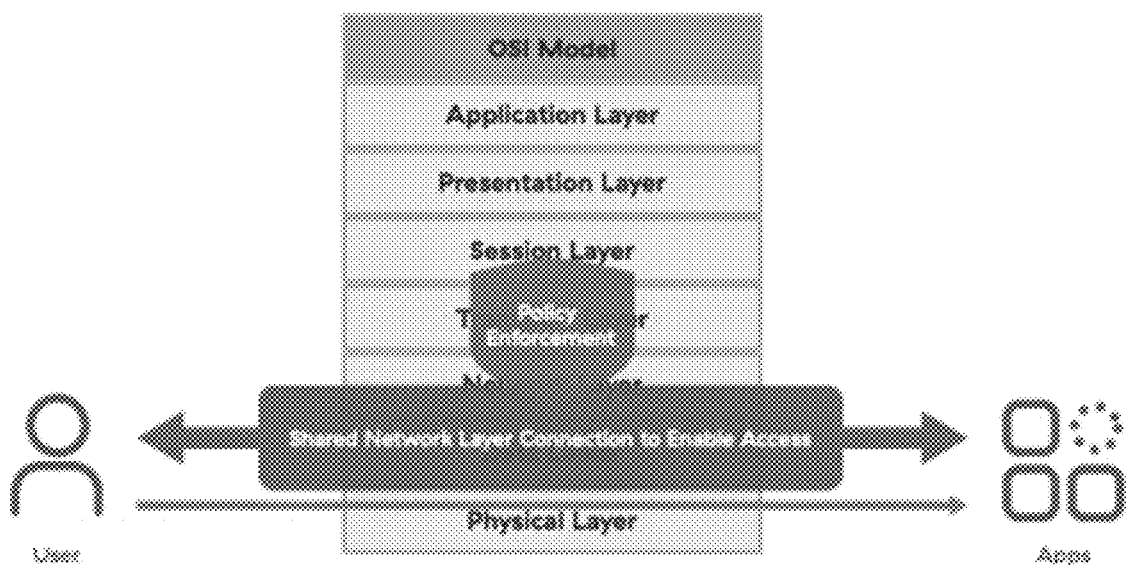
FIG. 73 is a diagram illustrating a network layer connectivity of the Zero Trust System using a policy enforcement scheme using legacy network controls.

FIG. 73 is a diagram illustrating a network layer connectivity of the Zero Trust System using a policy enforcement scheme using legacy network controls. If you share a network context, then anyone can "knock on your ports" just like a person can knock on your door. This is essentially discovering anything on a shared network because the controls are on the network. It is this knocking process that allows the curious or worse, the malicious, to discover the services, hosts, names, domains, etc., of your enterprise network.

In the houses and streets example, you put locks on your doors (passwords) and put up multiple physical (network) controls like fences, gates, and hedges (firewalls, ACLs, etc.) around your houses or buildings to protect them. You also replace those fences once they get too old. Sure, this makes it harder for bad people to get in, but it still means people can see that a property exists. Networks are relevant in delivering zero trust application traffic, but they are not the mechanisms where control is enforced. Zero trust controls are not network focused, they are applied regardless of the location of the initiator, or the workload that is being accessed.

This may include two architectural shifts: a) Globally available access controls—Ensure control is available regardless of location and situation. If the initiator requests or attempts access, then enforce the control policy, b) Dynamic, granular, and variable controls—Apply controls not only at the application layer, but also specific to each individual initiator and their rights to consume the destination service, etc. This means it doesn't matter where services are: the controls are applied uniformly. Controls should be independent of the network and be defined for application access. The network is merely a means of transport, thus controls may be applied "on top."

Figure 74:
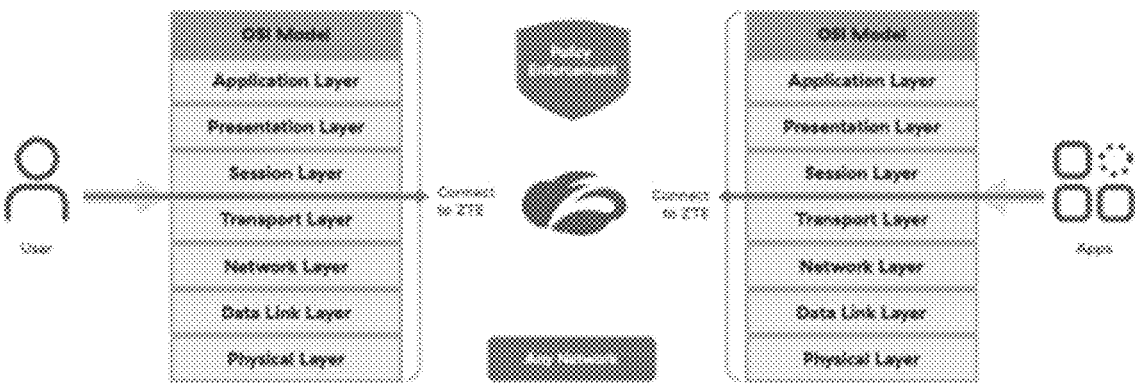
FIG. 74 is a diagram illustrating an example use of the Zero Trust System that overlays a policy enforcement control layer abstracted from the network layer.

FIG. 74 is a diagram illustrating an example use of the Zero Trust System that overlays a policy enforcement control layer abstracted from the network layer. The Zero Trust System 500 may accomplish this as such. The previous elements determined whether or not to connect the entity to the desired resource. Element 7 ensures that the connection itself is in fact protected.

Figure 75:
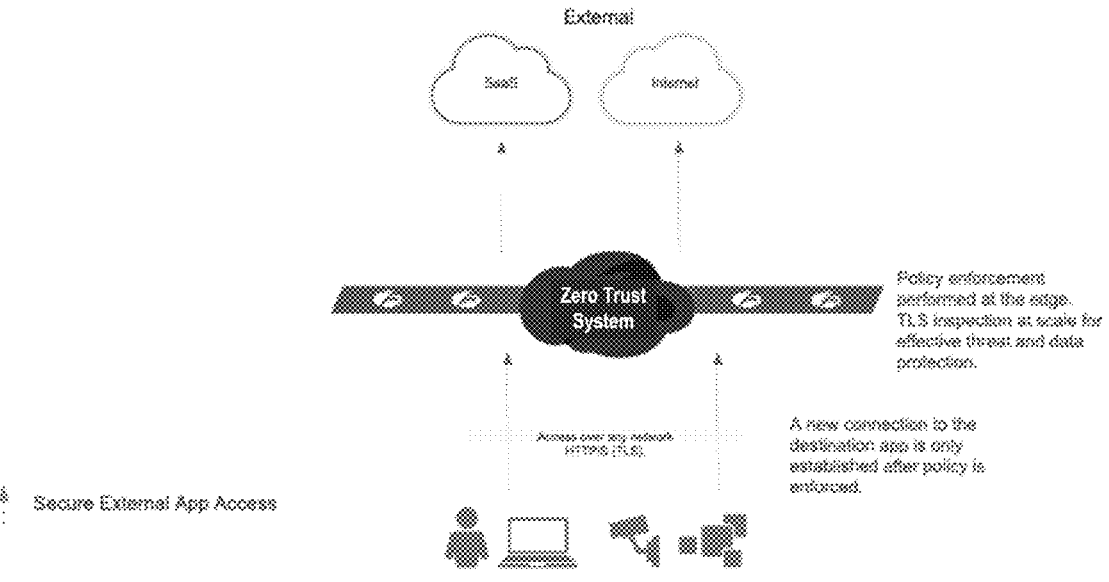
FIG. 75 is a diagram illustrating an example use of the Zero Trust System for external apps where connections pass directly from the Zero Trust System to the destination after policy is enforced.

FIG. 75 is a diagram illustrating an example use of the Zero Trust System for external apps where connections pass directly from the Zero Trust System to the destination after policy is enforced. Establishing connectivity from the Zero Trust System to SaaS or Internet-hosted applications is relatively straightforward. It is simply an outbound connection that creates the TCP session between the Zero Trust System and destination and completes the user/device, IoT/OT device, or workload-to-application connection.

Note: The destination application path can be selected, or steered, using the Zscaler Internet Access Policy, allowing customers to determine where their traffic will egress to the Internet. This helps customers address topics like SourceIP anchoring challenges where Internet services only work with geo-controlled IP sources.

Internal applications requiring privacy and stronger protection are slightly more complicated; the Zero Trust System leverages App Connectors, which sit adjacent to the application destination. These App Connectors provide the outbound-only connection from the app environment to the broker function within the appropriate Zero Trust System Service Edge.

Figure 76:
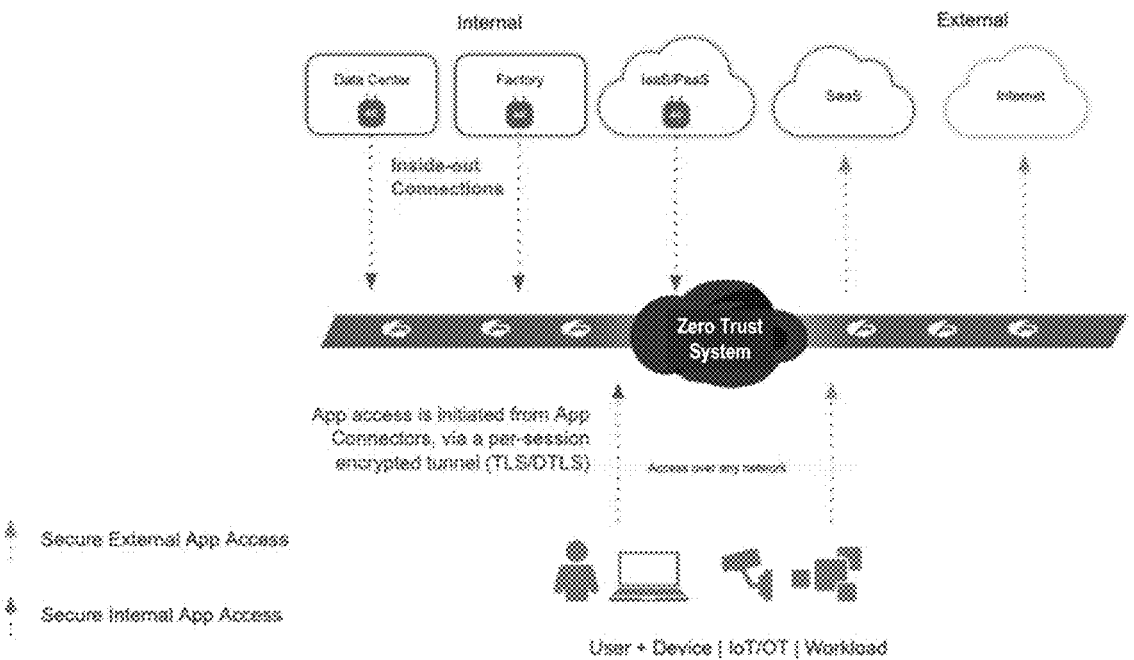
FIG. 76 is a diagram illustrating an example use of the Zero Trust System for internal apps where connections are brokered by the Zero Trust System through two outbound tunnels.

FIG. 76 is a diagram illustrating an example use of the Zero Trust System 500 for internal apps where connections are brokered by the Zero Trust System through two outbound tunnels. Both initiators and App Connectors leverage an encrypted connection outbound to the Zero Trust System 500. The Zero Trust System 500 then functions as a broker to stitch these connections together and allow users access to the application. This function is similar for users or workloads. This is very important for internal applications, as the main goal of zero trust architecture is to eliminate the attack surface presented by exposed IPs of firewalls and VPNs that protect these internal apps. The Zero Trust System Service Edge connection, while generally public and accessible to any authorized entity from the Internet, can also be run locally within individual customer locations for seamless deployment of the zero trust controls.

Figure 77:
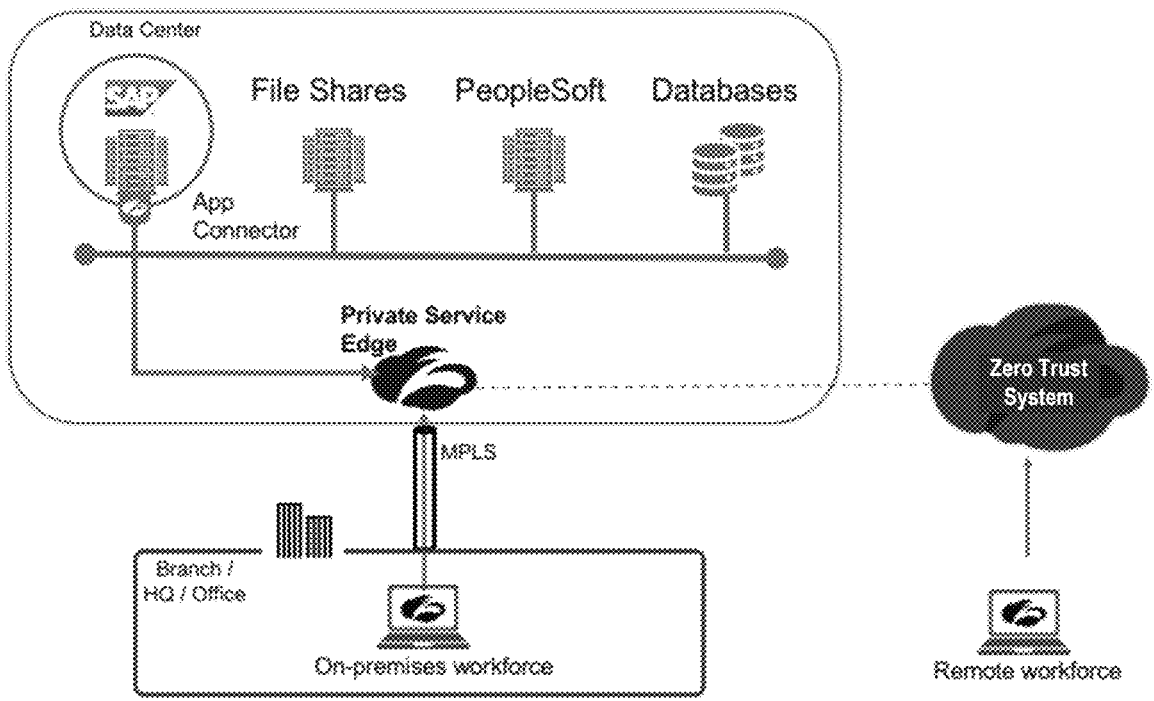
FIG. 77 is a diagram showing the use of the Zero Trust System in a Private Service Edge, providing local zero trust enforcement inside an enterprise ecosystem.

FIG. 77 is a diagram showing the use of the Zero Trust System in a Private Service Edge, providing local zero trust enforcement inside an enterprise ecosystem. Local deployments allow for sessions to be controlled within regions or sites to best suit the end customer. These services are similarly broken down by the Internet and Private app paths. Virtual and Private Service Edges are available for Internet Application Access and Private Service Edges are available for Private Application Access.

Figure 78:
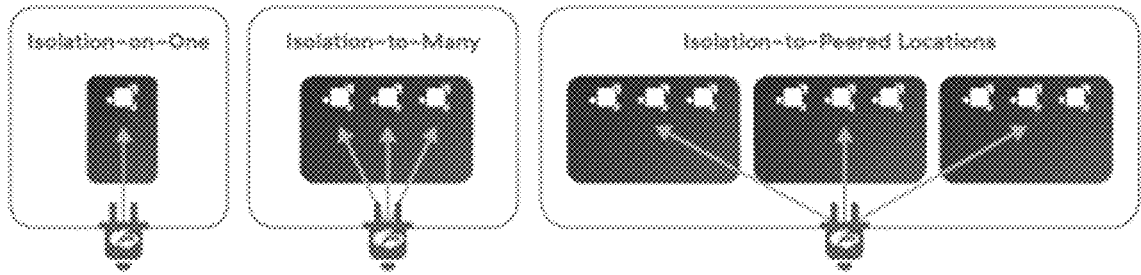
FIG. 78 is a diagram illustrating examples of internal application isolation.

In the situation where the policy engine defines Browser Isolation as a Conditional Allow path, the Zero Trust System will not allow an initiator to access HTTP-based applications directly. Rather, these isolated access requests will have the workload rendered for the user within the Zero Trust System by streaming pixels. The backend connection, however, remains the same: a) Internet access—Direct call from the Zero Trust System to the destination application, b) Private access—App Connector establishes the outbound app connection path and delivers user traffic to the application, etc. When connecting to internal applications, the Zero Trust System allows enterprises to be as refined as needed with their connection controls. This is best demonstrated by three examples:

FIG. 78 is a diagram illustrating examples of internal application isolation.

1. Isolation for One App

Rarely would an enterprise need to isolate at this level of granularity, but allowing a zone of isolation to be one-to-one is done on occasion.

2. Isolation for Many Apps

Specifying access for a segment of sites—whether local sites, application types, or some other group—is a common type of destination isolation for granular controls.

3. Isolation for Entire Peered Environments

This strategy is often used during the early discovery phase of a zero trust deployment. Isolation across multiple sites, applications, and infrastructure enables enterprise connectivity and provides insight into which applications are being consumed, even if not as granularly defined as typically desired.

The Zero Trust System consists of three separate planes (control, data, and logging) that deliver functions without relying on specific networks. The Zero Trust System control and data planes are independent of network paths and built to be multi-homed and highly available, so each can run independently of the other. For example, 1) The control plane is where policy definition and admin are enabled. 2) The data plane is where Zscaler enforces policy and is globally distributed to ensure customers receive effective enforcement access. This policy enforcement plane can be extended to internal and on-premises locations and is not limited to remote access use cases. 3) The logging plane is where configuration takes place and logs are securely streamed to a SIEM/SOAR.

Note: Zscaler visualizes policy enforcement actions in the Global Enforcement Dashboard. Enforcement of the control and data planes are independent of the network, but enable any network to operate as a path for access. For example, a network control plane builds and maintains a routing table, whereas a data plane forwards the packets.

FIG. 79 is a diagram illustrating an embodiment of the Zero Trust System having a multi-plane design. By not locking the initiator or the destination to a network, either can live anywhere and still be accessible. This is how the Zero Trust System delivers: A) a better user experience—Network-independent access that "just works" where allowed, and B) advanced protection—Removes the need for exposed listeners for protection. Instead, communications are built on outbound paths, may include 1) outbound from the end user to the Zero Trust System, 2) outbound from the Zero Trust System to the Internet, 3) outbound from private app environments to the Zero Trust System, etc.

Therefore, users are given access not to networks, but to applications. This access is granted on a per-authorized-session basis so that, before access is granted in this policy phase, earlier criteria (outlined in Elements 1-6) are verified. If an initiator does not meet the criteria required by policy, they cannot get access, and—for private apps—cannot even see that the requested application exists.

A. Insight and prevention—Inline inspection allows enterprises to ensure traffic is 1) protected against malicious sites, malware, etc., 2) prevented from exposing critical information, and 3) providing insights into the risks, challenges, and patterns facing an enterprise for additional security context.

B. Globally availability—The Zero Trust System is available to customers anywhere in the world via public edges. However, there are circumstances where it may be more efficient to stay within a local network or a specific location. Zscaler is able to deliver this localization scalable to new solutions, such as on-premises, IaaS, and within mobile edge environments. This ensures 1) there is no risk of a lateral threat movement across a WAN, 2) access is unique and assessed per user, per app—each policy control is applied for that session, not for "Internet" or "internal", 3) Zscaler splits traffic at the client level, not at the cloud level, etc.

FIG. 80 is a diagram illustrating a ninth progress report of the status of the two example users while they use the Zero Trust System of the present disclosure. The connection is the final stage of the Zero Trust System for that unique session. Once a given application session is complete, the connection is torn down and, for subsequent requests, the process begins again.

A Fast, Reliable, and Easy-to-Operate Zero Trust Architecture

A zero trust solution may deliver services to an enterprise through a globally distributed platform via a uniform set of policy decision and enforcement edges where any enterprise communications may be protected. Customers should not simply consider the number of nodes, but rather the number of SLA-guaranteed sites that offer the services they need. A zero trust provider should not provide public PoPs if they cannot guarantee the SLA in that region due to poor peering or for other reasons.

For zero trust architecture to be built properly, the focus may not solely be on security. It may be built in such a way that the user experience is fast and reliable, deployment is as simple as possible, and ongoing operations are streamlined and outage-free. Implementing a zero trust architecture that degrades user experience and is difficult to operate is a recipe for disaster. It will create excuses for affected users to find alternatives, increase technical debt, and impact employee productivity.

To ensure easy operation, speed, and reliability, there are various technical elements to consider when designing a zero trust architecture. A common starting point is agent technology. As many endpoints are already overloaded with security software, zero trust architecture should consider deployment options that can consolidate and remove overlapping agents. As discussed previously, Zscaler employs a single agent, the Client Connector, to enable its zero trust architecture. This same agent forwards traffic to the Zero Trust System for external app protection (data loss and cyber threat protection) as well as brokers a private connection for internal apps, and also provides digital experience monitoring capabilities.

As part of this single-agent architecture, the intelligence to automatically steer internal and external app traffic is important. As these two traffic types take different tunneled paths to either the internal or external application service edges, the intelligence may reside on the endpoint agent to properly identify traffic and send it through the correct tunnel. Failure to have this intelligence on the agent itself requires the painful process of manually configuring client tunnels, which is complex and rife with issues. The Client Connector is designed for this automated path steering and does not require any manual configuration of tunnels.

Additionally, the control of this agent technology, which will live on an employee's endpoint device, may be centralized and allow for the ability to push policy changes and updates easily. The Zscaler Client Connector Portal is built with this centralized control in mind. Any bypass policies and forwarding profiles can be managed from here.

For flexible deployment options, similar agent technology should be available to deploy at branch sites to enable connection to the Zero Trust System for secure internal and external application transactions initiated by workloads, as well as in the cloud for workloads to have similar connections to the Internet or with workloads in other clouds. For these purposes, Zscaler provides the Branch and Cloud Connector components. Similar to the Client Connector, they allow for simple deployment wherever connections need to happen.

While user experience is closely tied to the endpoint agent, the zero trust provider's cloud infrastructure is configured to provide a fast and reliable service. Zscaler operates the world's largest security cloud, with over 150 data centers around the world handling approximately 250 billion transactions per day, blocking over 7 billion security violations per day, and experiencing over 200 thousand unique security updates per day (as of August 2022). This cloud is operated with a 99.999% SLA and has direct peering at global Internet exchanges to provide sub-millisecond connections to application providers such as Microsoft.

Figure 81:
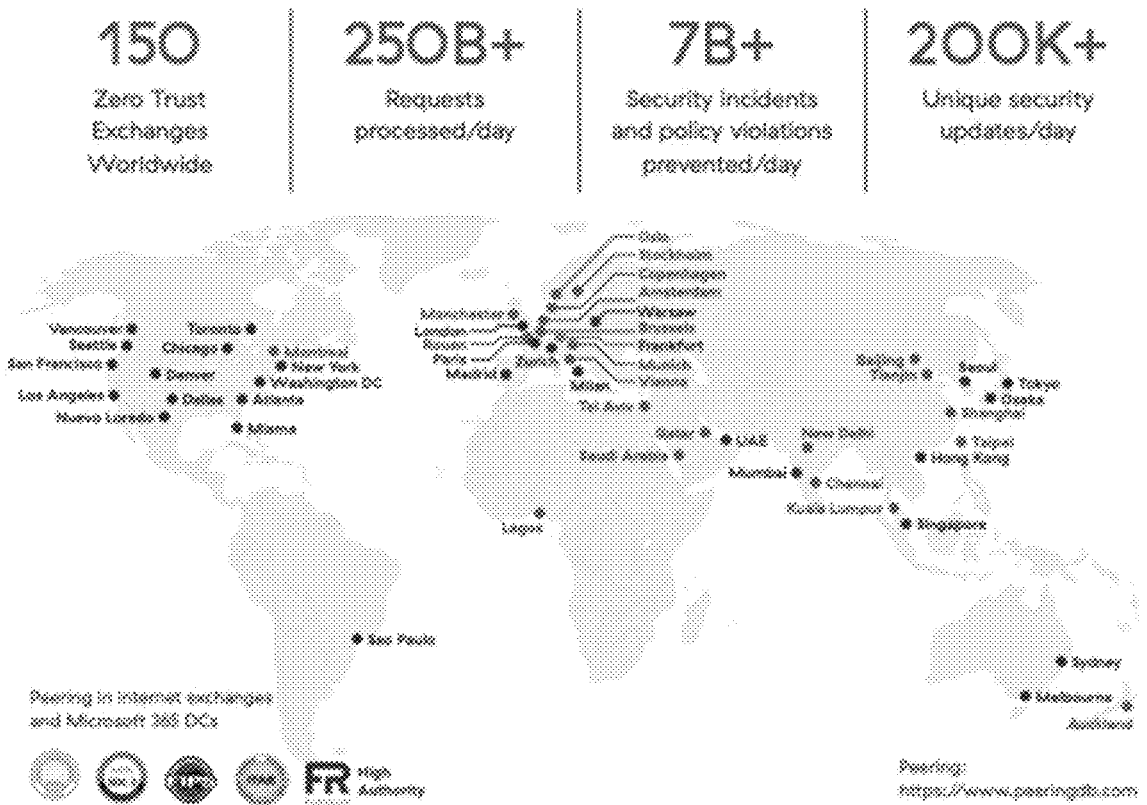
FIG. 81 is a map illustrating the use of the Zero Trust System where it serves 150 service edges around the world and handles over 250 billion transactions per day.

FIG. 81 is a map illustrating the use of the Zero Trust System where it serves 150 service edges around the world and handles over 250 billion transactions per day. As part of the security cloud's global presence, consider the cloud's ability to inspect traffic at scale. To maintain minimal latency for inspection of each packet bound for Internet and SaaS apps, Zscaler employs a single-pass architecture where the packet is placed into memory once and the inspection services, each with dedicated CPU resources, are able to perform their scans simultaneously. This avoids the legacy service chaining of these inspections across serialized physical or virtual applications that incur a processing penalty at each hop and run the risk of excess latency imposed on each packet.

Zscaler applies these architectural advantages to newer standards like TLS 1.3, where a true proxy architecture has the advantage of being inline with independent connections to the client and server. Since this allows for the entire object to be reassembled and scanned, advanced threat protection, DLP, and sandboxing can be applied.

Most users will connect to the SSE via a vendor's public service edge. These are full-featured, secure Internet gateways and private-application access brokers that provide integrated security. However, situations may arise where the public service edge may not meet requirements, and therefore Zscaler offers private service edge options that are hosted in your own infrastructure. This option extends the public service edge architecture and capabilities to an organization's premises or internal locations and utilizes the same centrally controlled policy as the public service edges.

For secure access to the Internet, private service edges can be installed in an organization's data center and are dedicated to its traffic but are managed and maintained by Zscaler with a near-zero touch from the organization. This deployment mode typically benefits organizations that have certain geopolitical requirements or use applications that require that organization's IP address as the source IP address.

For internal application access, the private service edge provides similar management of connections between the user and application and applies the same policies as the public service edge, with the service hosted either onsite or in the public cloud but again managed by the SSE vendor. This deployment model allows zero trust within the four walls, which is useful to reduce application latency when an app and user are in the same location (and going to the public service edge would add unnecessary transit). This option also provides a layer of survivability if a connection to the Internet is lost. Zscaler distributes images for deployment in enterprise data centers and local private cloud environments.

Both for the public and private service edge infrastructure, the same Zero Trust System provides protection for user-to-app, workload-to-workload (hybrid cloud), workload-to-Internet, remote user-to-IoT/OT, and IoT/OT-to-cloud connections. To ensure optimal performance, the Zero Trust System has its own set of service edges for policy enforcement and does not rely on the content delivery network (CDN) model of connectivity edges from a larger, cloud-based network solely to route or "onramp" your traffic to the central enforcement infrastructure. Such schemes are antithetical to providing highly effective, low latency services.

Figure 82:
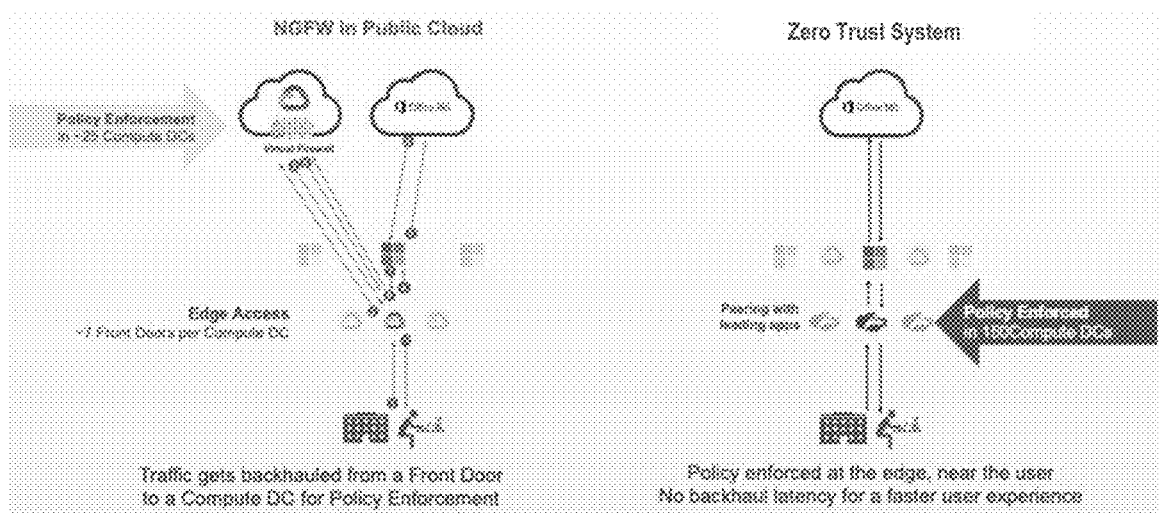
FIG. 82 is a diagram illustrating how the Zero Trust System delivers uniform policy enforcement from the edge in comparison to conventional systems using "onramp service edges."

FIG. 82 is a diagram illustrating how the Zero Trust System delivers uniform policy enforcement from the edge in comparison to conventional systems using "onramp service edges." When evaluating solutions, architects should consider the following design foundations, ensuring that policy enforcement edges are: 1) Hosted in vital peering locations within carrier-neutral data centers for minimal latency between source and destination. Statistics of availability, routing, and locations should be reviewable in public references like PeeringDB and partner deployments; 2) Supported with a valid SLA. This affirms the stability of business functions and indicates the zero trust vendor's ability to deliver a global and available service; 3) Capable of deploying privately on a per-customer basis in locations where local conditions require nuanced deployments, such as on-premises or within an edge compute node; 4) Able to deliver tenancy protection so customer data privacy is not passed to any other component within the infrastructure and no data is ever stored to disk; and 5) Providing global-scale protection for any enterprise services once a threat is detected.

The Zero Trust System offers a variety of operational advantages that should be considered as part of the overall solution architecture: a) Operation that can be automated through scripts, b) Built-in tools like speedtest.zscaler.com, ip.zscaler.com and Trust portal, c) Deployment of an agent through endpoint managers, d) App discovery with AI/ML, e) Cloud-effect and ongoing cloud updates (vs. hardware appliances), f) Support for managed and unmanaged devices, g) Unified policy and centralized control plane, h) One-click integration with Microsoft 365, i) Ecosystem of partners with robust API integrations, etc.

An important element of zero trust architecture is the integration of security and digital experience monitoring. The experience of end users and the performance of applications can be monitored and diagnosed with Zscaler Digital Experience (ZDX). ZDX provides digital experience insights to aid in understanding, diagnosing, and improving user experience issues. The ZDX score uses machine learning to help identify performance anomalies and send actionable alerts, with CloudPath analysis that identifies network issues between the user endpoint and their Wi-Fi, ISP, backbone, and the Zscaler service edge.

FIG. 83 is a map showing the experience of the user across an organization using the ZDX interface. FIG. 84 is diagram illustrating the ZDX CloudPath for providing hop-by-hop network analysis.

Figure 85:
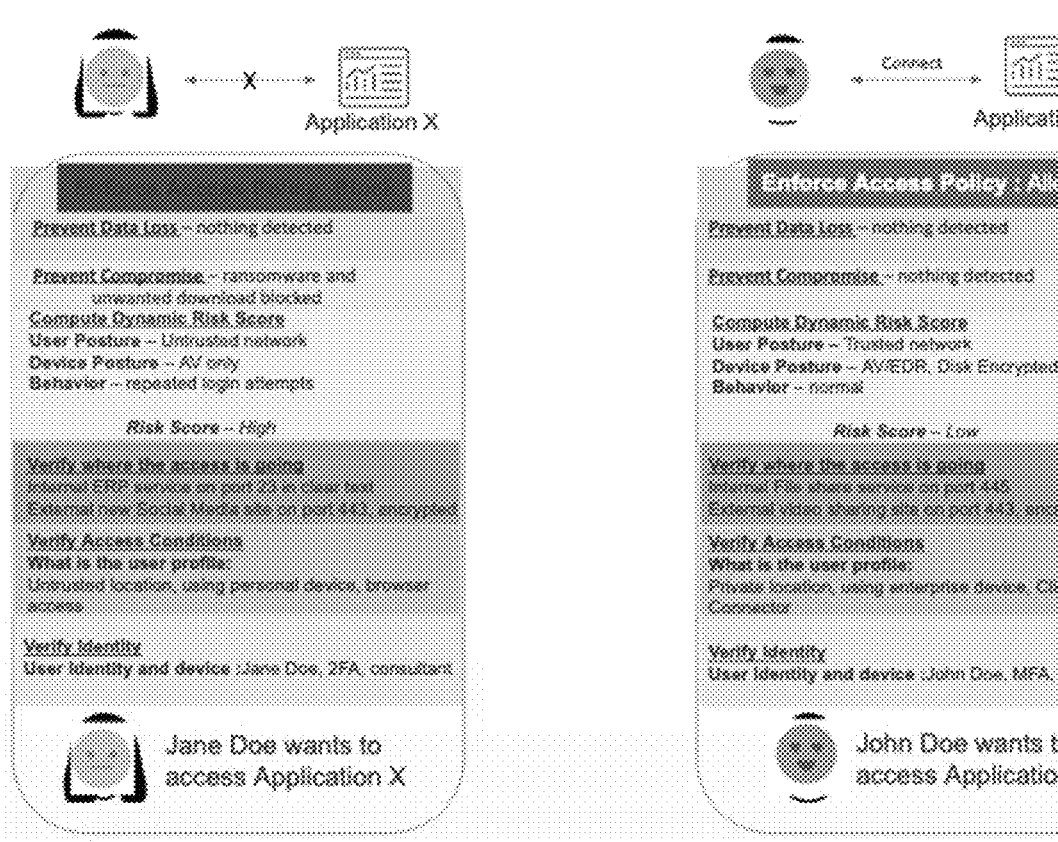
FIG. 85 is a diagram illustrating a tenth progress report of the status of the two example users while they use the Zero Trust System of the present disclosure.
Figure 86:
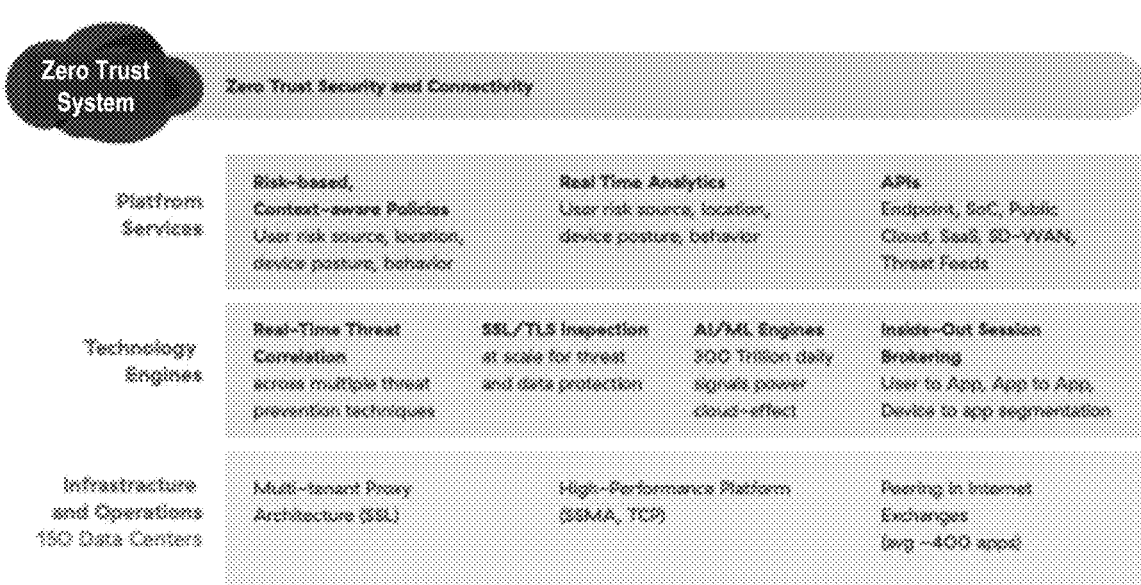
FIG. 86 is a diagram illustrating the foundations of the Zero Trust System.

FIG. 85 is a diagram illustrating a tenth progress report of the status of the two example users while they use the Zero Trust System of the present disclosure. Zero trust vendors may have a demonstrated comprehensive, massive, and resilient cloud platform. Beyond SLAs, the zero trust platform should also provide evidence of scalability, stability, availability, and geographic deployment. To validate this review, consult publicly provided historical data and speak with existing customers to understand their experiences. FIG. 86 is a diagram illustrating the foundations of the Zero Trust System.

Getting Started with Your Zero Trust Journey

The preceding sections covered seven elements of a highly successful zero trust architecture—when employed successfully, these architectural practices can rectify the inadequacies of legacy network and security architectures. When a user authenticates with a VPN, the user generally gets full network IP protocol access. Cybercriminals can then exploit this protocol or leverage it for reconnaissance in the attack phase. Attackers can use it to probe networks and data centers or, worse, steer ransomware to additional targets. Users connect to a network using direct IP communication via an IP address, exposing the entire network of listening ports to attackers. An attacker can then use a port scan of subnets to obtain a full list of listening services open on the server.

Connecting users, devices, and workloads to destination services without placing them on the same routable network eliminates the risk of lateral threat movement. Resources sitting behind the Zero Trust System are not discoverable from the Internet or corporate network, eliminating the attack surface. All connections are inside-out. No inbound connections to internally managed apps are permitted.

Initiators who are authorized to connect to specific destinations will not be able to learn, connect, or even identify network-level information. Connections to the Zero Trust System are completed only when allowed by policy and deemed safe to be directed to the destination application.

The Zero Trust System is an intelligent switchboard that uses policy to permit connections to destination applications. The Zero Trust System makes the adoption of the often daunting zero trust concepts more feasible in today's world of cloud and mobility. Even when beginning with limited understanding of application usage, the Zero Trust System simplifies the operationalization through intuitive policy frameworks.

To achieve these zero trust benefits, it is important to begin the zero trust journey by answering the following questions:

1. How are my users, IoT/OT devices, and workloads going to connect to the Zero Trust System? How do I leverage the Zscaler Client Connector, Branch Connector, Cloud Connector, or Private Service Edges?
2. How are identities verified? How do I integrate with my IdP, and is it supplying the necessary context?
3. How do I create application policies with user-to-app segmentation rules, while accounting for known versus unknown apps?
4. Which traffic should be decrypted and inspected, and what data loss prevention rules should be set up?
5. What factors should influence the dynamic risk scoring algorithm, and what level of risk am I willing to tolerate?
6. What actions should the Zero Trust System take when making its policy decision, and how do I leverage technologies like Zscaler Browser Isolation?
7. How do I ensure my users are getting a satisfactory user experience, and how do I leverage Zscaler Digital Experience to tell me when they are not?

Successfully embarking on a zero trust journey may implement a phased approach. Begin by securing Internet access and phasing out VPN technology for remote users. This often starts with redirecting Internet-bound traffic through the Zero Trust System with default filtering and access policies, while also sending internal application traffic through the Zero Trust System with a *.* access policy to mimic existing VPN access.

This will deliver three distinct early benefits for enterprises:

1. Ensure that applications are accessed in the most direct way by dynamically determining the optimal path to each application in a secure manner. With users no longer on the enterprise network, companies are free to assess which parts of their infrastructure are no longer needed.
2. Accumulate granular application inventory, not limited to IP addresses, of accessed applications. Each time Zscaler determines the best path for application access, it subsequently documents who accessed which application.
3. Reduction of the attack surface, as key internal applications and the VPN infrastructure are no longer publicly exposed.

Proceed in the phased deployment by defining more protective and controlled policies, which happens with accurate insight into which initiators access which applications. By leveraging the previous output, enterprises can group and organize applications based on functionality, enriching the App Policy definition. Machine learning applied to the accumulated data simplifies this organizational process.

Enterprises can then leverage a similar discovery process to determine which groups of applications are afforded which rights. These groups and rights can then be implemented in the next phase of zero trust deployment.

A simple example would entail documenting the servers, domains, and even IP addresses that make up an enterprise application deployment. This will vary from enterprise to enterprise, but at a high level, for example, a) a group definition will be created; b) all addresses (names and IPs) will be added; c) mapping of which users request access to this group will be defined; and d) all others would then have a Conditional Block policy applied.

Definition of these groups and their controls allows enterprises to both determine who can access which service and also how and under which circumstances. This is useful for such purposes as isolating servers and services from any infrastructure, user, application, etc., unless controlled and permitted by the Zero Trust System.

By using the mapped inventory of applications, their groups, and rights, enterprises can then lock down controls governing how workloads access resources. This is a relatively simple process of a) examining the mapped set of groups for hybrid cloud or workload-to-Internet communication; b) defining what access is requested for these groups; and c) implementing controls for these workload groups. Following these steps, other access would then be restricted and controlled. Extend these capabilities with misconfiguration scanning via CNAPP and finally with workload-to-workload, identity-based micro-segmentation.

Figure 87:
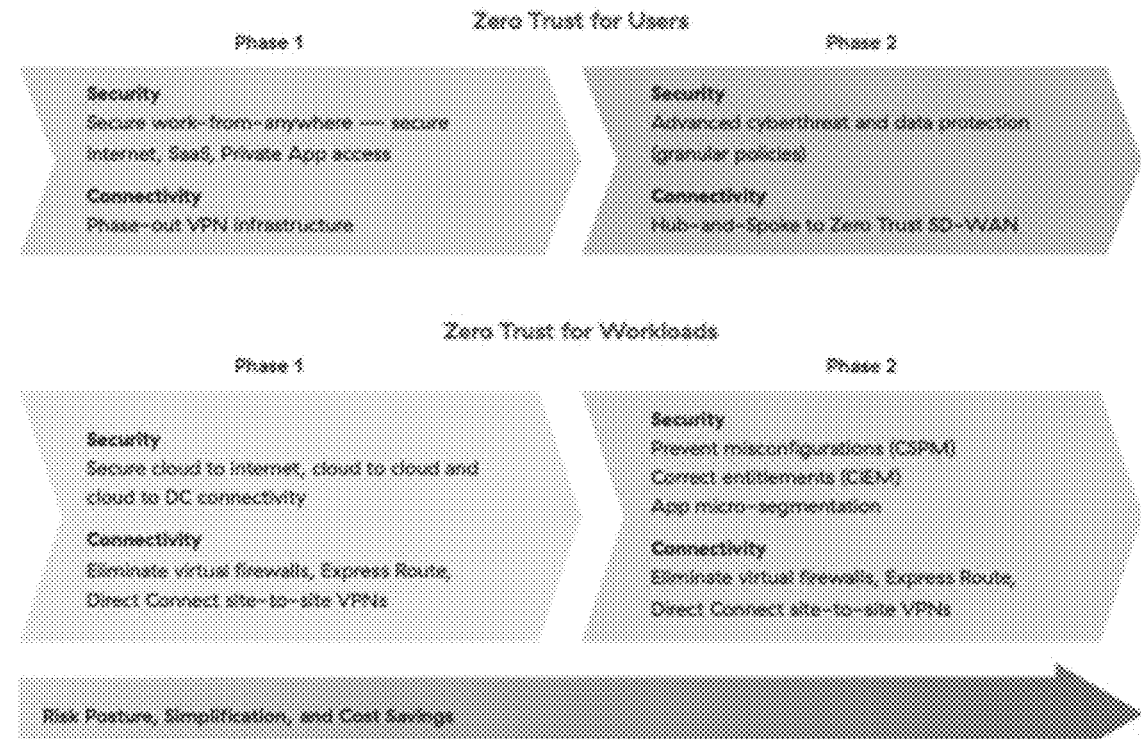
FIG. 87 is diagram showing a phased zero trust journey for users and workloads.

FIG. 87 is diagram showing a phased zero trust journey for users and workloads. As this phased approach is followed, also ensure that the operationalization of zero trust architecture is prioritized: 1) Adapt existing processes and culture to best leverage zero trust architecture. Remember that network and security transformation isn't just about technology; 2) Evaluate network, security, and endpoint silos, as zero trust will affect all three-ensure all three are aligned; 3) Create runbooks that leverage tools provided by the vendor for policy updates, diagnostics, and agent updates; 4) Leverage one-click and API integrations with partners to simplify operations; 5) Architect a holistic zero trust solution, incorporating any exposed connection types (remote/campus, client/branch/cloud connections) and deploy in a phased manner; 6) Create a plan to deploy broadly to take advantage of centralized policy and control planes to simplify operations; 7) Deploy proper triage techniques to accurately identify user experience problems (Wi-Fi, ISP, backbone, SSE, endpoint, app, DNS, etc.). All in all, building a zero trust strategy around the Zero Trust System 500 allows for the network and security transformation that ultimately enables digital transformation.

Application Segmentation

Zscaler has a very powerful policy engine for building out granular application access controls as necessary. This can facilitate restricting access, and even visibility, to applications within your ecosystem.

Deploying granular access policy can be complicated in an enterprise given its variables and challenges. That said, Zscaler has established high-level best practices for driving simplicity within policy control and management.

Zscaler has also released a Reference Architecture for User-to-App Segmentation with ZPA and The Network Architect's Guide to Adopting a Zero Trust Network Access Service that explore policy creation and control in much greater depth.

High-Level Access Policy Best Practices

Defining a policy is simple and is outlined within the additional documentation. Keep in mind that application policy is defined based on two definitions:

1. The user's presented access criteria, whether that be the SAML attributes assigned to the users within your directory, device context, risk, etc.
2. The application that you are accessing. This is defined, but in actual fact, this is the application context that the user (or the user's device) is calling, e.g., a file share on //fileserver1.company.local.

Figure 88:
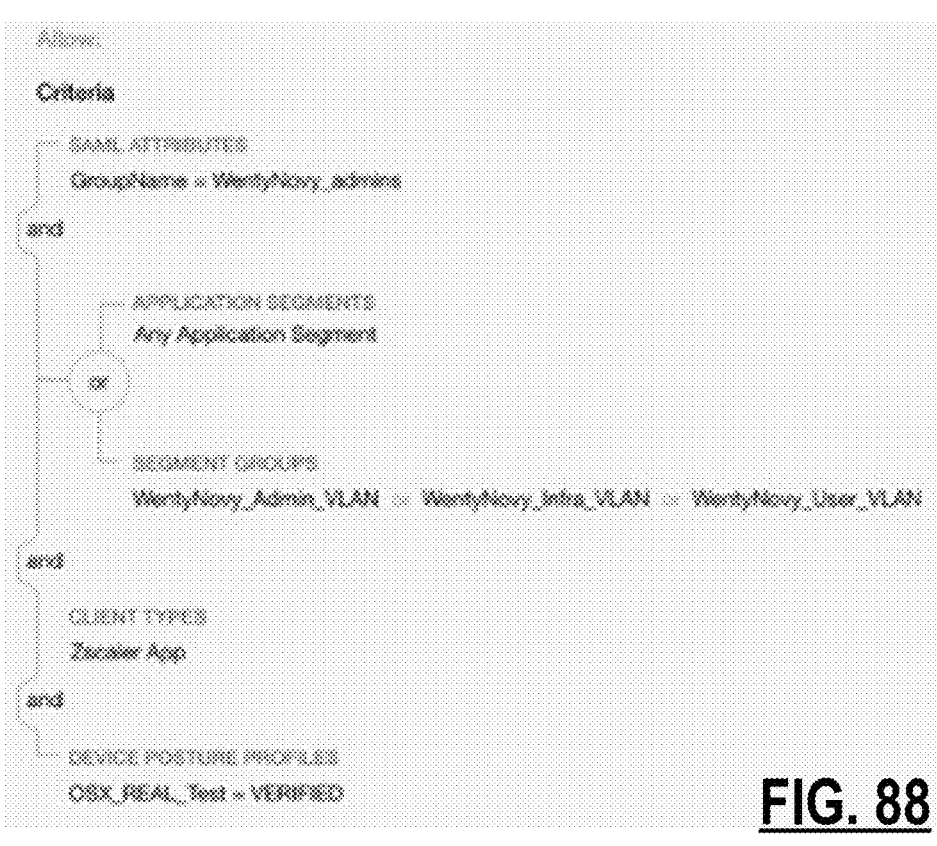
FIG. 88 is a diagram illustrating criteria for observing allowable accept or connection.

FIG. 88 is a diagram illustrating criteria for observing allowable accept or connection, which is an example of these two policies as they are applied. For both applications, customers already have access and control over the data sets.

Let's first focus on user access management: 1) The user SAML attributes are sourced from an LDAP/AD/Domain Controller. 2) As users are added to a group, each then has the accompanying SAML attribute attached to them. 3) This means a large portion of access control is already defined within your internal ecosystem.

Some control mechanism is likely being used to manage the addition and deletion of users and groups, which can also be leveraged in building out a new policy for access. Completing this leverages the prerequisite of building a SAML trust, which likely would have been done during the initial phases of deployment.

So, let's say a customer wants to enable access for its legal team to specific legal applications. In this case (and in most situations), employees are probably already grouped together within a Directory solution under a group or OU. In this case, let's call it Local_Legal.

Leveraging this existing group membership, when a user logs in to the IdP they are given the SAML Attribute that shows them as part of the group Local_Legal. Remember, the policy engine respects the SAML attribute. So, simply define a rule that has the user SAML attribute criteria set as "Local_Legal". Once saved, anyone who logs in (remember, authenticating against the IdP) and is assigned this SAML attribute can then access applications via the rule (or rules) containing this SAML attribute as criteria.

This means that, when new employees join the legal department and are enrolled in the directory and assigned to the Local_Legal group, they are immediately able to access the necessary apps through Zscaler. The user has inherited the access based on the attributes that you control in the directory service. You probably already have a process to manage access to these inheritances. The Zero Trust System applies access rules that you build based on the user attributes and IdP uses.

Next, let's focus on namespace management. Before diving into details, it is important to remember that the other half of the policy is built on application segments. These are customer-built application definitions. They can be hyper specific—i.e., a single FQDN to a single port—or broad enough to offer users generic access for visibility and application usage discovery.

Figures 89, 90:
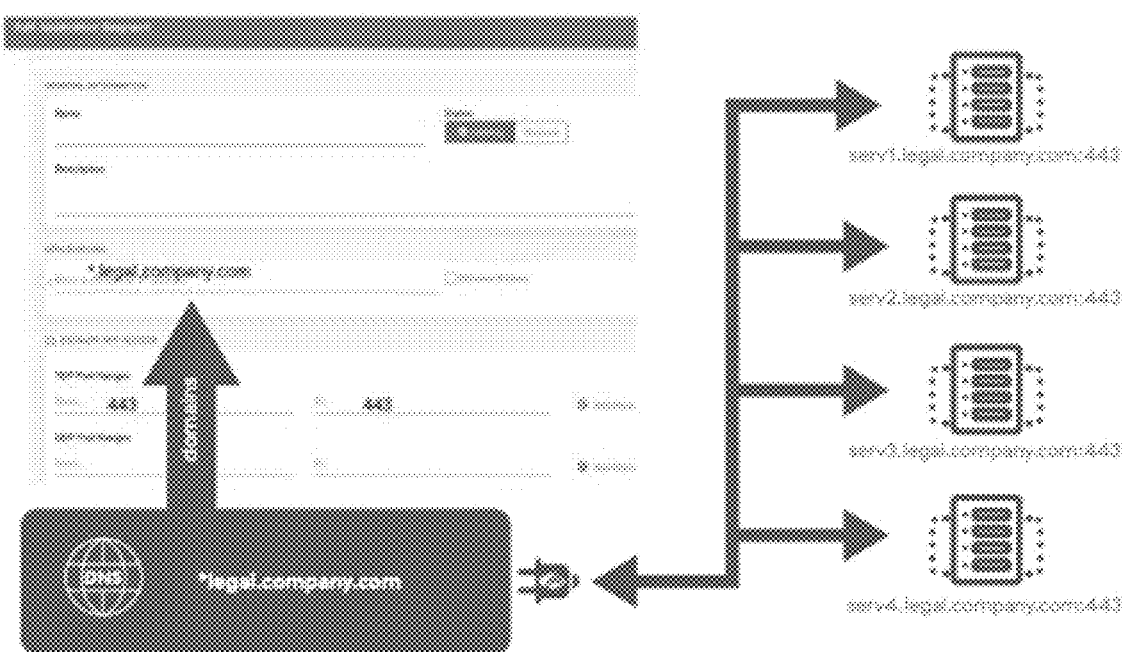
FIG. 89 is a diagram showing apps and app access results.
FIG. 90 is a diagram showing an example of security for a legal company using the Zero Trust System.

FIG. 89 is a diagram showing apps and app access results. In the policy definition defining SAML criteria for access, it's necessary to also define the application segment available to users with this SAML attribute. But let's first look at the application segment definition.

The application segment definition is flexible and will allow you to define a variety of domains, IPs, FQDNs, etc. While it is possible to define each individual application or IP address in use, this may involve constant maintenance of the policy.

Ideally, we may ultimately want to define domain space in a way that meets requirements for that individual application space. So, if everyone on the legal team is able to access legal servers (say there are 10) on port 443, it may not be beneficial to build a policy listing each and every FQDN of the legal servers as a separate rule. Adding each server manually into the policy is acceptable, but it is cumbersome and additional servers may be added manually. Instead, the servers can be grouped into a single application segment, then configure a single rule for access to these servers.

Now let's recall that Zscaler actually validates access based on three factors:

1. What the user (or device) is requesting access to; for example, web browser to legal1.company.local on port 80
2. What the user is allowed access to by policy; is the user allowed access to legal1.company.com:80?
3. If the application access is permitted, is the application reachable at legal1.company.com:80 from the App Connectors?

After answering these questions, define policy in such a way that, while static, allows for dynamic access by managing the local DNS scope for app and server names to match policies. Ideally, if DNS granularity is established such that a set of legal servers share a namespace subdomain, e.g., *.legal.company.com, then you would only need your internal servers to have this naming convention.

FIG. 90 is a diagram showing an example of security for a legal company using the Zero Trust System. The goal is to simplify policy and management. Ultimately, it's very helpful to ensure that your applications and server names meet a constrained naming convention. In the example above, the legal servers may have the name servX.legal.company.com, but the idea broadly applies. The key is ensuring the names of any applications of this type fall into the defined namespace.

This enables the use of a stable and standardized policy that should be rarely modified, if only to allow exceptions to the rule. Thus, after establishing the policy framework, you would ideally be able to leverage your DNS landscape and existing change management process to add and remove access to allowed users. Getting to the point where you can roll out this policy may involve some specific efforts on the local customer network side.

These efforts, for example, may include:

1. Defining and refining your domain space, e.g., what network namespaces and subdomains exist, and where they reside within your organization. This DNS namespace can then be used in policy.
2. Ensuring your DNS naming convention is defined and used by the applications in the element. The policy will not permit access if you have defined *.legal.company.com for access and then your user attempts to access legal1.company.com. Note: For existing apps, you can use CNAMEs on your DNS side as long as the CNAME is called by the client-side.
3. Understanding the necessary ports associated with each application. For example, you can define any of the SSH access under one app segment group with just TCP 22. Similarly, you can define access to any SAP servers on the full set of ports used by SAP.

The above steps should enable access for authorized users to the necessary and allowed applications, without the need to constantly update your policy. After achieving control and understanding of user groups and the application landscape, building a flexible policy is simple. FIG. 91 is a diagram illustrating use of the Zero Trust System by an enterprise for securing connections.

FIG. 92 is a flow diagram illustrating an embodiment of a method 520 for performing a zero trust procedure. For example, the method 520 may be performed by the Zero Trust System 500. As illustrated, the method 520 includes the step of detecting an initial attempt by an entity to connect, access, or communicate with a network resource, as indicated in block 522. The method 520 also includes the step of blocking the entity from initially connecting, accessing, or communicating with the network resource, as indicated in block 524. Also, the method 520 includes the step of performing a verification procedure to verify one or more of an identity of the entity and a context of the initial attempt, as indicated in block 526. The method 520 further includes the step of performing a control procedure to control one or more of malicious content and sensitive data, as indicated in block 528. Also, the method 520 includes the step of performing an enforcement procedure in response to results of the verification procedure and control procedure to determine how to handle the initial attempt, as indicated in block 530. In some embodiments, the method 520 may further include the step of granting trust to the entity when the enforcement procedure determines that one or more enforcement policies are met.

According to various embodiments, the verification procedure (described in block 526) may include an identity verification element (e.g., Element 1), a context validation element (e.g., Element 2), and an authorization confirmation element (e.g., Element 3). The identity verification element (e.g., Element 1) may be integrated with third-party Identity Providers (IDPs) as part of an enterprise Identity Access Management (IAM) process. The context validation element (e.g., Element 2) may be configured to analyze one or more of role, responsibility, request time, location, and circumstances of the initial attempt. The authorization confirmation element (e.g., Element 3) may be configured to implement segmentation rules to determine whether a verified identity of the entity meets predetermined requirements with respect to the initial attempt.

In some embodiments, the control procedure (described in block 528) may include a risk assessment element (e.g., Element 4), a malicious content blocking element (e.g., Element 5), and a sensitive data protection element (e.g., Element 6). The risk assessment element (e.g., Element 4) may be configured to compute a risk score for the entity based on one or more of device posture, threats, destination, behavior, and policy. The malicious content blocking element (e.g., Element 5) may be configured to use inline decryption and deep content inspection to identify and block malicious content. The sensitive data protection element (e.g., Element 6) may be configured to use inline decryption and deep content inspection to identify sensitive data and prevent its exfiltration.

The enforcement procedure (described in block 530) may be configured to implement an access policy enforcement element to a) analyze whether to block or allow the initial attempt to connect, access, or communicate with a network resource, and b) enforce a decision to block or allow network access. The step of enforcing the decision to block or allow the network access may include enforcing one or more of blocking the network access in whole, blocking the network access in part, allowing the network access in whole, and allowing the network access in part.

The method 520 may further include other various aspects according to certain implementations. For example, the method 520 may include the step of monitoring user experience metrics to prevent undue burden on a user. Also, the entity may be defined as a user, a client, a customer, a computing device, a mobile device, an edge device, an application, and/or a workload. The initial attempt by the entity to connect, access, or communicate with the network resource (block 522) may be interpreted as an automatic request generated by the entity. In addition, the verification procedure, control procedure, and enforcement procedure may be implemented in a network-agnostic platform.

Furthermore, the method 520 may be implemented in a system that includes redundant points of presence (PoPs) globally distributed throughout a network for enabling user connections from multiple locations. These connection may include tunnel-based connections or "client connectors" to the Zero Trust System 500. The method 520 may be implemented by or in conjunction with the Zero Trust System 500 or another system that is part of a cloud-based system providing inline monitoring between one or more entities and the Internet and cloud services. Also, it may be noted that every connection may be configured to evaluate identity, profile, user risk, site risk, posture, and content as criteria for deciding whether to grant or block access fully or conditionally.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A method comprising steps of:

detecting an initial attempt by an entity to connect, access, or communicate with a network resource;

blocking the entity from initially connecting, accessing, or communicating with the network resource;

performing a verification procedure to verify one or more of an identity of the entity and a context of the initial attempt;

performing a control procedure to control one or more of malicious content and sensitive data, wherein the control procedure determines what data leaves the network resource; and performing an enforcement procedure, before permitting the connection, access or communication, wherein the enforcement procedure orchestrates results of both the verification procedure and the control procedure in a unified decision engine to simultaneously determine (i) whether the entity may establish the connection, access or communication with the network resource and (ii) what, if any, data may egress from the network resource, the control procedure including inline decryption and deep content inspection of data multiple protocol layers.

2. The method of claim 1, further comprising the step of granting trust to the entity when the enforcement procedure determines that one or more enforcement policies are met.

3. The method of claim 1, wherein the verification procedure includes an identity verification element, a context validation element, and an authorization confirmation element, the verification procedure is implemented in a network-agnostic platform.

4. The method of claim 3, wherein the identity verification element is integrated with third-party Identity Providers (IDPs) as part of an enterprise Identity Access Management (IAM) process.

5. The method of claim 3, wherein the context validation element is configured to analyze one or more of role, responsibility, request time, location, and circumstances of the initial attempt.

6. The method of claim 3, wherein the authorization confirmation element is configured to implement segmentation rules to determine whether a verified identity of the entity meets predetermined requirements with respect to the initial attempt.

7. The method of claim 1, wherein the control procedure includes a risk assessment element configured to compute a risk score, a malicious content blocking element, and a sensitive data protection element, wherein the malicious content blocking element and the sensitive data protection element are configured to use inline decryption and deep content inspection.

8. The method of claim 7, wherein the risk assessment element is configured to compute a risk score for the entity based on one or more of device posture, threats, destination, behavior, and policy.

9. The method of claim 7, wherein the malicious content blocking element is configured to use inline decryption and deep content inspection to identify and block malicious content.

10. The method of claim 7, wherein the sensitive data protection element is configured to use inline decryption and deep content inspection to identify sensitive data and prevent its exfiltration.

11. The method of claim 1, wherein the enforcement procedure is configured to implement an access policy enforcement element to:

analyze whether to block or allow the initial attempt to connect, access, or communicate with the network resource; and enforce a decision to block or allow network access.

12. The method of claim 11, wherein the step of enforcing the decision to block or allow the network access includes enforcing one or more of blocking the network access in whole, blocking the network access in part, allowing the network access in whole, and allowing the network access in part.

13. The method of claim 1, further comprising the step of monitoring user experience metrics to prevent burden on a user.

14. The method of claim 1, wherein the entity is one or more of a user, client, customer, computing device, mobile device, edge device, application, and workload.

15. The method of claim 1, wherein the initial attempt by the entity to connect, access, or communicate with the network resource is interpreted as an automatic request generated by the entity.

16. The method of claim 1, wherein the verification procedure, the control procedure, and the enforcement procedure are implemented in a network-agnostic platform.

17. A non-transitory computer-readable medium configured to store computer logic having instructions that, when executed, cause one or more processing devices to:

detect an initial attempt by an entity to connect, access, or communicate with a network resource;

block the entity from initially connecting, accessing, or communicating with the network resource;

perform a verification procedure to verify one or more of an identity of the entity and a context of the initial attempt;

perform a control procedure to control one or more of malicious content and sensitive data, wherein the control procedure determines what data leaves the network resource; and perform an enforcement procedure, before permitting the connection access of communication, wherein the enforcement procedure unifies results of the verification procedure and the control procedure in a single decision engine that simultaneously determines whether to allow the connection and what data, if any, may leave the network resource via inline decryption and multi-layer content inspection.

18. A cloud-based system comprising:

a processing device; and a memory device configured to store a computer program having instructions that, when executed, enable the processing device to:

detect an initial attempt by an entity to connect, access, or communicate with a network resource;

block the entity from initially connecting, accessing, or communicating with the network resource;

perform a verification procedure to verify one or more of an identity of the entity and a context of the initial attempt;

perform a control procedure to control one or more of malicious content and sensitive data, wherein the control procedure determines what data leaves the network resource; and perform an enforcement procedure, prior to establishing any connection, access or communication, wherein the enforcement procedure orchestrates the verification procedure results with the control procedure results in a unified policy engine to simultaneously determine whether to allow the connection attempt and what data, if any, may egress, using inline decryption and deep content inspection across protocol layers.

19. The cloud-based system of claim 18, further comprising redundant points of presence (PoPs) globally distributed throughout a network for enabling user tunnel-based connections from multiple locations.

20. The cloud-based system of claim 18, wherein the instructions enable the processing device to provide inline monitoring between one or more entities and cloud services.

* * * * *